(12) United States Patent
Holtan et al.

(10) Patent No.: US 7,857,342 B2
(45) Date of Patent: Dec. 28, 2010

(54) HITCH ASSEMBLY

(75) Inventors: Paul D. Holtan, Savage, MN (US);
James W. Wiff, Cologne, MN (US)

(73) Assignee: Dane Technologies, Inc., Brooklyn Park, MN (US)

( * ) Notice: Subject to any disclaimer, the term of this patent is extended or adjusted under 35 U.S.C. 154(b) by 869 days.

(21) Appl. No.: 11/422,552

(22) Filed: Jun. 6, 2006

(65) Prior Publication Data

US 2006/0273547 A1 Dec. 7, 2006

Related U.S. Application Data

(60) Provisional application No. 60/688,395, filed on Jun. 7, 2005.

(51) Int. Cl.
*B60D 1/00* (2006.01)
*B60D 1/07* (2006.01)

(52) U.S. Cl. .............. 280/416.1; 280/415.1; 280/416.3; 280/490.1; 280/504; 280/515

(58) Field of Classification Search ............. 280/416.1, 280/415.1, 416.2, 416.3, 417.1, 490.1, 491.1, 280/491.2, 491.3, 492, 511, 512, 515
See application file for complete search history.

(56) References Cited

U.S. PATENT DOCUMENTS

| | | | |
|---|---|---|---|
| 1,050,919 A | 1/1913 | Conley | |
| 2,381,190 A | 8/1945 | Tiner et al. | |
| 2,497,234 A | 2/1950 | Salvatore | |
| 2,518,816 A | 8/1950 | Powers | |
| 2,621,687 A | 12/1952 | William | |
| 2,666,654 A * | 1/1954 | Gray | 280/492 |
| 2,695,179 A | 11/1954 | Fancsali | |
| 2,790,992 A | 10/1955 | Cushman | |
| 2,790,513 A | 4/1957 | Draxler | |
| 2,827,307 A * | 3/1958 | Osborn | 280/416.3 |
| 2,846,018 A | 8/1958 | Puckett | |
| 2,877,911 A | 3/1959 | Arnot | |

(Continued)

FOREIGN PATENT DOCUMENTS

AT 340315 12/1977

(Continued)

OTHER PUBLICATIONS

Dane Industries, Brochure "Productivity Solutions from the Industry Leader", 2 pages, 2001.

(Continued)

*Primary Examiner*—Lesley Morris
*Assistant Examiner*—Marc A Scharich
(74) *Attorney, Agent, or Firm*—Dorsey & Whitney LLP

(57) ABSTRACT

The present invention is a hitch assembly for coupling a powered cart mover to a cart, wherein the cart has one of three different types of hitching elements. The hitch assembly comprises a mount and a foot. The mount secures the assembly to the mover and includes a vertically adjustable portion biased in an upward position via a biasing element. The foot is pivotally coupled to the vertically adjustable portion and includes first, second and third attachment features. Each attachment feature is configured to receive one of the three different types of hitching elements.

22 Claims, 45 Drawing Sheets

U.S. PATENT DOCUMENTS

| | | | |
|---|---|---|---|
| 2,904,202 A | 9/1959 | Brady | |
| 2,935,161 A | 5/1960 | Comfort | |
| 3,127,209 A | 3/1964 | Faust et al. | |
| 3,524,512 A | 8/1970 | Voeks et al. | |
| 3,575,250 A | 4/1971 | Dykes et al. | |
| 3,633,086 A | 1/1972 | Speth et al. | |
| 3,791,474 A | 2/1974 | Stammen et al. | |
| 3,876,024 A | 4/1975 | Shieman et al. | |
| 3,887,095 A | 6/1975 | Suzuki | |
| 3,922,006 A * | 11/1975 | Borges | 280/416.1 |
| 3,951,434 A * | 4/1976 | Sause | 280/416.1 |
| 4,029,333 A * | 6/1977 | Christensen | 280/416.1 |
| 4,053,025 A | 10/1977 | Slusarenko | |
| 4,096,920 A | 6/1978 | Heyn | |
| 4,265,337 A | 5/1981 | Dammeyer | |
| 4,266,903 A | 5/1981 | Surbrook | |
| 4,386,672 A | 6/1983 | Coker | |
| 4,531,757 A | 7/1985 | Kuhn | |
| 4,573,549 A | 3/1986 | Pankow et al. | |
| 4,611,948 A | 9/1986 | Johnson | |
| 4,634,337 A | 1/1987 | Hamman | |
| 4,730,685 A | 3/1988 | Sinkkonen | |
| 4,771,840 A | 9/1988 | Keller | |
| 4,793,763 A | 12/1988 | Bubik | |
| 4,878,050 A | 10/1989 | Kelley | |
| 4,942,529 A | 7/1990 | Avitan et al. | |
| 4,964,837 A | 10/1990 | Collier | |
| 5,011,169 A | 4/1991 | Henderson et al. | |
| 5,048,626 A | 9/1991 | Strehler et al. | |
| 5,064,012 A | 11/1991 | Losego | |
| 5,082,074 A | 1/1992 | Fischer | |
| 5,096,358 A | 3/1992 | Plant et al. | |
| 5,143,393 A * | 9/1992 | Meyer | 280/491.1 |
| 5,161,634 A | 11/1992 | Ichihara et al. | |
| 5,167,389 A | 12/1992 | Reimers | |
| 5,322,306 A | 6/1994 | Coleman | |
| 5,322,313 A * | 6/1994 | Schroeder | 280/416.1 |
| 5,340,202 A | 8/1994 | Day | |
| 5,388,176 A | 2/1995 | Dykstra et al. | |
| 5,439,069 A | 8/1995 | Beeler | |
| 5,483,615 A | 1/1996 | Hallidy | |
| 5,511,926 A | 4/1996 | Iles | |
| 5,518,260 A | 5/1996 | Grignon | |
| 5,560,630 A * | 10/1996 | Phares et al. | 280/416.1 |
| 5,573,078 A | 11/1996 | Stringer et al. | |
| 5,580,207 A | 12/1996 | Kiebooms et al. | |
| 5,592,355 A | 1/1997 | Ikkai et al. | |
| 5,633,544 A | 5/1997 | Toida et al. | |
| 5,743,347 A | 4/1998 | Gingerich | |
| 5,762,155 A | 6/1998 | Scheulderman | |
| 5,769,051 A | 6/1998 | Bayron et al. | |
| 5,783,989 A | 7/1998 | Issa et al. | |
| 5,791,669 A | 8/1998 | Broddon et al. | |
| 5,808,376 A | 9/1998 | Gordon et al. | |
| 5,860,485 A | 1/1999 | Ebbenga | |
| 5,880,652 A | 3/1999 | Snel | |
| 5,890,727 A * | 4/1999 | May | 280/416.1 |
| 5,934,694 A | 8/1999 | Schugt et al. | |
| 5,947,490 A | 9/1999 | Munnoch et al. | |
| 5,964,313 A | 10/1999 | Guy | |
| 5,983,614 A | 11/1999 | Hancock et al. | |
| 5,984,333 A | 11/1999 | Constantijn et al. | |
| 6,022,031 A | 2/2000 | Reiland et al. | |
| 6,060,859 A | 5/2000 | Jonokuchi et al. | |
| 6,070,679 A | 6/2000 | Berg et al. | |
| 6,109,379 A | 8/2000 | Madwed | |
| 6,116,633 A * | 9/2000 | Pride | 280/511 |
| 6,144,125 A | 11/2000 | Birkestrand et al. | |
| 6,168,367 B1 | 1/2001 | Robinson | |
| 6,220,379 B1 | 4/2001 | Schugt et al. | |
| 6,244,366 B1 | 6/2001 | Otterson et al. | |
| 6,260,643 B1 | 7/2001 | Schuchardt | |
| 6,264,528 B1 | 7/2001 | Doan | |
| 6,352,130 B2 | 3/2002 | Klein et al. | |
| 6,378,642 B1 | 4/2002 | Sutton | |
| 6,406,250 B2 | 6/2002 | Jaeger et al. | |
| 6,435,803 B1 | 8/2002 | Robinson | |
| 6,481,514 B2 | 11/2002 | Takada | |
| D475,645 S | 6/2003 | Hoonsbeen | |
| 6,681,877 B2 | 1/2004 | Ono et al. | |
| 6,685,211 B2 | 2/2004 | Iles | |
| 6,729,421 B1 | 5/2004 | Gluck et al. | |
| 6,729,636 B1 * | 5/2004 | Lynch et al. | 280/490.1 |
| 6,820,887 B1 | 11/2004 | Riggle | |
| 6,871,714 B2 | 3/2005 | Johnson | |
| 6,880,652 B2 | 4/2005 | Holtan et al. | |
| 6,997,471 B1 * | 2/2006 | Daniel | 280/416.1 |
| 7,029,019 B1 * | 4/2006 | Dye | 280/416.2 |
| 7,134,515 B2 | 11/2006 | Lenkman | |
| 7,219,754 B2 | 5/2007 | Johnson | |
| 7,389,836 B2 | 6/2008 | Johnson et al. | |
| 7,493,979 B2 | 2/2009 | Johnson et al. | |
| 7,533,742 B2 | 5/2009 | Johnson et al. | |
| 7,549,651 B2 | 6/2009 | Holtan et al. | |
| 7,571,914 B2 | 8/2009 | Holtan et al. | |
| 2001/0022244 A1 | 9/2001 | Takada | |
| 2002/0053782 A1 * | 5/2002 | Peters | 280/504 |
| 2003/0089537 A1 | 5/2003 | Sinclair et al. | |
| 2003/0231945 A1 | 12/2003 | Weatherly | |
| 2004/0134692 A1 | 7/2004 | Kime et al. | |
| 2004/0245030 A1 | 12/2004 | Holtan et al. | |
| 2004/0256166 A1 | 12/2004 | Holtan et al. | |
| 2005/0006874 A1 * | 1/2005 | Mrofka et al. | 280/416.1 |
| 2005/0098364 A1 | 5/2005 | Johnson et al. | |
| 2005/0116431 A1 | 6/2005 | Holtan et al. | |
| 2006/0000664 A1 | 1/2006 | Huang et al. | |
| 2006/0102392 A1 | 5/2006 | Johnson et al. | |
| 2006/0197295 A1 | 9/2006 | Holtan et al. | |
| 2006/0243500 A1 | 11/2006 | Wiff et al. | |
| 2006/0244226 A1 | 11/2006 | Ondrasik | |
| 2006/0273547 A1 | 12/2006 | Holtan et al. | |
| 2007/0013157 A1 | 1/2007 | Wiff et al. | |
| 2007/0145707 A1 | 6/2007 | Johnson | |
| 2007/0181352 A1 | 8/2007 | Holtan et al. | |
| 2007/0289787 A1 | 12/2007 | Wiff et al. | |
| 2008/0257618 A1 | 10/2008 | Johnson et al. | |
| 2009/0267322 A1 | 10/2009 | Holtan et al. | |

FOREIGN PATENT DOCUMENTS

| | | |
|---|---|---|
| BE | 1012207 | 7/2000 |
| EP | 0326754 | 8/1989 |
| EP | 0405230 | 1/1991 |
| EP | 1 046384 | 10/2000 |
| EP | 1454787 | 9/2004 |
| FR | 2246415 | 5/1975 |
| FR | 2587291 | 9/1985 |
| GB | 1601930 | 11/1981 |
| GB | 2332405 | 6/1999 |
| GB | 2342327 | 4/2000 |
| NL | 1016924 | 6/2002 |
| WO | WO88/06385 | 8/1988 |
| WO | WO96/03305 | 2/1996 |
| WO | WO01/85086 | 11/2001 |

OTHER PUBLICATIONS

Dane Industries Product Brochure for QuicKART 1000 Power Pal, 2 pages, 2001.
Dane Industries Product Brochure for QuicKART 2000, 2 pages, 2001.
Dane Industries Product Brochure for PowerPal 3000, 2 pages, 2001.
Dane Industries Product Brochure for QuicKART 5000, 2 pages, 2001.

Declaration of David Leckey, Executive Vice President of Dane Technologies, Inc., attaching photos showing a motorized Quickart 2000 shopping cart mover with a hitch that allows the Quickart 2000 to move two side-by-side lines of shopping carts, labeled "Exhibit A", "Exhibit B" and "Exhibit C", 4 pages, at least as early as Oct. 27, 2003.

Declaration of William A. Grimes, Senior Vice President of Dane Industries, Inc., attaching photos showing a motorized shopping cart mover and hitch, labeled "Exhibit E" and "Exhibit F", and showing a motorized shopping cart mover employing a second type of hitch for attaching to a shopping cart, labeled "Exhibit G", "Exhibit H" and "Exhibit I", 6 pages, at least as early as Autumn 2004.

Declaration of James W. Wiff, Vice President, Engineering and Product Development of Dane Industries, Inc., attaching photos showing various hitches observed at the United States Postal Service facility, labeled "Exhibit J", "Exhibit K", "Exhibit L", "Exhibit M" and "Exhibit N", 6 pages, at least as early as the period between Oct. 6, 2004 and Oct. 20, 2004.

Declaration of William A. Grimes, Senior Vice President of Retail Sales of Dane Industries, Inc., attaching photos showing a motorized shopping cart mover with a hitch that is configured to attach to a shopping cart, labeled "Exhibit O", "Exhibit P" and "Exhibit Q", 4 pages, at least as early as 2001.

Declaration of David A. Leckey, Executive Vice President of Dane Industries, Inc., attaching photos showing a hitch of a motorized shopping cart mover that is configured to receive the rear wheels of a shopping cart, labeled "Exhibit R", "Exhibit S" and "Exhibit T", 4 pages, at least as early as Aug. 4, 2003.

Declaration of William A. Grimes, Senior Vice President of Retail Sales of Dane Industries, Inc., attaching photos showing a hitch of a motorized shopping cart mover that is configured to enter the rear of a shopping cart, labeled "Exhibit U", "Exhibit V" and "Exhibit W", 4 pages, at least as early as Aug. 31, 2004.

Declaration of William A. Grimes, Senior Vice President of Dane Industries, Inc., attaching a photo showing a hitch of a motorized shopping cart mover that is configured to receive the rear wheels of a shopping cart, labeled "Exhibit X", 2 pages, at least as early as Jan. 13, 2003.

Declaration of James W. Wiff, Vice President, Engineering and Product Development of Dane Industries, Inc., attaching photos showing a collapsible pallet, labeled "Exhibit AA" and "Exhibit BB", 3 pages, at least as early as May 21, 2004.

Declaration of Paul D. Holtan, Senior Staff Engineer at Dane Industries, Inc., attaching photos showing a hitch for attachment to a motorized shopping cart mover, labeled "Exhibit X", "Exhibit XI", "Exhibit XII", "Exhibit XIII", "Exhibit XIV", "Exhibit XV", "Exhibit XVI", "Exhibit XVII" and "Exhibit XVII", 10 pages, at least as early as Jan. 1, 2002.

International Search Report, PCT/US2004/034009, Mar. 2, 2006.

Restriction Requirement, U.S. Appl. No. 11/696,534, 6 pages, Apr. 21, 2008.

Response to Restriction Requirement, U.S. Appl. No. 11/696,534, 11 pages, May 21, 2008.

Nonfinal Office Action U.S. Appl. No. 11/696,534, 17 pages, Jul. 17, 2008.

Response to Nonfinal Office Action U.S. Appl. No. 11/696,534, 6 pages, Oct. 17, 2008.

Non-Final Office Action, U.S. Appl. No. 11/682,562, 13 pages, Jan. 9, 2008.

Amendment and Response to Non-Final Office Action, U.S. Appl. No. 11/682,562, 14 pages, May 9, 2008.

Final Office Action, U.S. Appl. No. 11/682,562, 10 pages, Aug. 21, 2008.

Non-Final Office Action, U.S. Appl. No. 11/361,136, 10 pages, Jan. 10, 2008.

Amendment and Response to Non-Final Office Action, U.S. Appl. No. 11/361,136, 9 pages, May 9, 2008.

Final Office Action, U.S. Appl. No. 11/361,136, 10 pages, Sep. 8, 2008.

Restriction Requirement, U.S. Appl. No. 11/356,923, 10 pages, Jul. 17, 2008.

Response to Restriction Requirement, U.S. Appl. No. 11/365,923, 13 pages, Aug. 18, 2008.

Non-Final Office Action, U.S. Appl. No. 11/356,923, 12 pages, Nov. 7, 2008.

Response to Nonfinal Office Action U.S. Appl. No. 11/365,923, 9 pages, Feb. 9, 2009.

Non-Final Office Action, U.S. Appl. No. 11/254,564, 18 pages, Jan. 9, 2008.

Amendment and Response to Non-Final Office Action, U.S. Appl. No. 11/254,564, 21 pages, May 9, 2008.

Final Office Action, U.S. Appl. No. 11/254,564, 18 pages, Sep. 16, 2008.

Response to Final Office Action, U.S. Appl. No. 11/254,564, filed Dec. 16, 2008.

Notice of Allowance, U.S. Appl. No. 11/254,564, Jan. 12, 2009 4 pages.

Non-Final Office Action, U.S. Appl. No. 11/184,095, 21 pages, Apr. 4, 2008.

Restriction Requirement, U.S. Appl. No. 10/836,593, 6 pages, Nov. 23, 2005.

Amendment and Response to Restriction Requirement, U.S. Appl. No. 10/836,593, 9 pages, Dec. 21, 2005.

Non-Final Office Action, U.S. Appl. No. 10/836,593, 20 pages, Feb. 13, 2006.

Amendment and Response to Non-Final Office Action, U.S. Appl. No. 10/836,593, 15 pages, Jul. 5, 2006.

Final Office Action, U.S. Appl. No. 10/836,593, 18 pages, Sep. 15, 2006.

Amendment and Response to Final Office Action, U.S. Appl. No. 10/836,593, 16 pages, Nov. 7, 2006.

Non-Final Office Action, U.S. Appl. No. 10/836,593, 17 pages, Jan. 22, 2007.

Amendment and Response to Non-Final Office Action, U.S. Appl. No. 10/836,593, 21 pages, May 22, 2007.

Final Office Action, U.S. Appl. No. 10/836,593, 22 pages, Aug. 14, 2007.

Amendment and Response to Office Action, U.S. Appl. No. 10/836,593, 15 pages, Oct. 31, 2007.

Non-Final Office Action, U.S. Appl. No. 10/836,593, 18 pages, Nov. 28, 2007.

Notice of Appeal and Pre-Appeal Brief Conference Request, U.S. Appl. No. 10/836,593, 9 pages, Apr. 17, 2008.

Amendment and Response, U.S. Appl. No. 10/836,593, 17 pages Jan. 16, 2009.

Preliminary Amendment, U.S. Appl. No. 11/017,975, 10 pages, Mar. 3, 2005.

Restriction Requirement, U.S. Appl. No. 11/017,975, 5 pages, Jul. 26, 2005.

Amendment and Response to Restriction Requirement, U.S. Appl. No. 11/017,975, 12 pages, Aug. 23, 2005.

Non-Final Office Action, U.S. Appl. No. 11/017,975, 7 pages, Jan. 4, 2006.

Amendment and Response to Non-Final Office Action, U.S. Appl. No. 11/017,795, 16 pages, May 1, 2006.

Final Office Action, U.S. Appl. No. 11/017,795, 11 pages, Oct. 6, 2006.

Amendment and Response to Final Office Action, U.S. Appl. No. 11/017,795, 9 pages, Dec. 6, 2006.

Notice of Allowance, U.S. Appl. No. 11/017,795, 6 pages, Jan. 5, 2007.

Non-Final Office Action, U.S. Appl. No. 10/280,157, 7 pages, Apr. 1, 2003.

Amendment and Response to Non-Final Office Action, U.S. Appl. No. 10/280,157, 6 pages, May 1, 2003.

Non-Final Office Action, U.S. Appl. No. 10/280,157, 7 pages, Oct. 22, 2003.

Amendment and Response to Non-Final Office Action, U.S. Appl. No. 10/280,157, 13 pages, Mar. 22, 2004.

Final Office Action, U.S. Appl. No. 10/280,157, 7 pages, Jul. 15, 2004.

Amendment and Response to Final Office Action, U.S. Appl. No. 10/280,157, 8 pages, Aug. 24, 2004.

Notice of Allowance, U.S. Appl. No. 10/280,157, 5 pages, Oct. 6, 2004.

Notice of Allowance U.S. Appl. No. 12/125,138, 8 pages, Oct. 20, 2008.
Office Action mailed Feb. 20, 2009; U.S. Appl. No. 10/836,593.
Notice of Allowance mailed Feb. 27, 2009; U.S. Appl. No. 11/696,534.
Nonfinal Office Action, U.S. Appl. No. 11/770,436, 13 pages, Oct. 6, 2009.
Notice of Allowance, U.S. Appl. No. 11/356,923, 4 pages, mailed Apr. 6, 2009.
Restriction Requirement, U.S. Appl. No. 10/947,831, 6 pages, Nov. 27, 2006.
Amendment and Response to Restriction Requirement, U.S. Appl. No. 10/947,831, 11 pages, Feb. 21, 2007.
Non-Final Office Action, U.S. Appl. No. 10/947,831, 18 pages, Apr. 24, 2007.
Amendment and Response to Non-Final Office Action, U.S. Appl. No. 10/947,831, 13 pages, Aug. 22, 2007.
Final Office Action, U.S. Appl. No. 10/947,831, 4 pages, Oct. 25, 2007.
Amendment and Response to Final Office Action, U.S. Appl. No. 10/947,831, 5 pages, Jan. 25, 2008.
Notice of Allowance, U.S. Appl. No. 10/947,831, 9 pages, Feb. 22, 2008.
Amendment and Response to Office Action, U.S. Appl. No. 10/836,593, 9 pages, May 20, 2009.
Notice of Allowance, U.S. Appl. No. 10/836,593, 4 pages, Sep. 10, 2009.
Restriction Requirement, U.S. Appl. No. 10/965,281, 5 pages, Dec. 8, 2005.
Amendment and Response to Restriction Requirement, U.S. Appl. No. 10/965,281, 10 pages, Feb. 2, 2006.
Non-Final Office Action, U.S. Appl. No. 10/965,281, 15 pages, Mar. 28, 2006.
Amendment and Response to Non-Final Office Action, U.S. Appl. No. 10/965,281, 19 pages, Aug. 25, 2006.
Final Office Action, U.S. Appl. No. 10/965,281, 10 pages, Oct. 27, 2006.

* cited by examiner

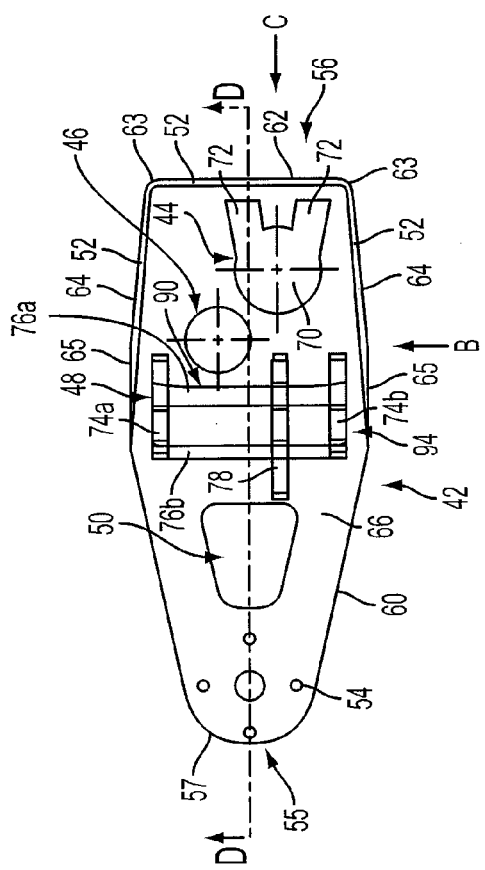
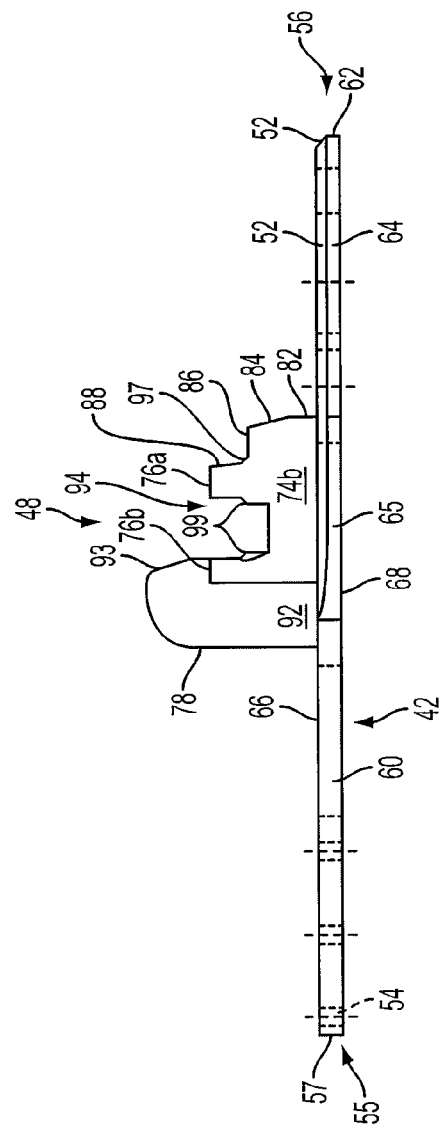
FIG. 5
FIG. 6

HITCH ASSEMBLY

CROSS-REFERENCE TO RELATED APPLICATIONS

The present application claims the benefit under 35 U.S.C. §119(e) to U.S. Provisional Patent Application No. 60/688,395 ("the '395 application"), which was filed on Jun. 7, 2005 and entitled "Hitch Assembly." The '395 application is incorporated by reference into the present application in its entirety.

FIELD OF THE INVENTION

The present invention relates to devices and methods for assisting in the transport of wheeled carts within a facility. More specifically, the present invention relates to devices and methods for coupling powered cart movers to wheeled carts.

BACKGROUND OF THE INVENTION

To avoid worker injuries and increase efficiency, powered cart movers are utilized to move loaded wheeled carts in facilities such as warehouses, retail centers and shipping/receiving centers. It is common that such facilities will have more than one type of cart on the premises. For example, the United States Postal Service ("USPS") utilizes nationwide at least ten different types of carts within its facilities. Each of these types of carts requires a unique hitch arrangement in order to couple to a powered cart mover. As a result, a powered cart mover with a hitch for a first type of cart will not be able to hitch to a second type of cart. Organizations such as the USPS have two options. They must provide at least one powered cart mover for each type of hitch in the facility, or they must change-out, on a case-by-case basis, the hitches on the powered cart movers to be compatible with the cart hitching arrangement encountered at the moment. Neither option is an efficient use of resources.

There is a need in the art for a hitch assembly that is readily attachable to multiple types of carts. There is also a need in the art for a method of attaching a hitch assembly that is less manually intensive for an operator.

BRIEF SUMMARY OF THE INVENTION

The present invention, in one embodiment, is a hitch assembly for coupling a powered cart mover to a cart, wherein the cart has one of three different types of hitching elements. The hitch assembly comprises a mount and a foot. The mount secures the assembly to the mover and includes a vertically adjustable portion biased in an upward position via a biasing element. The foot is pivotally coupled to the vertically adjustable portion and includes first, second and third attachment features. Each attachment feature is configured to receive one of the three different types of hitching elements. In one embodiment, the foot can be restrained in the forward or lateral orientation by allowing the foot to bias fully upward such that features on the foot engage features on the mount. Also, in one embodiment, the foot can be releasably locked in a forward orientation via a locking pin extending from the mount and engaging a hole in the foot.

The present invention, in one embodiment, is a hitching assembly for coupling a powered cart mover to a cart. The hitching assembly comprises a mount and a foot. The mount secures the assembly to the mover. The foot is pivotally coupled to the mount and vertically adjustable relative to the powered cart mover. The foot includes first, second and third hitching features. The first hitching feature is a hole including a circular portion and two diverging leg portions radiating from the circular portion. The second hitching feature is a circular hole. The third hitching feature is a slot or groove defined by first and second parallel portions. In one embodiment, the first and second parallel portions are each bars. In one embodiment, the first parallel portion is a bar and the second parallel portion is a plurality of spaced apart pins positioned along a line that is parallel to the bar.

The present invention, in one embodiment, is a hitch assembly for coupling a powered cart mover to a cart, wherein the cart has one of several different types of hitching elements. The assembly includes a mount and a foot. The mount secures the assembly to the mover. The foot is operably coupled to the mount and includes first, second and third attachment features. Each attachment feature is configured to receive one of said different types of hitching elements.

The present invention, in one embodiment, is a hitch assembly for coupling a powered cart mover to a variety of carts having different types of hitch features. The assembly includes a first member and a second member. The first member is adapted to receive a first type of hitch feature. The second member is adapted to receive a second type of hitch feature different from the first type hitch feature.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 5 is a top plan view of the foot depicted in FIG. 4.

FIG. 6 is a side elevation of the foot as viewed along arrow B in FIG. 5.

DETAILED DESCRIPTION OF THE INVENTION

The present invention, in one embodiment, is a hitch assembly 2 for use on a motorized cart mover 4. The hitch assembly 2 of the present invention is configured to attach to multiple types of carts although the each type of cart requires its own unique hitching configuration. The hitch assembly 2 is advantageous in that it allows an organization like the USPS to attach a cart mover 4 to multiple types of carts with a single hitch assembly 2, thereby eliminating the need to change-out hitches or to have one or more cart movers 4 dedicated for use with a specific type of cart.

Figure 1:
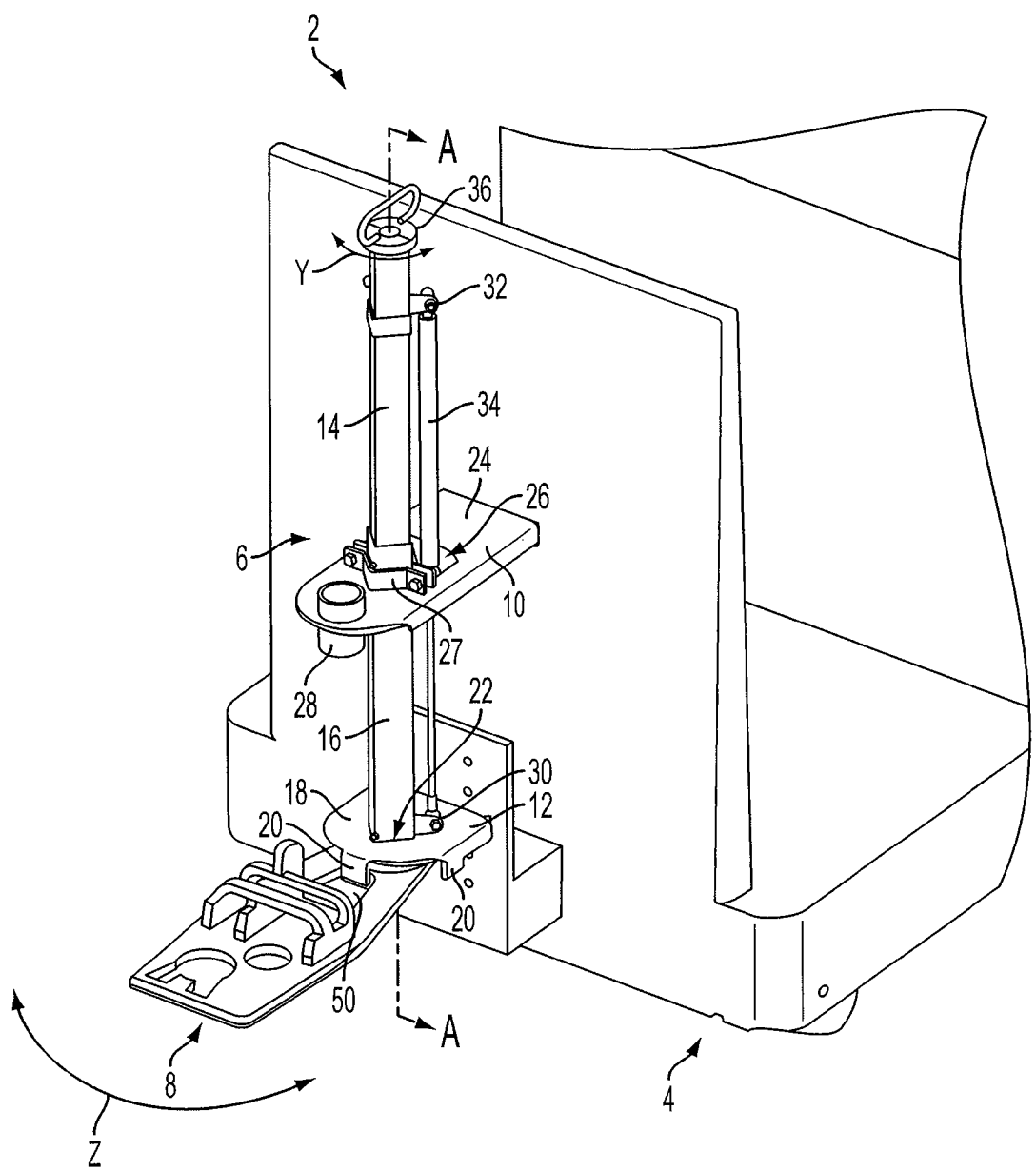
FIG. 1 is an isometric view of the hitch assembly connected to the front portion of the mover.
Figure 2:
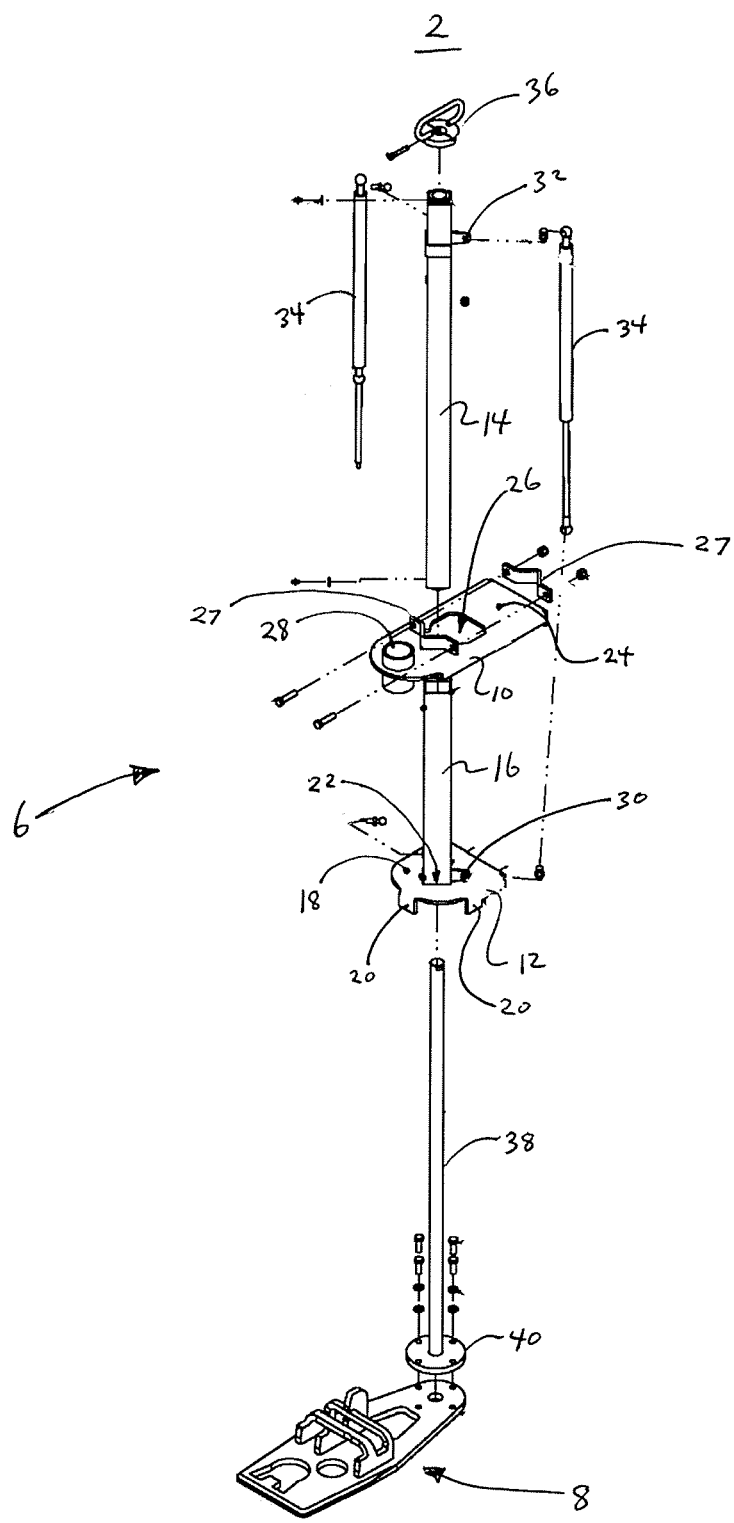
FIG. 2 is an exploded isometric view of the hitch assembly depicted in FIG. 1.
Figure 3:
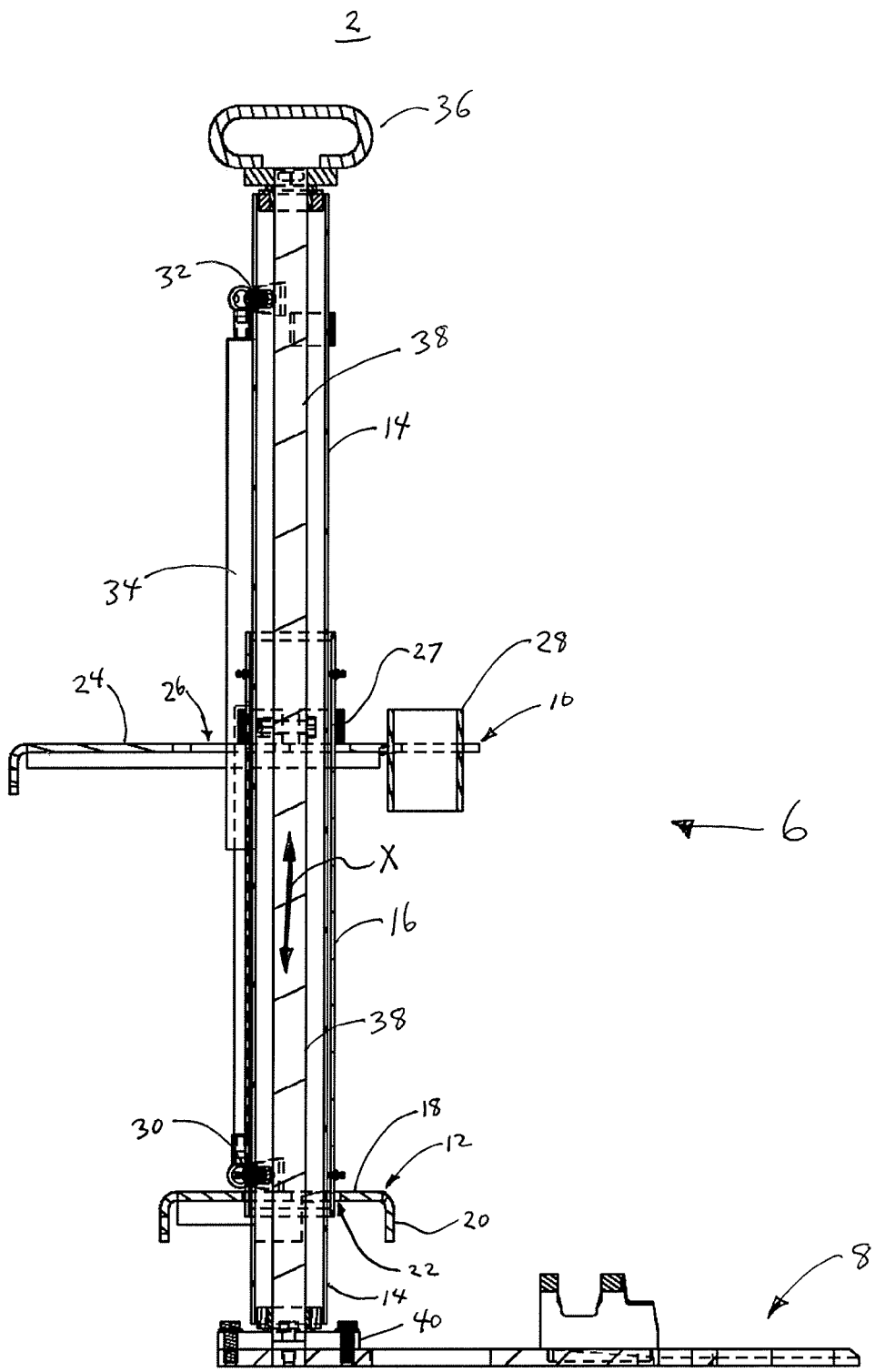
FIG. 3 is a sectional elevation of the hitch assembly taken along section line AA in FIG. 1.

For a detailed discussion of one embodiment of the hitch assembly 2, reference is now made to FIGS. 1-3. FIG. 1 is an isometric view of the hitch assembly 2 connected to the front portion of the mover 4. FIG. 2 is an exploded isometric view of the hitch assembly 2 depicted in FIG. 1. FIG. 3 is a sectional elevation of the hitch assembly 2 taken along section line AA in FIG. 1.

As shown in FIG. 1, in one embodiment, the hitch assembly 2 is adapted for connection to a rideable motorized cart mover 4. In one embodiment, the rideable motorized cart mover 4 is a TR 3500 series tow tractor as manufactured by Crown Equipment Corp., 44 South Washington St., New Bremen, Ohio 45869.

As indicated in FIGS. 1-3, the hitch assembly 2 includes a vertical telescopic tube 6, a foot 8, an upper mount 10, and a lower mount 12. The telescopic tube 6 includes an inner tube 14 that extends upwardly out of an outer tube 16. In one embodiment, the tubes 14, 16 have a square or rectangular cross-section. In other embodiments, the tubes 14, 16 have circular, hexagonal, triangular or other cross-sectional shapes.

As indicated in FIGS. 1 and 3, the upper mount 10 connects to the outer tube 16 near its upper end, and the lower mount 12 connects to the outer tube 16 near its lower end. The upper and lower mounts 10, 12 attach to the front portion of the mover 4.

As can be understood from FIGS. 1-3, in one embodiment, the lower mount 12 includes a generally horizontal plate 18 and three tabs 20 extending vertically downward from the outer perimeter of the plate 18. In one embodiment, the tabs 20 are offset from each other about the outer perimeter of the plate 18 by approximately 90 degrees. In one embodiment, the lower end of the outer tube 16 extends through a hole 22 in the plate 18 of the lower mount 12.

As shown in FIGS. 1-3, in one embodiment, the upper mount 10 includes a generally horizontal plate 24. In one embodiment, the upper end of the outer tube 16 extends through a hole 26 in the plate 24 of the upper mount 10 and is coupled to the plate 24 via a two-piece strap 27. A short cylindrical tube 28 extends vertically through the plate 24 of the upper mount 10.

As can be understood from FIGS. 1-3, a pair of lower brackets 30 extends from the outer tube 16 near its lower end, and a pair of upper brackets 32 extend from the inner tube 14 near its upper end. In one embodiment, a biasing mechanism, such as a gas spring 34, extends between each pair of lower and upper brackets 30, 32. The inner tube 14 is telescopically moveable within the outer tube 16. Each gas spring 34 acts between its respective pair of lower and upper brackets 30, 32 to provide a constant upward force to bias the inner tube 14 in an upwardly extended position relative to the outer tube 16. In other embodiments, the biasing mechanism 34 is a spring, an electric actuator or a hydraulic actuator.

As illustrated in FIGS. 1-3, a hitch alignment handle 36 caps off the top of the inner tube 14. As shown in FIG. 3, the handle 36 is connected to an upper end of a shaft 38 that extends down through the tubes 14, 16. The bottom end of the shaft 38 connects to a stop plate 40, which is connected to the foot 8. The shaft 38 is pivotably displaceable within the tubes 14, 16 such that the foot 8 and handle 36 are pivotable in horizontal planes about the vertical axis of the shaft 38, as indicated by arrows Y and Z in FIG. 1.

As can be understood from FIG. 3 and the preceding discussion, the shaft 38 and the inner tube 14 are vertically displaceable as a unit within the outer tube 16 as indicated by arrow X. As shown in FIG. 3, when the inner tube 14 is displaced downwardly through the outer tube 16 against the upward force exerted by the gas springs 34, a bottom portion of the inner tube 14 will extend downwardly out of the outer tube 16 and the top horizontal surface of the foot 8 will displace away from the bottom horizontal surface of the lower mount 12. As can be understood from FIG. 3, when the gas springs 34 are allowed to return the inner tube 14 to the upwardly extended position shown in FIG. 1, the stop plate 40 will abut against the lower end of the outer tube 16, thereby preventing the inner tube 14 from overly extending upwards.

Figure 4:
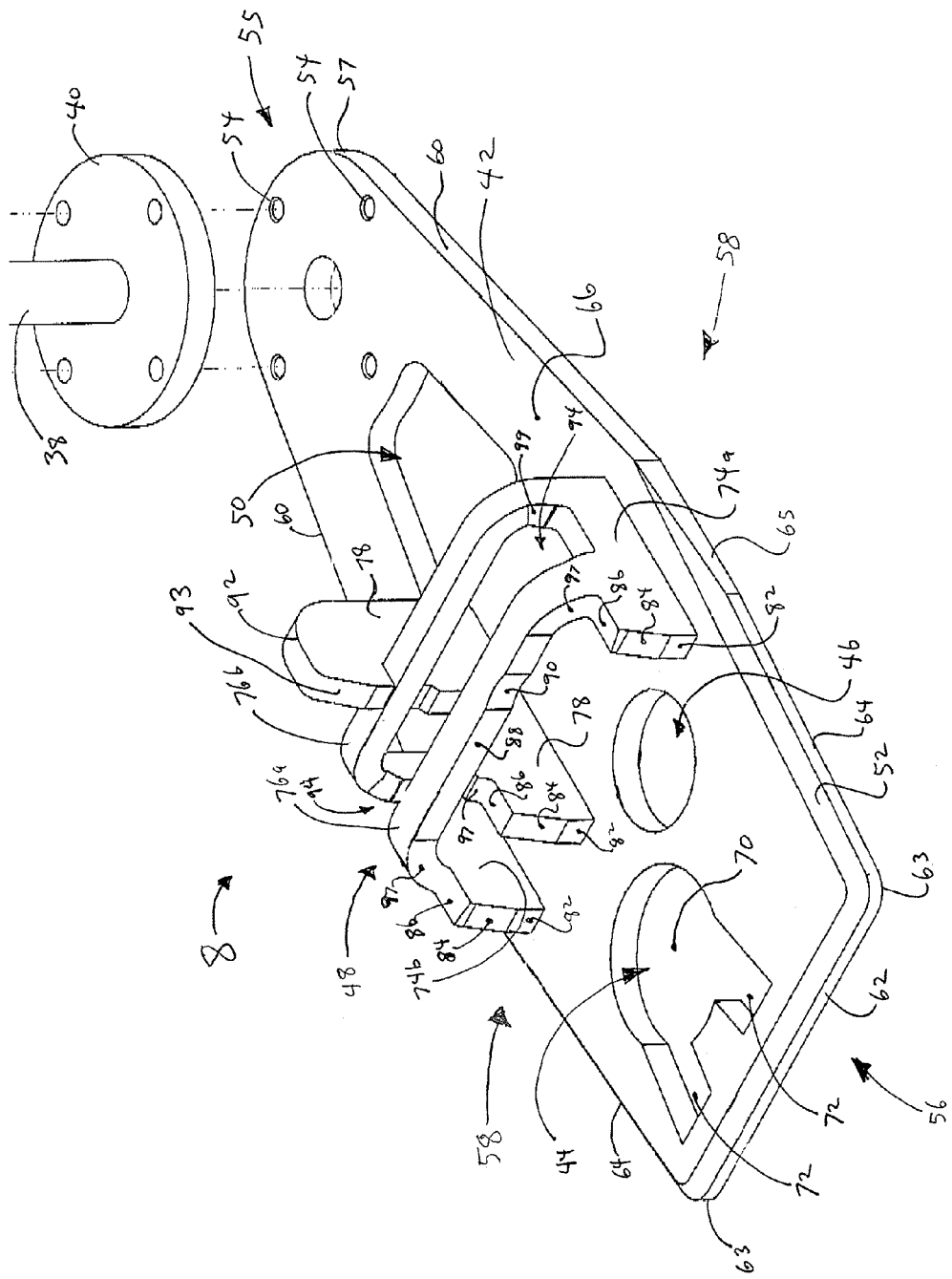
FIG. 4 is an isometric view of the foot, stop plate and shaft depicted in FIG. 2.
Figure 8:
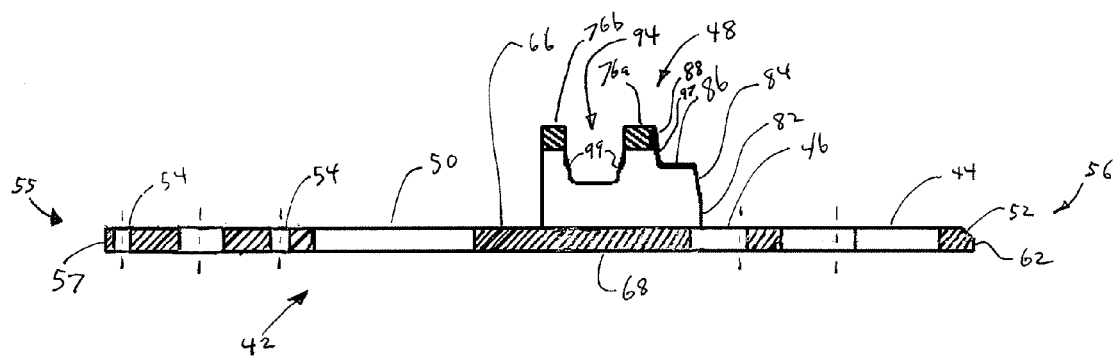
FIG. 8 is a longitudinal cross-sectional elevation of the foot as taken along section line DD.
Figure 7:
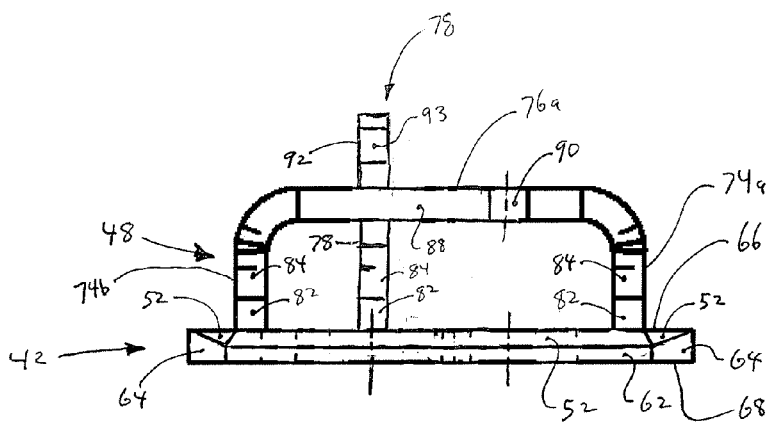
FIG. 7 is an end elevation of the foot as viewed along arrow C in FIG. 5.

For a discussion of features of the foot 8, reference is now made to FIGS. 4-8. FIG. 4 is an isometric view of the foot 8, stop plate 40 and shaft 38 depicted in FIG. 2. FIG. 5 is a top plan view of the foot 8 depicted in FIG. 4. FIG. 6 is a side elevation of the foot 8 as viewed along arrow B in FIG. 5. FIG. 7 is an end elevation of the foot 8 as viewed along arrow C in FIG. 5. FIG. 8 is a longitudinal cross-sectional elevation of the foot 8 as taken along section line DD.

As shown in FIG. 4, the foot 8 includes a plate 42 with a first hitching feature 44, a second hitching feature 46, a third hitching feature 48, a lock slot 50, a tapered edge 52, and a series of bolt holes 54 for connecting the foot 8 to the stop plate 40. As indicated in FIGS. 4 and 5, the plate 42 has a heel end 55, a toe end 56, and two lateral sides 58. The heel end 55 is defined by an arcuate edge 57 that transitions into two diverging rear edges 60 that extend towards the toe end 56 and define the rearward half of each lateral side 58. The toe end 56 is defined by a straight leading edge 62 that runs perpendicular to the longitudinal axis of the plate 42 and transitions about arcuate corners 63 into two diverging front edges 64 that extend towards the heel end 55, define the forward half of each lateral side 58, and join the two diverging rear edges 60 via non-diverging side edges 65.

As shown in FIGS. 4 and 6, the plate 42 includes an upper planar surface 66 and a lower planar surface 68. The third hitching feature 48 extends upwardly from the upper planar surface 66. The tapered edge 52 extends along the two non-diverging side edges 65, the two diverging front edges 64, the two arcuate corners 63, and the straight leading edge 62.

As shown in FIGS. 4 and 8, the first hitching feature 44, the second hitching feature 46 and the lock slot 50 are holes that extend completely through the plate 42. As illustrated in FIGS. 4 and 5, the hole comprising the first hitching feature 44 includes a circular hole portion 70 that extends forwardly towards the toe end 56 via two separate slot portions 72 that diverge from each other. The second hitching feature 46 is defined by a circular hole. The lock slot 50 is defined by a generally trapezoidal hole that has arcuate corners and is narrow at its rearward end and wide at its forward end.

As shown in FIG. 1, when the inner tube 14 and the foot 8 are in their most upward positions, a tab 20 will be received within the lock slot 50. This will prevent the foot 8 and shaft 38 from pivoting. To lock the foot 8 in the forward orientation illustrated in FIG. 1, the forward/middle tab 20 is located within the lock slot 50. To lock the foot 8 in a lateral orientation that is rotated 90 degrees to the right or left from the orientation shown in FIG. 1, the handle 36 is pushed down and pivoted to the right or left. This will cause the foot 8 to clear the front/middle tab 20 and rotate to align with one of the lateral tabs 20. The foot 8 is allowed to return to the upward position and the lateral tab 20 is received within the lock slot 50, thereby locking the foot 8 in the lateral orientation.

As illustrated in FIGS. 4-8, the third hitching feature 48 includes first and second longitudinally extending sidewalls 74a, 74b, front and rear laterally extending bars 76a, 76b, and a middle longitudinally extending wall 78. As indicated in FIGS. 4 and 7, the longitudinally extending sidewalls 74a, 74b extend upwards to transition into the laterally extending bars 76a, 76b.

As shown in FIGS. 4, the walls 74a, 74b, 78 each have a lower face 82 that faces towards the toe end 56 and is adjacent and generally perpendicular to the upper planar surface 66. As indicated in FIGS. 4, 6 and 8, each lower face 82 transitions to a slightly rearwardly sloping section 84 that extends to a ledge 86. Each ledge 86 extends into a front face 88 of the front laterally extending bar 76a. The front face 88 includes an arcuate section 90 that is defined by a radius having the same center point as the circle defining the second hitching feature 46.

As shown in FIGS. 4-8, the middle longitudinally extending wall 78 includes a fin 92 that extends vertically above the level of the laterally extending bars 76a, 76b and includes a sloped leading face 93. As indicated in FIGS. 4, 5, 6 and 8, a groove or slot 94 is defined between the two laterally extending bars 76a, 76b and in each of the longitudinally extending walls 74a, 74b, 78.

Figure 9:
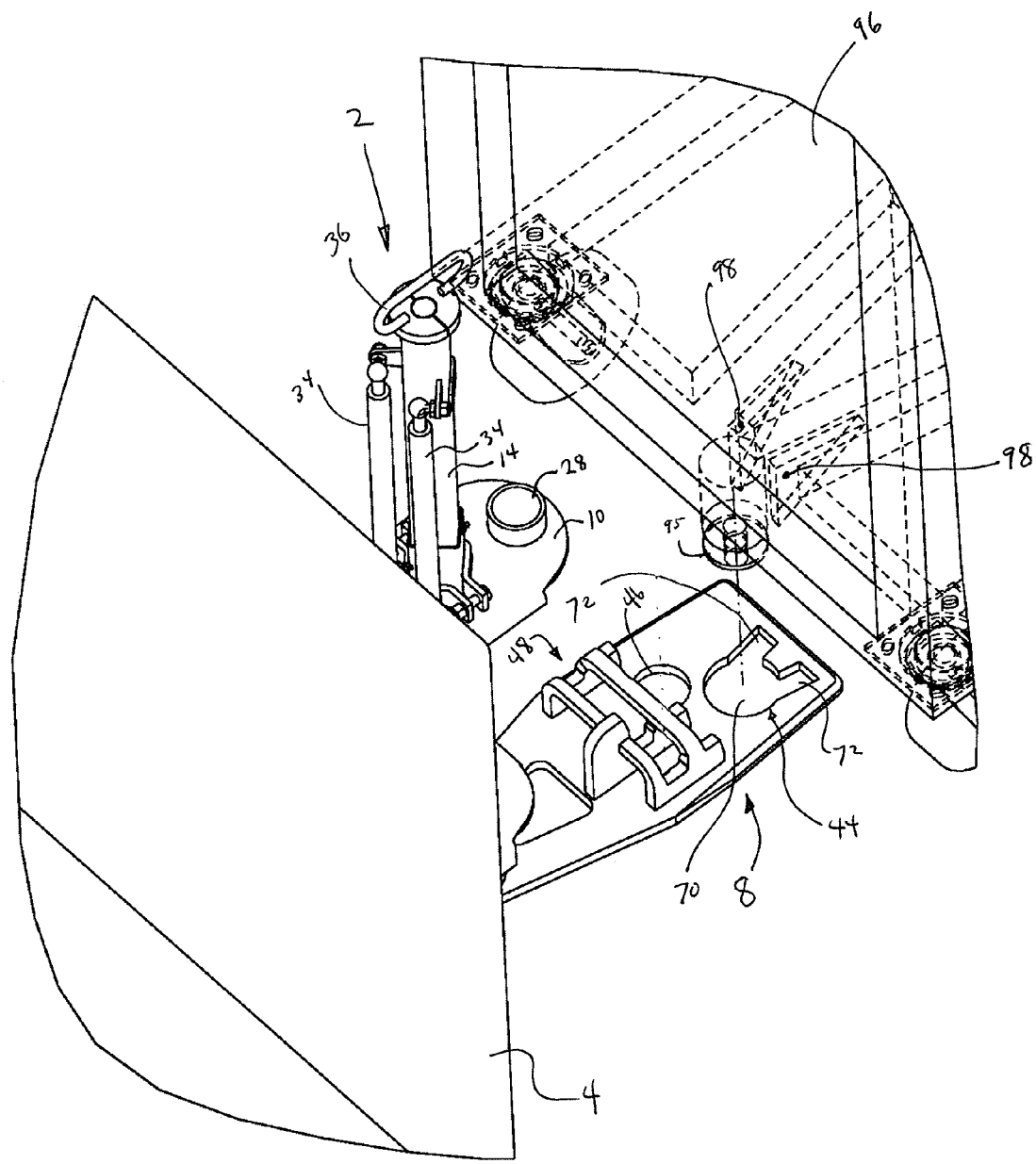
FIG. 9 is an isometric view of the foot approaching the hitch element of a BMC/OTR, Eastern, or 84C Basket cart as utilized by the USPS.
Figure 10:
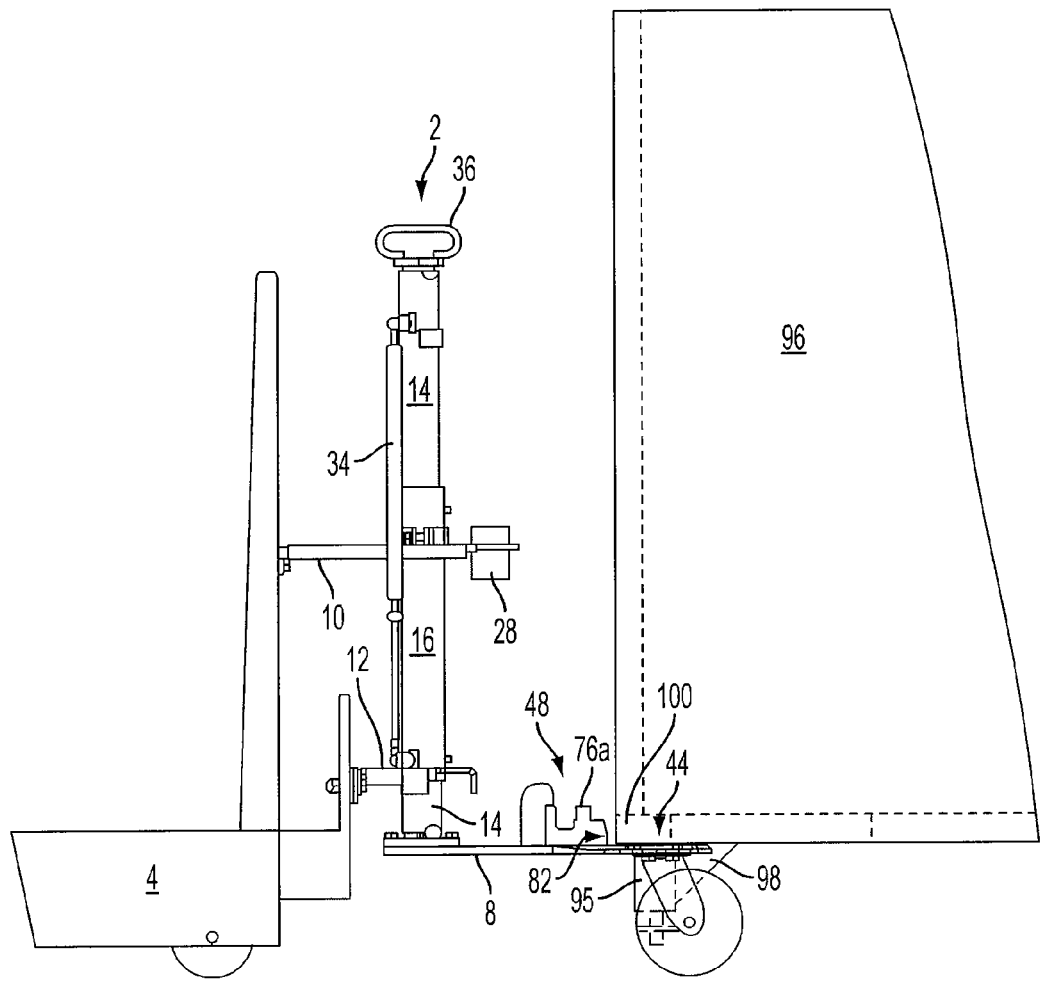
FIG. 10 is a side elevation of the hitch assembly engaged with the cart via the hitch element being received in the first hitching feature.
Figure 11:
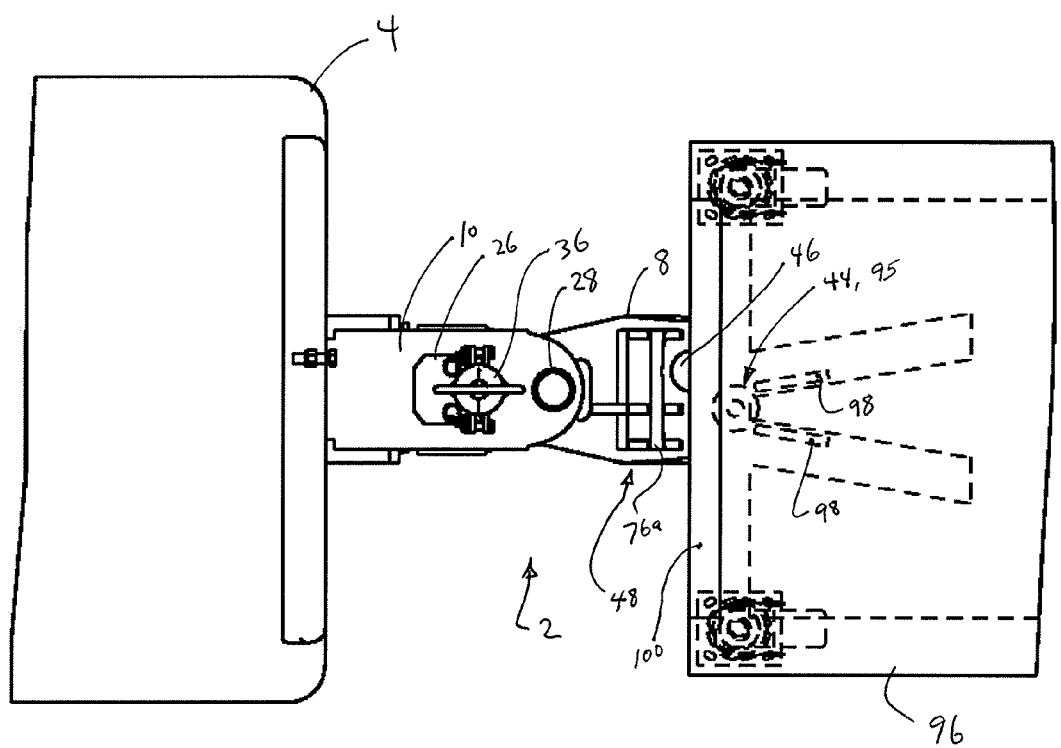
FIG. 11 is top plan view of the hitch assembly engaged with the cart via the hitch element being received in the first hitching feature.

Reference is now made to FIGS. 9-11 for a discussion regarding the hitch assembly 2 being coupled via the first hitching feature 44 to a hitch element 95 of any one of the following cart models 96 utilized by the United States Postal Service ("USPS"): the aluminum BMC/OTR or OTR cart (i.e., the Bulk Mail Center/Over The Road or Over The Road container, USPS #3910); "); the steel BMC/OTR or OTR cart (i.e., the Bulk Mail Center/Over The Road or Over The Road container, USPS #3917); the BMC/OTR Amtrak container (i.e., USPS #3910-A); the BMC/IHC cart (i.e., the Bulk Mail Center/In House container, USPS #3924); the wire basket cart (i.e., USPS #84C); and the ERMC cart (i.e., the Eastern Region Mail Container or USPS #3921 cart).

FIG. 9 is an isometric view of the foot 8 approaching the hitch element 95 of a BMC/OTR, BMC/IHC, 84C, or ERMC cart 96 as utilized by the USPS. FIG. 10 is a side elevation of the hitch assembly 2 engaged with the cart 96 via the hitch element 95 being received in the first hitching feature 44. FIG. 11 is top plan view of the hitch assembly 2 engaged with the cart via the hitch element 95 being received in the first hitching feature 44.

As illustrated in FIGS. 9-11, the hitch element 95 is a cylindrical pin extending downwardly from a bottom portion of the cart 96, and the cart 96 includes two angled reinforcements 98 that extend between the hitch element 95 and the bottom framework of the cart 96. A framework element 100 runs laterally across the cart 96 near the hitch element 95. The framework element 100 has a generally rectangular cross-section. As shown in FIG. 11, the reinforcements 98 diverge from each other in a direction heading towards the center of the cart 96. As can be understood from FIGS. 9 and 11, the hitch element 95 is received within the circular hole portion 70 of the first hitching feature 44 and the reinforcements 98 are received within the slot portions 72 of the first hitching feature 44.

As shown in FIG. 9, the handle 36 is pushed down by the operator to cause the inner tube 14 to telescopically displace down into the outer tube 16 so the foot 8 moves into a lowered position as depicted in FIG. 3. With the foot 8 in the lowered position, the cart mover 4 moves forward to cause the foot 8 to approach the cart 96 and to bring the hitch element 95 into alignment with the first hitching feature 44. Once properly aligned, the downward force from the handle 36 is released and the gas springs 34 return the inner tube 14 and the foot 8 to an upward position, which causes the hitch element 95 to be received within the first hitching feature 44, as shown in FIGS. 10 and 11.

The sloping sections 84 of the walls 74a, 74b, 78 assist the alignment of the lower faces 82 with the framework element 100 as the hitch element 95 is received into the first hitching feature 44. Once the hitching element 95 is received within the first hitching feature 44, the lower faces 82 of the walls 74a, 74b, 78 are in close proximity to a vertical surface of the framework element 100 of the cart 96, as indicated in FIGS. 10 and 11. The close proximity between the faces 82 and the framework element 100 limits relative motion between the foot 8 and the cart 96. This helps to stabilize the cart 96 when coupled to the hitching assembly 2.

The cart mover 4 is now securely coupled to the cart 96 and ready to move the cart 96. To disengage the hitching assembly 2 from the cart 96, the aforementioned process is simply reversed.

Figure 12:
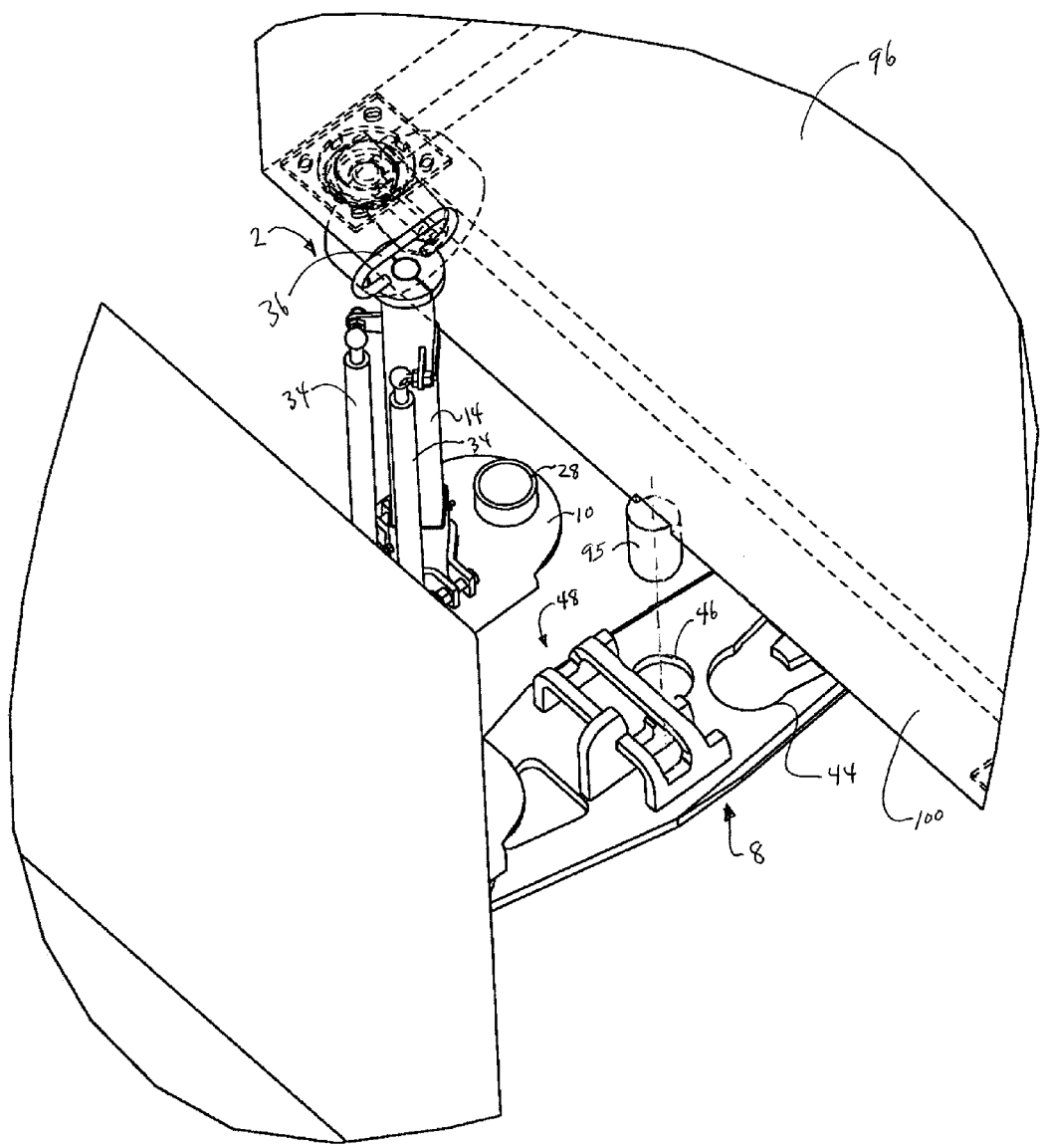
FIG. 12 is an isometric view of the foot approaching the hitch element of an 84C, GPMC, Eastern, or A-frame flat (Ergo) cart as utilized by the USPS.
Figure 13:
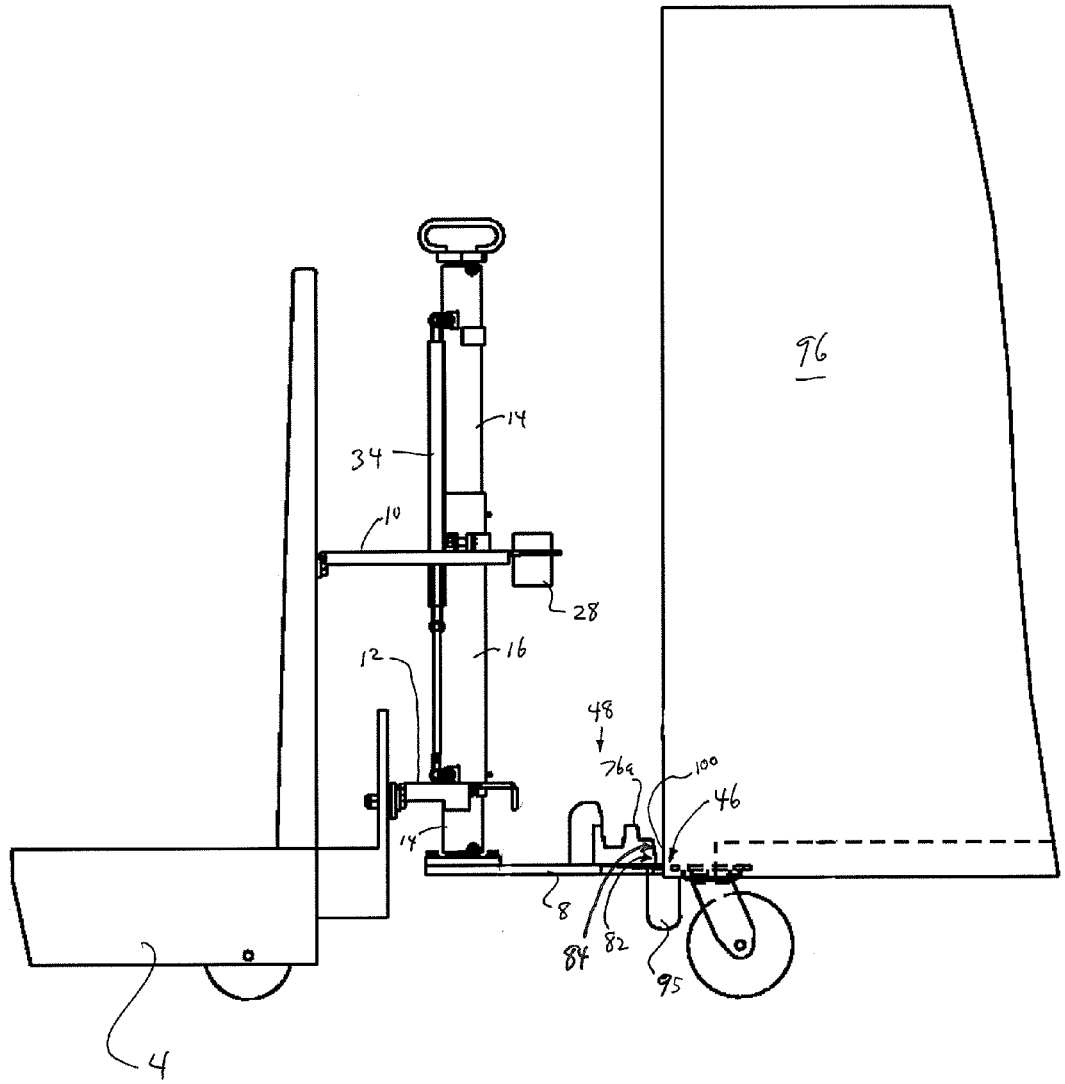
FIG. 13 is a side elevation of the hitch assembly engaged with the cart via the hitch element being received in the second hitching feature.
Figure 14:
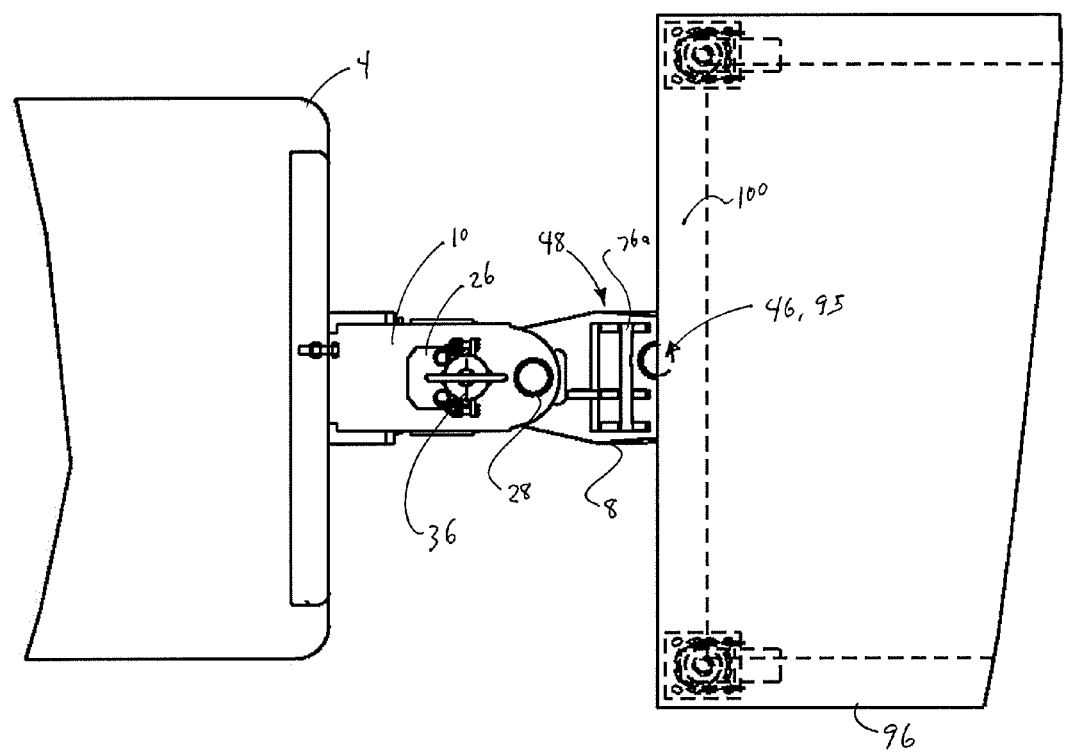
FIG. 14 is top plan view of the hitch assembly engaged with the cart via the hitch element being received in the second hitching feature.

Reference is now made to FIGS. 12-14 for a discussion regarding the hitch assembly 2 being coupled via the second hitching feature 46 to a hitch element 95 of any one of the following cart models 96 utilized by the USPS: the wire basket cart (i.e., USPS #84C); the GPMC cart (i.e., the General Purpose Mail Container, USPS #3909); the ERMC cart (i.e., the Eastern Region Mail Container or USPS #3921 cart); and the A-frame flat cart (Ergo)

FIG. 12 is an isometric view of the foot 8 approaching the hitch element 95 of an 84C wire basket, a GPMC, an ERMC, or an A-frame flat (Ergo) cart 96 as utilized by the USPS. FIG. 13 is a side elevation of the hitch assembly 2 engaged with the cart 96 via the hitch element 95 being received in the second hitching feature 46. FIG. 14 is top plan view of the hitch assembly 2 engaged with the cart via the hitch element 95 being received in the second hitching feature 46.

As illustrated in FIGS. 12-14, the hitch element 95 of one of the aforementioned carts 96 is a cylindrical pin that extends downwardly from a bottom portion of a cart 96. In the context of an 84C wire basket cart, the pin 95 will include a circular washer plate extending perpendicularly from the circumferential surface of the pin approximately midway along the length of the pin 95 (see FIGS. 39 and 40).

As indicated in FIGS. 12-14, a framework element 100 runs laterally across the cart 96 near the hitch element 95. The framework element 100 has a generally rectangular cross-section. As can be understood from FIGS. 12 and 14, the hitch element 95 is received within the circular hole of the second hitching feature 46.

As shown in FIG. 12, the handle 36 is pushed down by the operator to cause the inner tube 14 to telescopically displace down into the outer tube 16 so the foot 8 moves into a lowered position as depicted in FIG. 3. With the foot 8 in the lowered position, the cart mover 4 moves forward to cause the foot 8 to approach the cart 96 and to bring the hitch element 95 into alignment with the second hitching feature 46. Once properly aligned, the downward force from the handle 36 is released and the gas springs 34 return the inner tube 14 and the foot 8 to an upward position, which causes the hitch element 95 to be received within the second hitching feature 46, as shown in FIGS. 13 and 14.

The sloping sections 84 of the walls 74a, 74b, 78 assist the alignment of the lower faces 82 with the framework element 100 as the hitch element 95 is received into the second hitching feature 46. Once the hitching element 95 is received within the second hitching feature 46, the lower faces 82 of the walls 74a, 74b, 78 are in close proximity to a vertical surface of the framework element 100 of the cart 96, as indicated in FIGS. 13 and 14. The close proximity between the faces 82 and the framework element 100 limits relative motion between the foot 8 and the cart 96. This helps to stabilize the cart 96 when coupled to the hitching assembly 2.

The cart mover 4 is now securely coupled to the cart 96 and ready to move the cart 96. To disengage the hitching assembly 2 from the cart 96, the aforementioned process is simply reversed.

Figure 15:
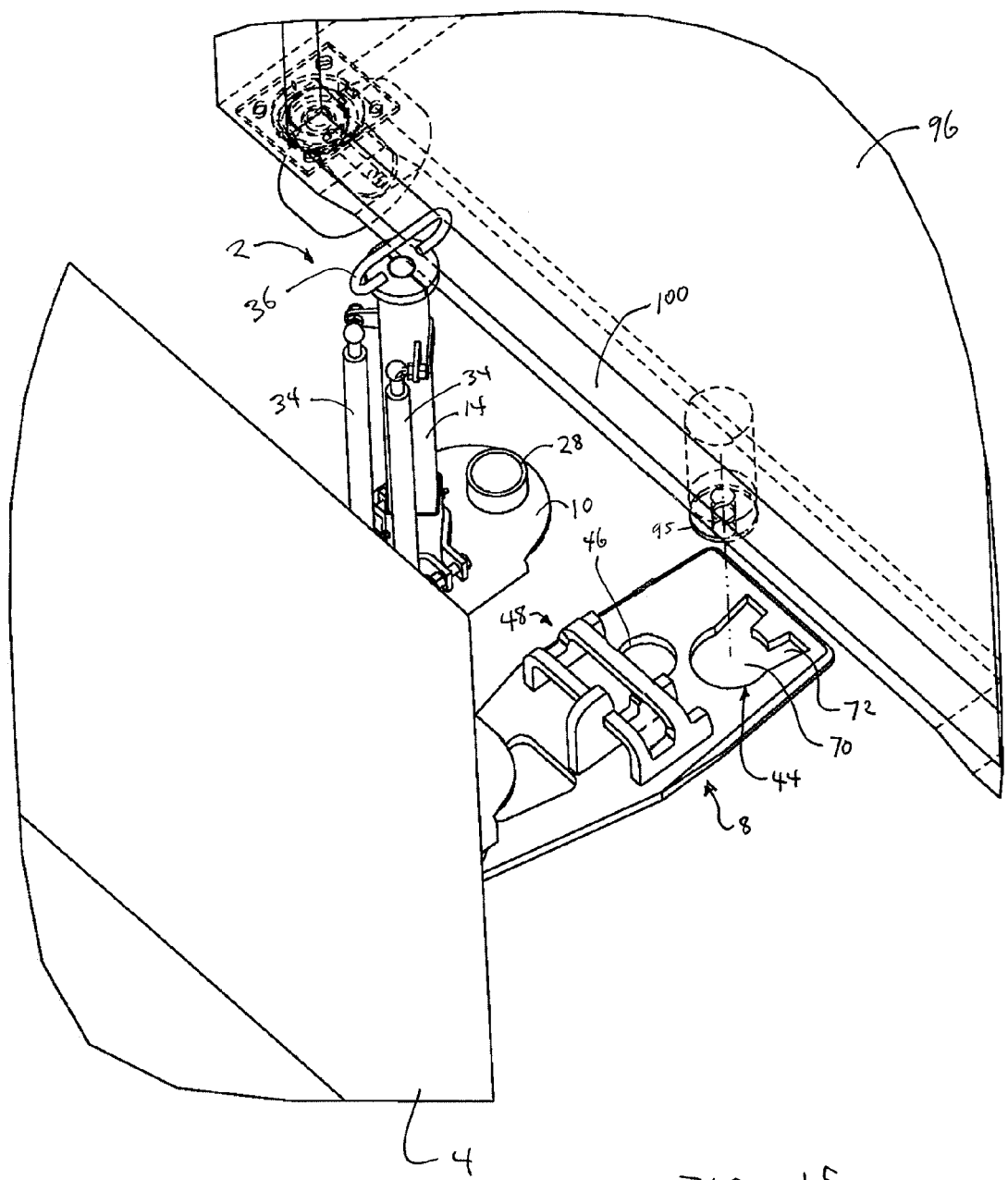
FIG. 15 is an isometric view of the foot approaching the hitch element of an old Minneapolis basket cart as utilized by the USPS.
Figure 16:
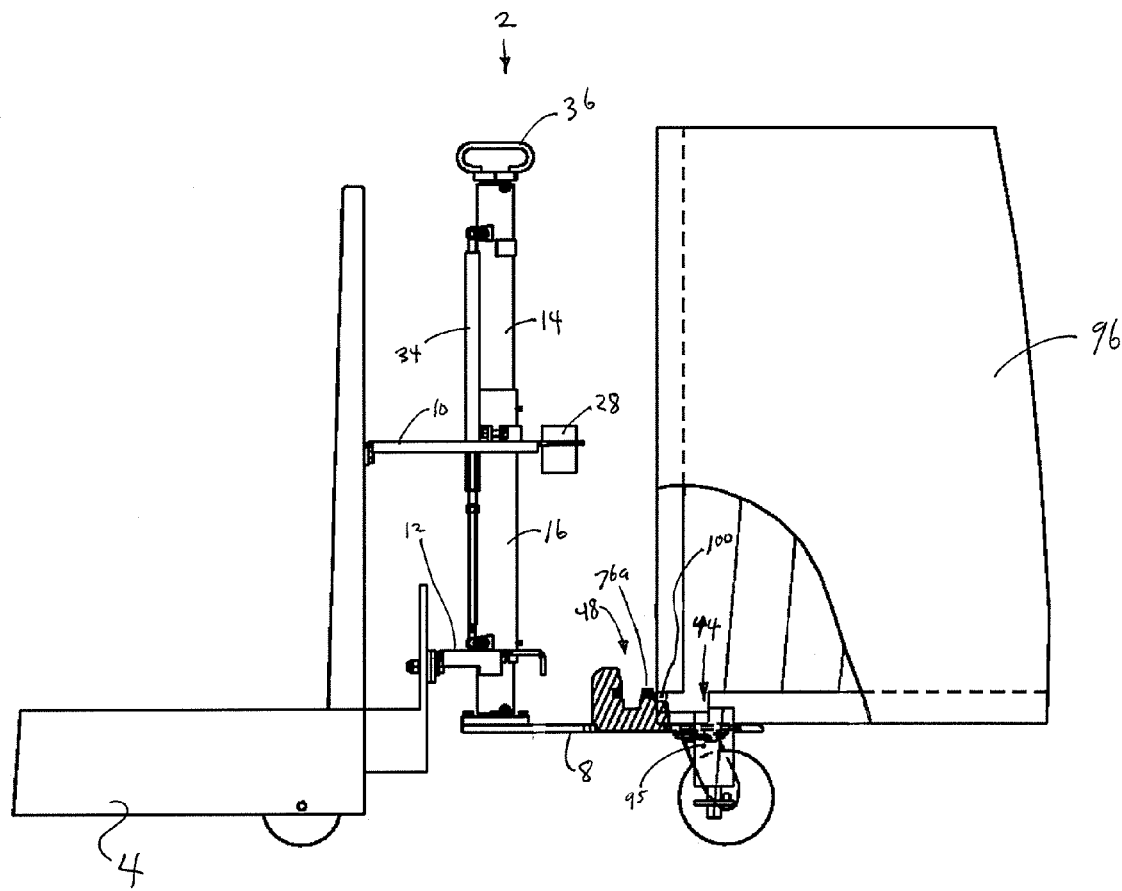
FIG. 16 is a side elevation of the hitch assembly engaged with the cart via the hitch element being received in the first hitching feature, wherein the side elevation of this figure includes a cross-section elevation along the longitudinal length of the middle longitudinally extending wall of the third hitching feature.
Figure 17:
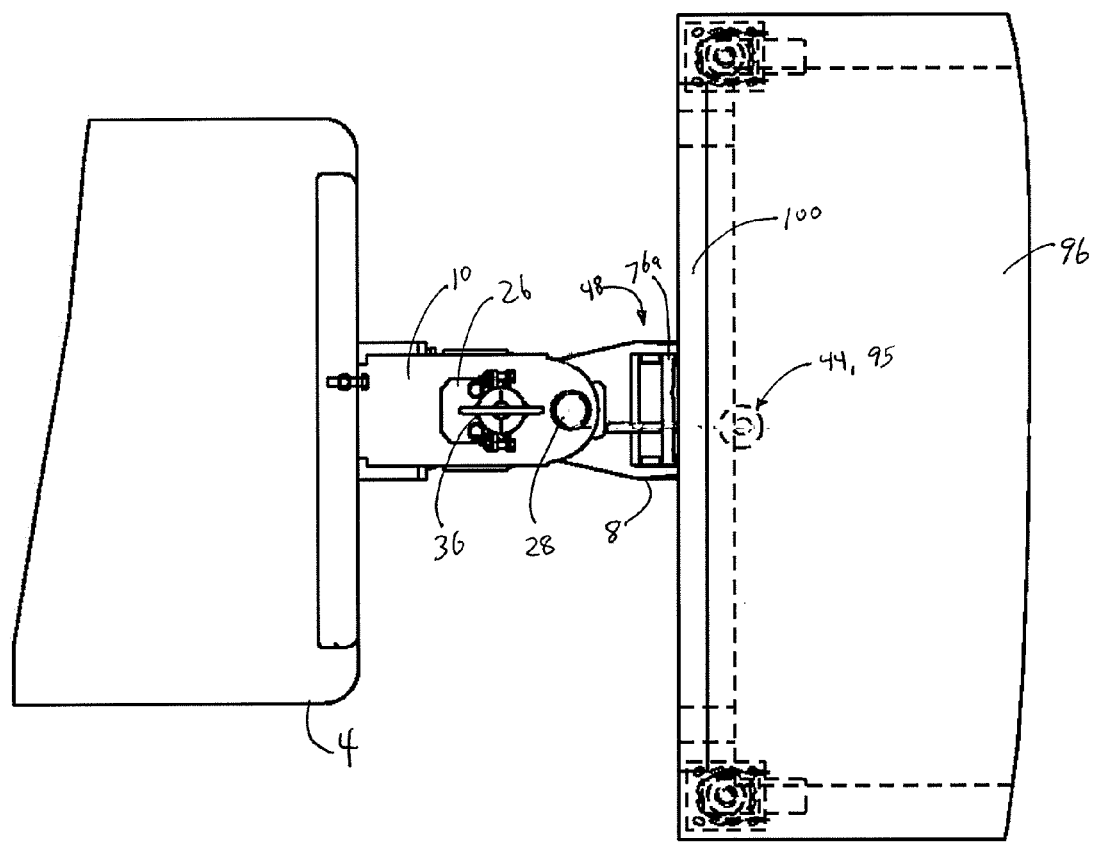
FIG. 17 is top plan view of the hitch assembly engaged with the cart via the hitch element being received in the first hitching feature.

Reference is now made to FIGS. 15-17 for a discussion regarding the hitch assembly 2 being coupled via the first hitching feature 44 to a hitch element 95 of the following cart model 96 utilized by the USPS: the old Minneapolis wire basket cart (i.e., USPS #0112). FIG. 15 is an isometric view of the foot 8 approaching the hitch element 95 of an old Minneapolis basket cart 96 as utilized by the USPS. FIG. 16 is a side elevation of the hitch assembly 2 engaged with the cart 96 via the hitch element 95 being received in the first hitching feature 44, wherein the side elevation of this figure includes a cross-section elevation along the longitudinal length of the middle longitudinally extending wall 78 of the third hitching feature 48. FIG. 17 is top plan view of the hitch assembly 2 engaged with the cart via the hitch element 95 being received in the first hitching feature 44.

As illustrated in FIGS. 15-17, the hitch element 95 is a cylindrical pin extending downwardly from a bottom portion of the cart 96, and the cart 96 includes a framework element 100 that runs laterally across the cart 96 near the hitch element 95. As shown in FIG. 17, the framework element 100 has a generally rectangular cross-section. As can be understood from FIGS. 15 and 17, the hitch element 95 is received within the circular hole portion 70 of the first hitching feature 44. As can be understood from FIGS. 16 and 17, the framework element 100 extends across the ledges 86 of the third hitch element 48 and abuts against the front face 88 of the laterally extending bar 76a of the third hitch element 48 (see FIG. 4). This helps to stabilize the cart 96 when coupled to the hitching assembly 2.

As shown in FIG. 15, the handle 36 is pushed down by the operator to cause the inner tube 14 to telescopically displace down into the outer tube 16 so the foot 8 moves into a lowered position as depicted in FIG. 3. With the foot 8 in the lowered position, the cart mover 4 moves forward to cause the foot 8 to approach the cart 96 and to bring the hitch element 95 into alignment with the first hitching feature 44. Once properly aligned, the downward force from the handle 36 is released and the gas springs 34 return the inner tube 14 and the foot 8 to an upward position, which causes the hitch element 95 to be received within the first hitching feature 44, as shown in FIGS. 16 and 17. The cart mover 4 is now securely coupled to the cart 96 and ready to move the cart 96. To disengage the hitching assembly 2 from the cart 96, the aforementioned process is simply reversed.

Figure 18:
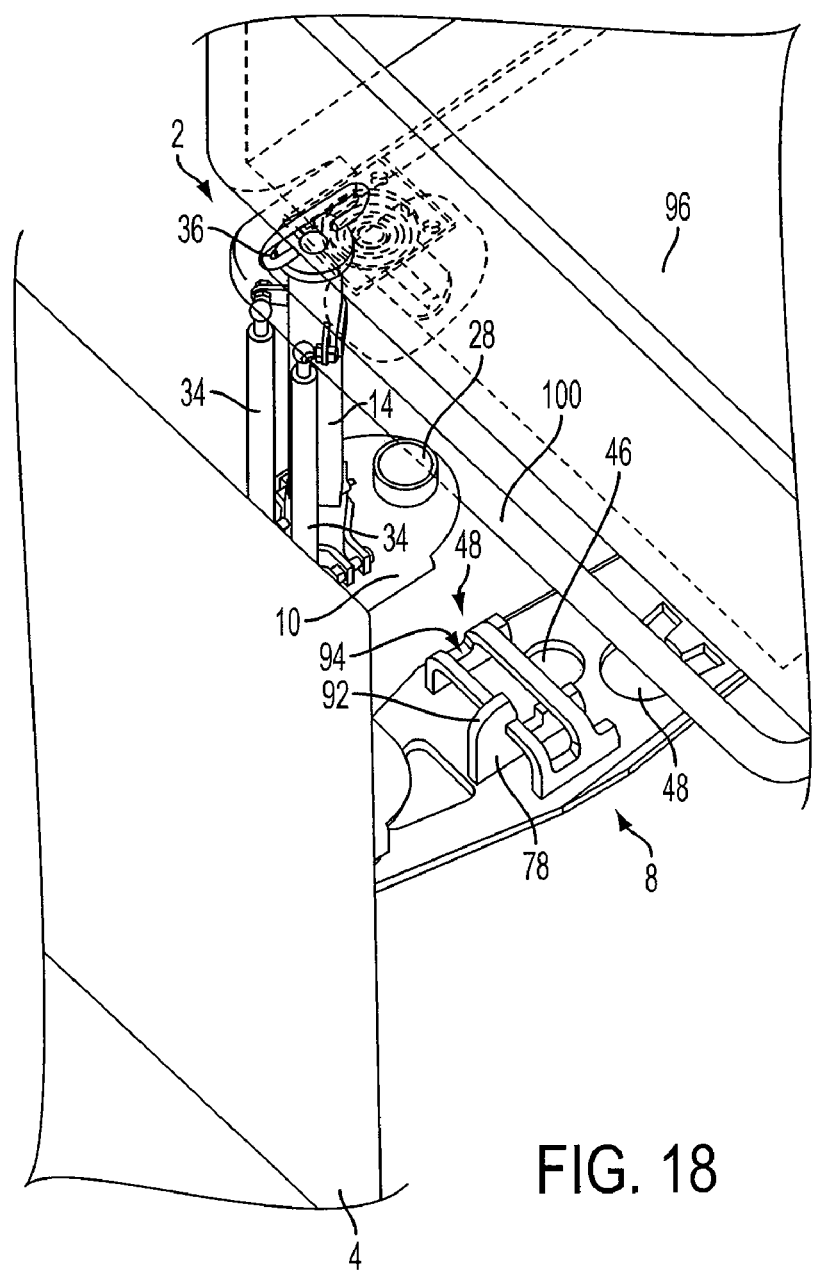
FIG. 18 is an isometric view of the foot approaching the framework element of a Hamper-orange side cart as utilized by the USPS.
Figure 19:
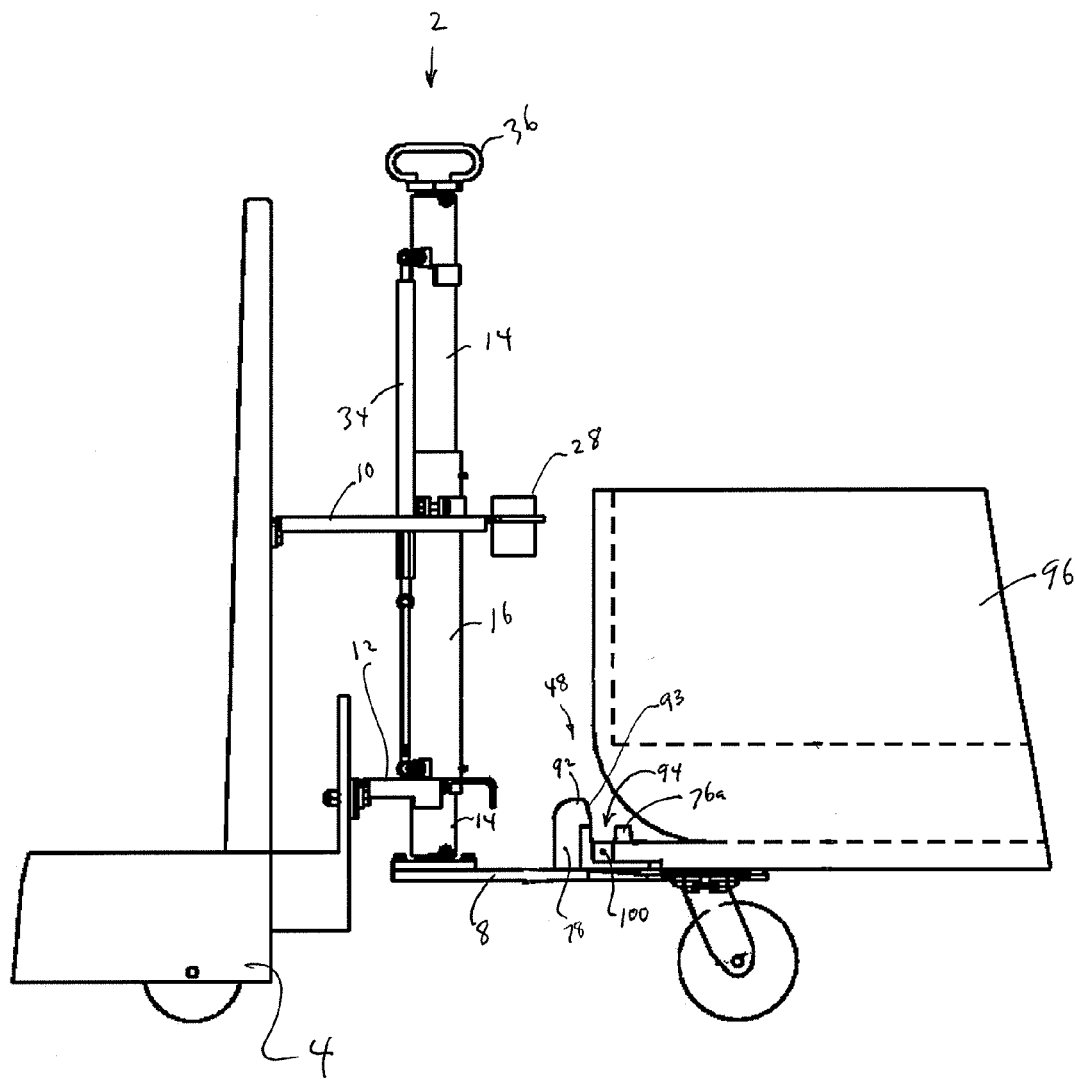
FIG. 19 is a side elevation of the hitch assembly engaged with the cart via the framework element being received in the groove/slot of the third hitching feature.
Figure 20:
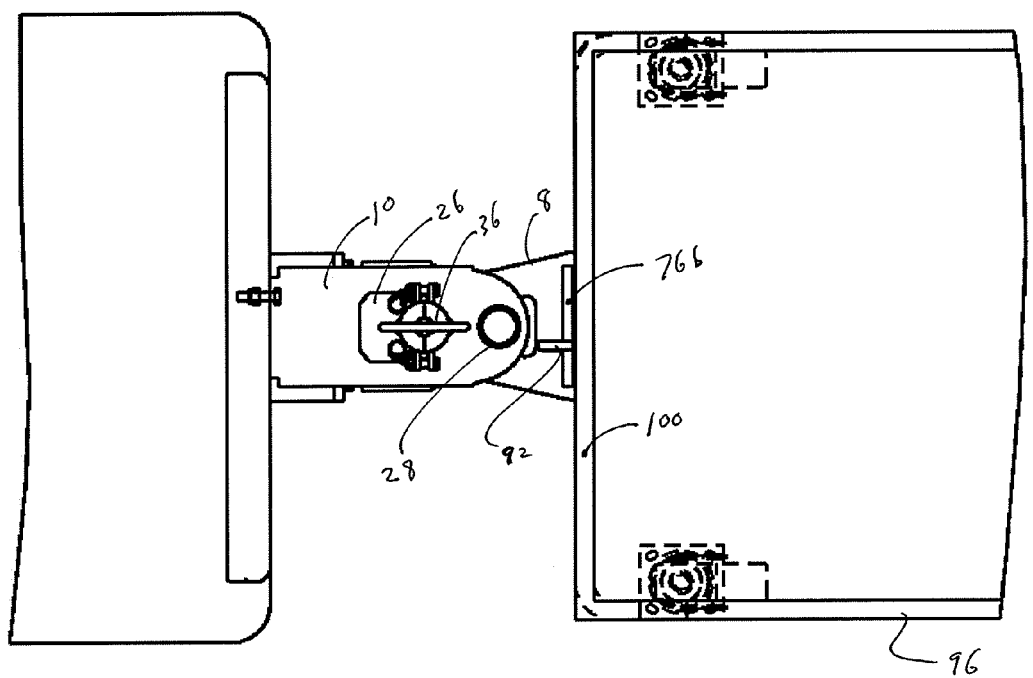
FIG. 20 is top plan view of the hitch assembly engaged with the cart via the framework element being received in the groove/slot of the third hitching feature.

Reference is now made to FIGS. 18-20 for a discussion regarding the hitch assembly 2 being coupled via the third hitching feature 48 to a framework element 100 of the following cart model 96 utilized by the USPS: the Hamper-Orange side cart. FIG. 18 is an isometric view of the foot 8 approaching the framework element 100 of a Hamper-orange side cart 96 as utilized by the USPS. FIG. 19 is a side elevation of the hitch assembly 2 engaged with the cart 96 via the framework element 100 being received in the groove/slot 94 of the third hitching feature 48. FIG. 20 is top plan view of the hitch assembly 2 engaged with the cart via the framework element 100 being received in the groove/slot 94 of the third hitching feature 48.

As illustrated in FIGS. 18-20, the framework element 100 is a bar or tube that runs laterally across the cart 96. As shown in FIG. 20, the framework element 100 has a generally rectangular cross-section. As can be understood from FIGS. 18 and 20, the framework element 100 is received within the groove/slot 94 of the third hitching feature 48. As can be understood from FIGS. 19 and 20, the sloped leading face 93 of the fin 92 of the middle longitudinally extending wall 78 helps to guide the framework element 100 into the groove/slot 94 when the foot 8 approaches the cart 96 (see FIG. 4).

As shown in FIG. 18, the handle 36 is pushed down by the operator to cause the inner tube 14 to telescopically displace down into the outer tube 16 so the foot 8 moves into a lowered position as depicted in FIG. 3. With the foot 8 in the lowered position, the cart mover 4 moves forward to cause the foot 8 to approach the cart 96 and to bring the framework element 100 against the sloped leading face 93 of the fin 92 and into alignment with the groove/slot 94 of the third hitching feature 48. Once properly aligned, the downward force from the handle 36 is released and the gas springs 34 return the inner tube 14 and the foot 8 to an upward position, which causes the framework element 100 to be received within the groove/slot 94 of the third hitching feature 48, as shown in FIGS. 19 and 20. The cart mover 4 is now securely coupled to the cart 96 and ready to move the cart 96. To disengage the hitching assembly 2 from the cart 96, the aforementioned process is simply reversed.

As best understood from FIGS. 4, 6 and 8, the foot 8 has rearward sloping sections 84 between the ledges 86 and the lower faces 82, rearward sloping sections 97 between the ledges 86 and the front faces 88, and sloping surfaces 99 helping to define the slot/groove 94. These sloping surfaces 84, 97, 99 are angled to allow the mover 4, when hitched to a cart 96, to be at a slight angle relative to the cart 96 as the mover 4 displaces the cart 96 on a sloped floor, which are commonly found in a factory environment.

Figure 21:
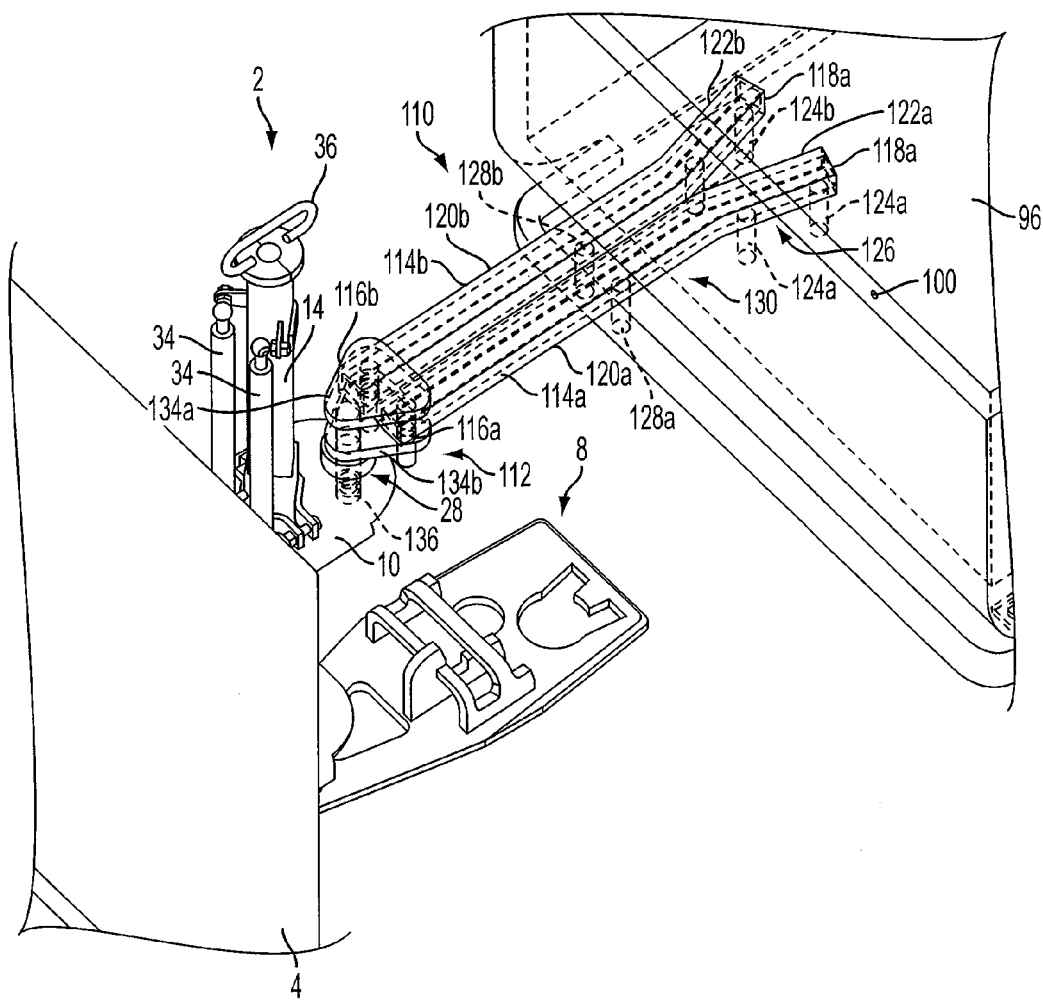
FIG. 21 is an isometric view of a hitch bar extending between the hitch assembly and the framework element of a Hamper wood and canvas cart as utilized by the USPS.
Figure 22:
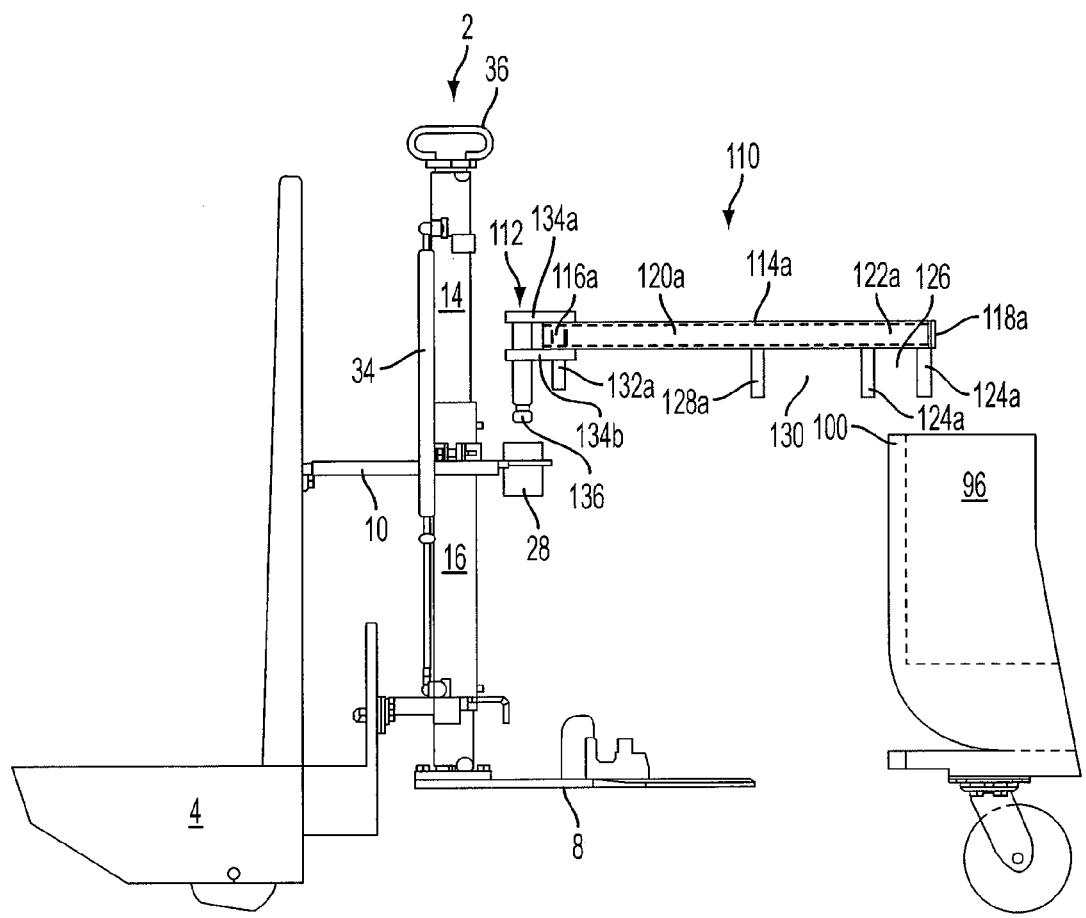
FIG. 22 is a side elevation of the hitch bar being positioned for connection to the hitch assembly and the cart.
Figure 23:
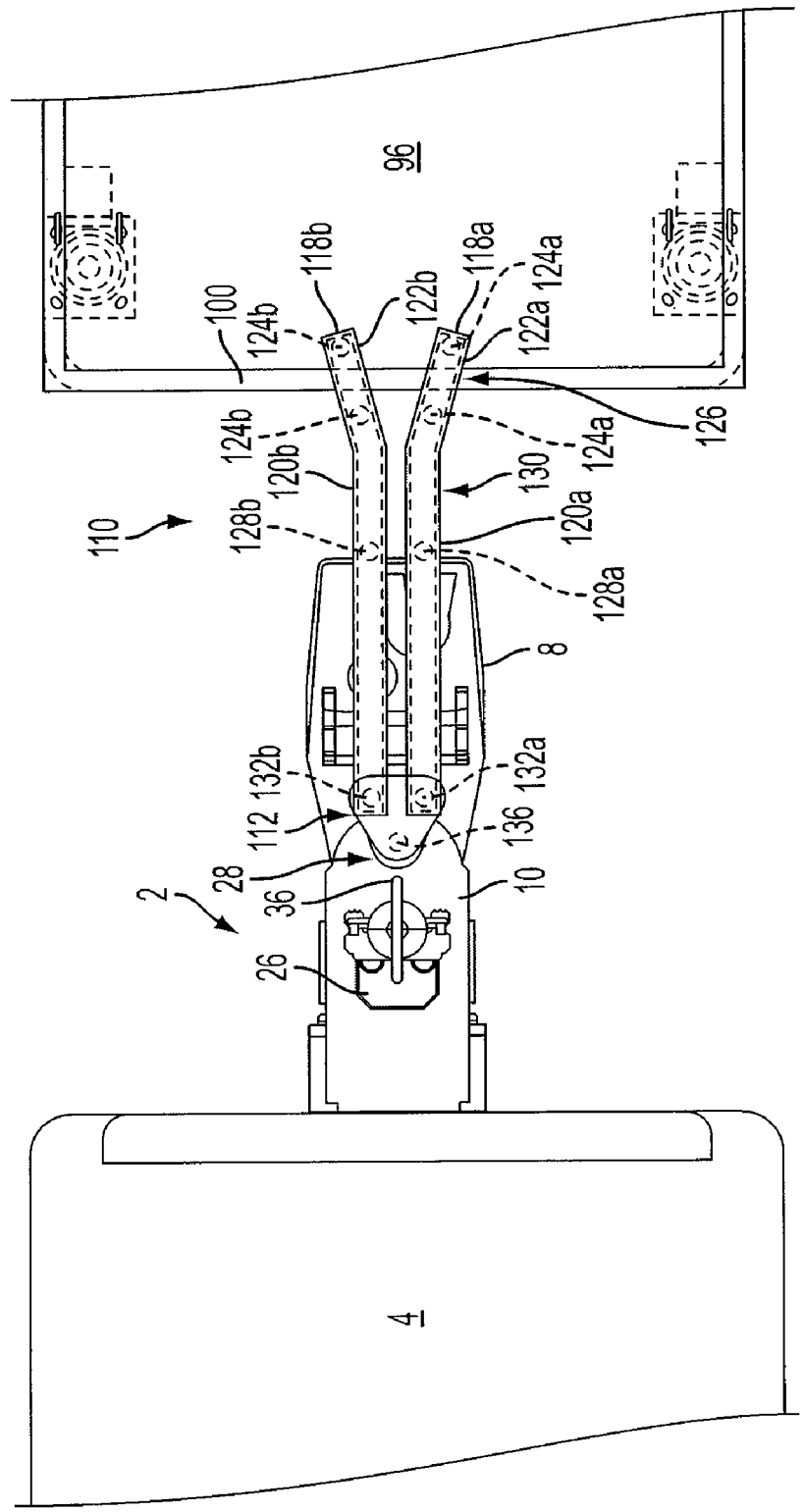
FIG. 23 is top plan view of the hitch bar extending between the hitching assembly and the framework element of the cart.

Reference is now made to FIGS. 21-23 for a discussion regarding the hitch assembly 2 being coupled via a hitch bar 110 to a framework element 100 of the following cart model 96 utilized by the USPS: the Hamper wood and canvas cart (i.e., the USPS #1046/1033). FIG. 21 is an isometric view of the a hitch bar 110 extending between the hitch assembly 2 and the framework element 100 of a Hamper wood and canvas cart 96 as utilized by the USPS. FIG. 22 is a side elevation of the hitch bar 110 being positioned for connection to the hitch assembly 2 and the cart 96. FIG. 23 is top plan view of the hitch bar 110 extending between the hitching assembly 2 and the framework element 100 of the cart 96.

As shown in FIGS. 21-23, in one embodiment, the hitch bar 110 includes a pivot assembly 112 and first and second arms 114a, 114b that extend parallel and adjacent to each other from the pivot assembly 112 to couple with the framework element 100. Each arm 114a, 114b includes a proximal end 116a, 116b and a distal end 118a, 118b. Each proximal end 114a, 114b connects to the pivot assembly 112, and each distal end 118a, 118b is adjacent to the cart 96 when the hitch bar 110 is coupled to the cart 96. In one embodiment, the connection between each proximal end 114a, 114b and the pivot assembly 112 is a pivot connection, which allows the arms 114a, 114b to pivotally diverge from each other.

Each arm 114a, 114b includes a proximal section 120a, 120b that comprises substantially most of the length of each arm 114a, 114b and runs parallel to the proximal section 120a, 120b of the adjacent arm 114a, 114b. Each arm also includes a distal section 122a, 122b that diverges away from the distal section 122a, 122b of the adjacent arm 114a, 114b.

Each distal section 122a, 122b includes a pair of downward extending attachment pins 124a, 124b that define a first gap 126 for receiving the framework element 100 therein. Each proximal section 120a, 120b includes an attachment pin 128a, 128b that defines a second gap 130 between said attachment pin 128a, 128b and the most proximal attachment pin 124a, 124b of the distal section 122a, 122b.

The pivot assembly 112 includes first and second pins 132a, 132b, upper and lower plates 134a, 134b, and a pivot pin 136. The first and second pins 132a, 132b extend between the upper and lower plates 118a, 118b to couple the proximal end 116a, 116b of each arm 114a, 114b between the plates 118a, 118b. In one embodiment, each pin 132a, 132b extends below the lower plate 134. The pivot pin 136 extends downwardly from the pivot assembly 112 and is pivotally receivable within the tube 28 on the hitch assembly 2.

As shown in FIGS. 21-23, the mover 4 is maneuvered into close proximity to a cart 96, the hitch bar 110 is positioned such that framework element 100 resides in the gap 126 defined by the pins 124a, 124b of the distal ends 122a, 122b of the arms 114a, 114b. The pivot pin 136 is pivotally received in the tube 28. The mover 4 is now hitched to the cart 96. The aforementioned process is simply reversed to unhitch the mover 4 from the cart 96.

Figure 24:
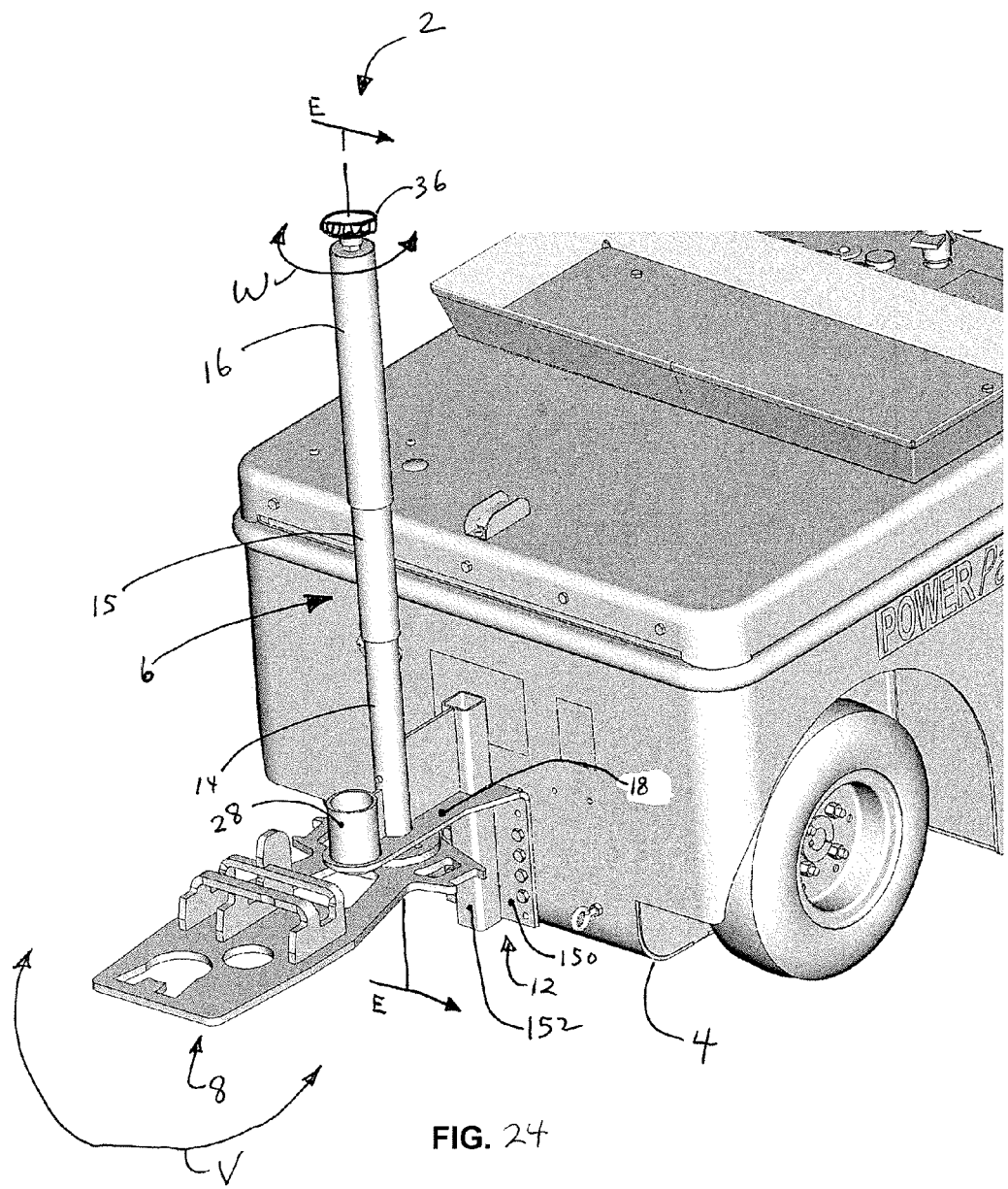
FIG. 24 is an isometric view of the hitch assembly connected to the front portion of the mover.
Figure 25:
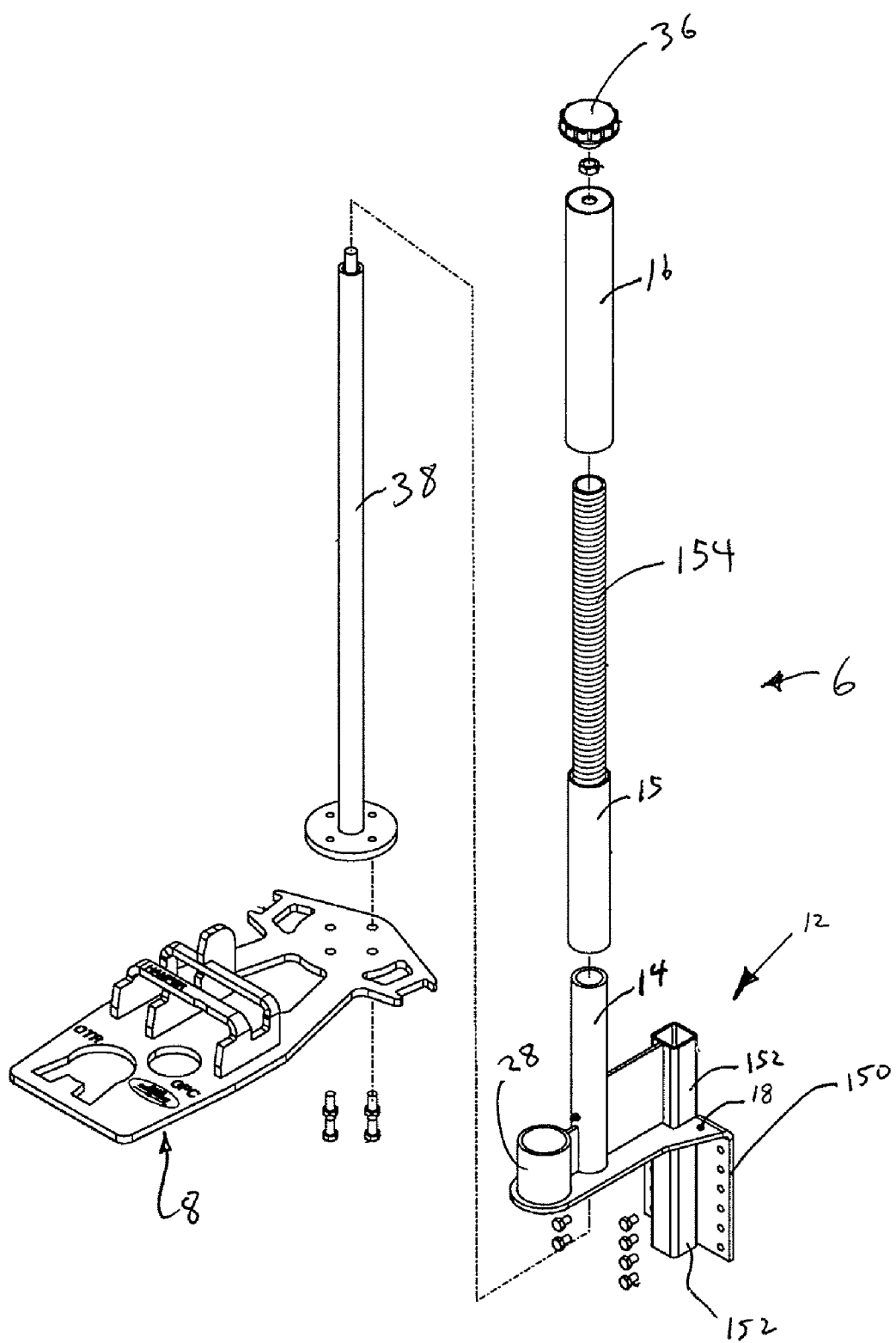
FIG. 25 is an exploded isometric view of the hitch assembly depicted in FIG. 24.
Figure 26:
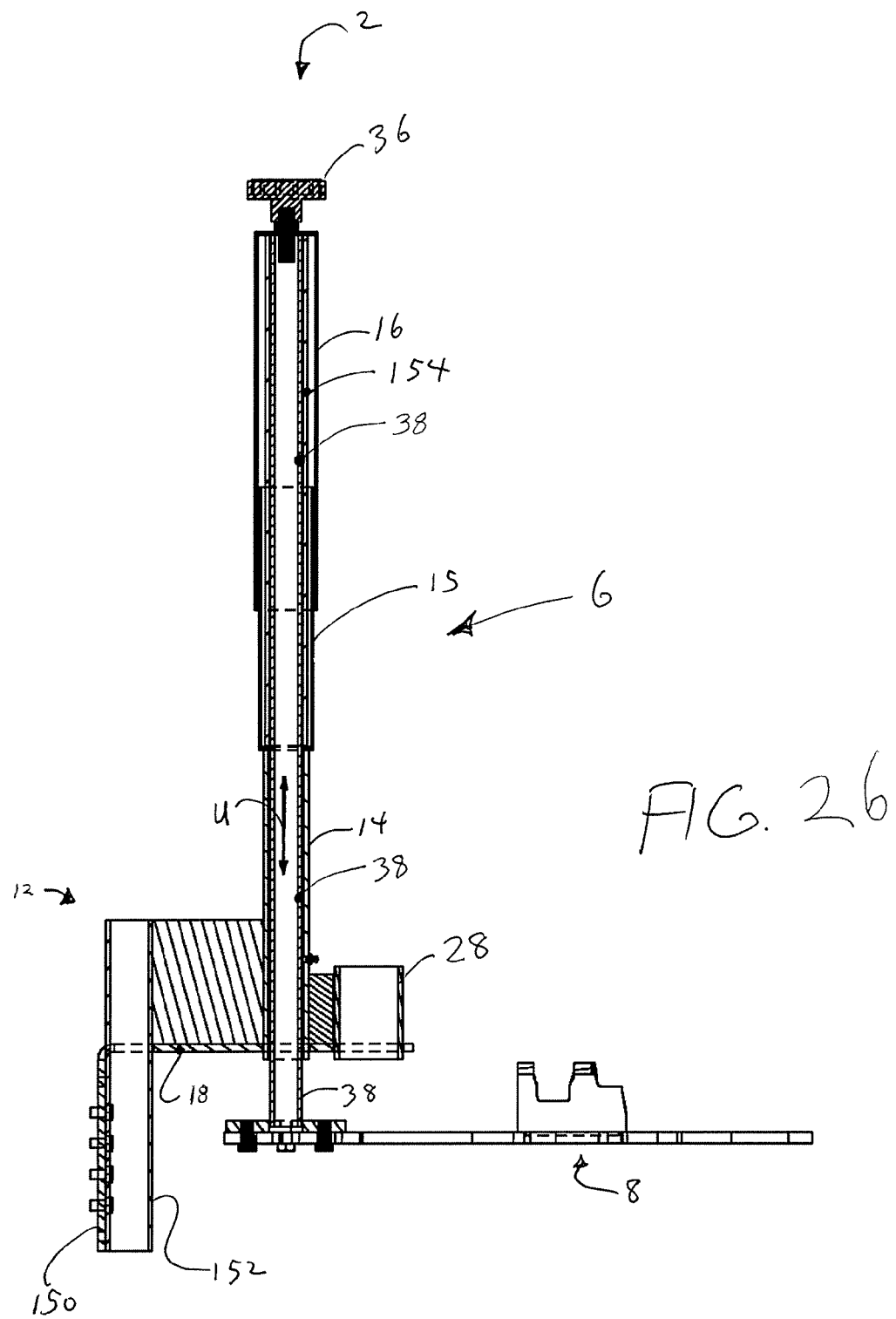
FIG. 26 is a sectional elevation of the hitch assembly taken along section line EE in FIG. 24.

For a detailed discussion of another embodiment of the hitch assembly 2, reference is now made to FIGS. 24-26. FIG. 24 is an isometric view of the hitch assembly 2 connected to the front portion of the mover 4. FIG. 25 is an exploded isometric view of the hitch assembly 2 depicted in FIG. 24. FIG. 26 is a sectional elevation of the hitch assembly 2 taken along section line EE in FIG. 24.

As shown in FIG. 24, in one embodiment, the hitch assembly 2 is adapted for connection to a non-rideable motorized cart mover 4. In one embodiment, the non-rideable motorized cart mover 4 is a Power Pal 3100 as manufactured by Dane Industries, 5400 Nathan Lane N., Suite 150, Plymouth, Minn. 55442.

As indicated in FIGS. 24-26, the hitch assembly 2 includes a vertical telescopic tube 6, a foot 8 and a mount 12. The mount includes an inner tube 14. The telescopic tube 6 includes an intermediate tube 15 and an outer tube 16. In one embodiment, the tubes 14, 15, 16 have circular cross-sections. As shown in FIGS. 24 and 26, the lower end of the intermediate tube 15 extends over the upper end of the inner tube 14, and the lower end of the outer tube 16 extends over the upper end of the intermediate tube 15.

As illustrated in FIGS. 24-26, the mount 12 connects to the inner tube 14 near its lower end. The mount 12 attaches to the front portion of the mover 4 via a mounting plate 150. In one embodiment, the mount 12 includes a generally horizontal plate 18. In one embodiment, the lower end of the inner tube 14 extends through a hole 26 in the plate 18 of the mount 12. A short cylindrical tube 28 extends vertically through the plate 18 of the mount 12 and is configured to receive the pivot pin 136 of the hitch bar 110 described above with respect to FIGS. 21-23. The horizontal plate 18 is coupled to the mounting plate 150, which includes a reinforcement tube 152 that extends vertically along the mounting plate 150 and through the horizontal plate 18. In one embodiment, the reinforcement tube 152 has a square cross-section.

As indicated in FIGS. 25 and 26, biasing member 154, such as a helical spring 154, is co-axially located within the intermediate and outer tubes 15, 16 to maintain the outer tube 16 in an upwardly biased position. As shown in FIGS. 24-26, a hitch alignment knob 36 caps off the top of the outer tube 16. As shown in FIGS. 26, the knob 36 is connected to an upper end of a shaft 38 that extends down through the tubes 14, 15, 16. The bottom end of the shaft 38 connects to a stop plate 40, which is connected to the foot 8. The shaft 38 is pivotably displaceable within the tubes 14, 15, 16 such that the foot 8 and knob 36 are pivotable in horizontal planes about the vertical axis of the shaft 38, as indicated by arrows V and W in FIG. 24.

As can be understood from FIG. 26 and the preceding discussion, the shaft 38 and the outer tube 16 are vertically displaceable as a unit (as indicated by arrow U) such that the outer tube 16 passes over the intermediate tube 15. As shown in FIG. 26, when the outer tube 16 is displaced downwardly over the intermediate tube 15 against the upward force exerted by the helical spring 154, a bottom portion of the shaft 38 will extend downwardly out the inner tube 14 and the top horizontal surface of the foot 8 will displace away from the bottom horizontal surface of the horizontal plate 24. As can be understood from FIG. 26, when the helical spring 154 is allowed to return the outer tube 16 to the upwardly extended position shown in FIG. 1, the stop plate 40 will abut against the lower end of the inner tube 14, thereby preventing the outer tube 16 from overly extending upwards.

Figure 27:
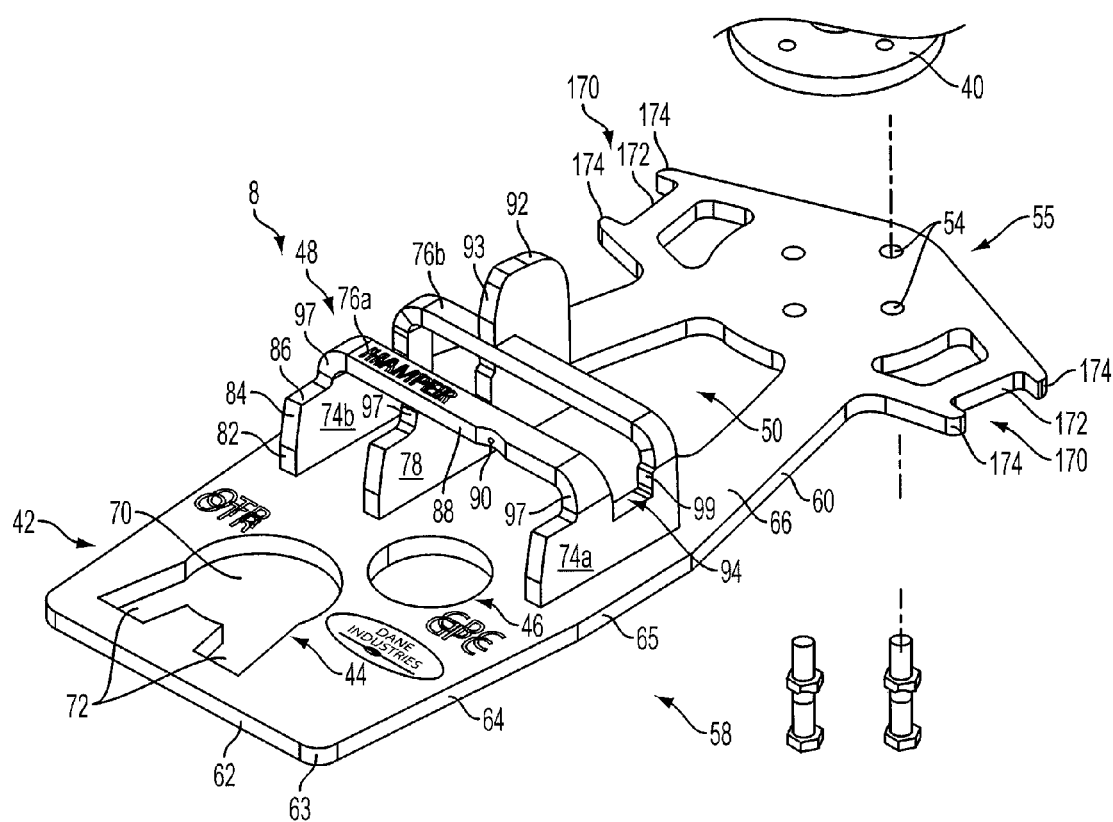
FIG. 27 is an isometric view of the foot and stop plate depicted in FIGS. 24-26.

For a discussion of an embodiment of the foot 8 utilized with the hitch assembly 2 depicted in FIGS. 24-26, reference is made to FIG. 27, which is an isometric view of the foot 8 and stop plate 40 depicted in FIGS. 24-26. A comparison of the feet 8 depicted in FIGS. 4 and 27 reveals that the two feet 8, with a couple of exceptions as will be described in the following discussion, are identical and have the same hitching features 44, 46, 48. Therefore, the preceding discussions regarding the foot 8 of FIGS. 4-8 and the methods of attaching said foot 8 to the various carts 96 shown in FIGS. 9-23 apply equally to the foot depicted in FIG. 27, except as provided below.

In one embodiment, the foot 8 of FIG. 27 lacks the tapered edge 52 depicted in FIG. 4. Also, the heel end 55 of the foot 8 of FIG. 27 has additional features 170. Specifically, each lateral side of the heel end 55 includes a bracket/notch 170 for mating with the square tube 152 on the mount 12. Each bracket/notch 170 has a recessed portion 172 defined by protruding bracket ends 174. Each bracket/notch 170 opens in a direction that is generally perpendicular to the longitudinal axis of the foot 8.

As can be understood from FIGS. 24 and 26, to lock the foot 8 in a lateral storage position that is 90 degrees to the right or left from the orientation shown in FIG. 24, the knob 36 is pushed down until the upper planar surface 66 of the plate 42 clears the bottom end of the square tube 152. The foot 8 is then pivoted until the bracket/notch 170 is aligned to receive the square tube 152. The downward force is then removed from the knob 36 so the foot 8 can return to its fully upward position, thereby causing the bracket/notch 170 to engage the square tube 152 and lock the foot 8 in the lateral storage position.

Figure 28:
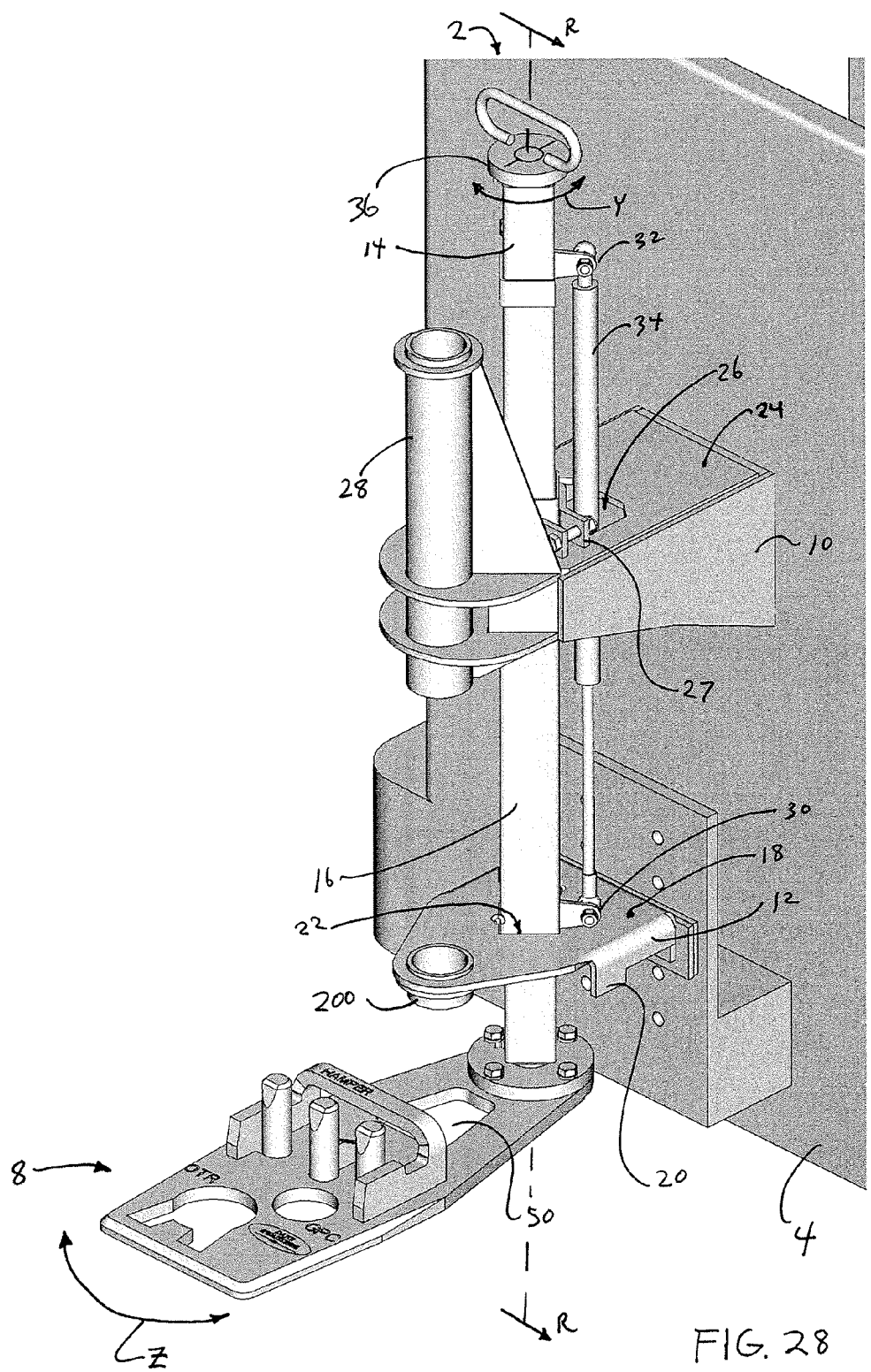
FIG. 28 is an isometric view of the hitch assembly connected to the front portion of the mover.
Figure 29:
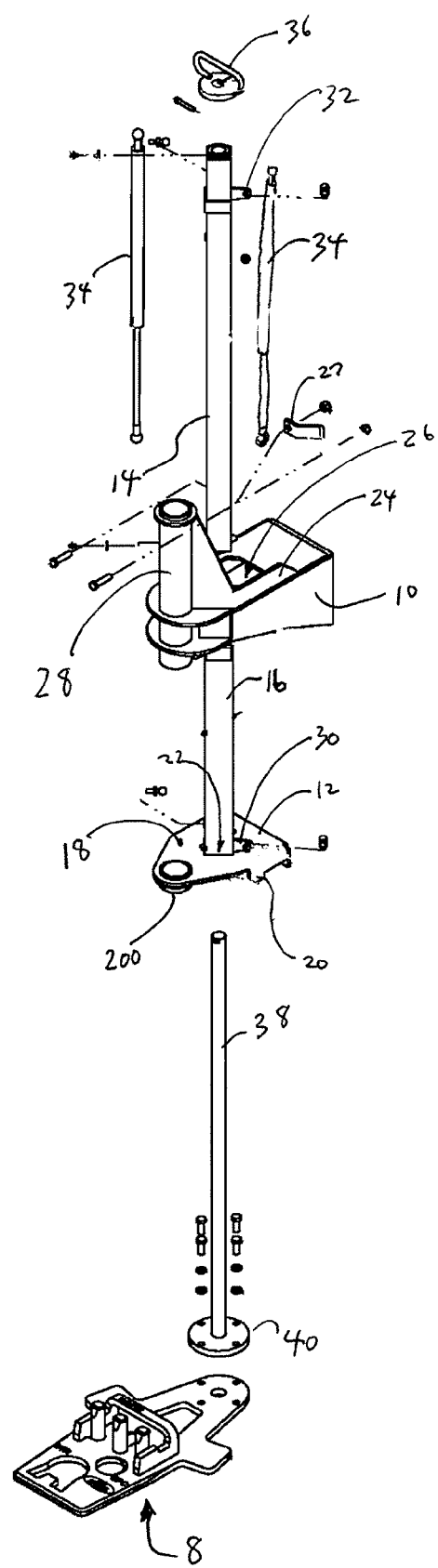
FIG. 29 is an exploded isometric view of the hitch assembly depicted in FIG. 28.
Figure 30:
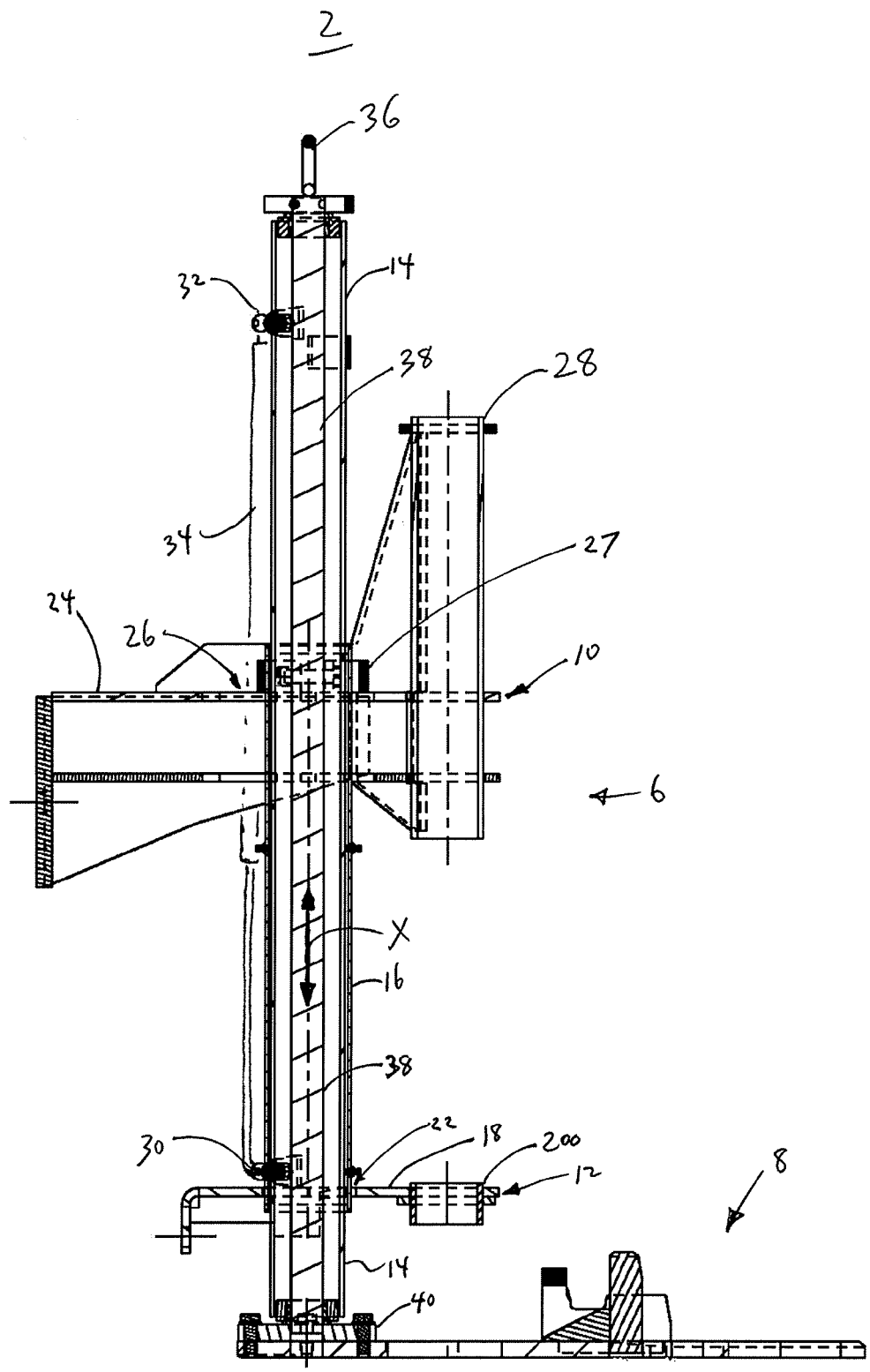
FIG. 30 is a sectional elevation of the hitch assembly taken along section line RR in FIG. 28.

For a detailed discussion of a third embodiment of the hitch assembly 2, reference is now made to FIGS. 28-30. FIG. 28 is an isometric view of the hitch assembly 2 connected to the front portion of the mover 4. FIG. 29 is an exploded isometric view of the hitch assembly 2 depicted in FIG. 28. FIG. 30 is a sectional elevation of the hitch assembly 2 taken along section line RR in FIG. 28.

As shown in FIG. 28, in one embodiment, the hitch assembly 2 is adapted for connection to a rideable motorized cart mover 4. In one embodiment, the rideable motorized cart mover 4 is a TR 3500 series tow tractor as manufactured by Crown Equipment Corp., 44 South Washington St., New Bremen, Ohio 45869.

As indicated in FIGS. 28-30, the hitch assembly 2 includes a vertical telescopic tube 6, a foot 8, an upper mount 10, and a lower mount 12. The telescopic tube 6 includes an inner tube 14 that extends upwardly out of an outer tube 16. In one embodiment, the tubes 14, 16 have a square or rectangular cross-section. In other embodiments, the tubes 14, 16 have circular, hexagonal, triangular or other cross-sectional shapes.

As indicated in FIGS. 28 and 30, the upper mount 10 connects to the outer tube 16 near its upper end, and the lower mount 12 connects to the outer tube 16 near its lower end. The upper and lower mounts 10, 12 attach to the front portion of the mover 4.

As can be understood from FIGS. 28-30, in one embodiment, the lower mount 12 includes a generally horizontal plate 18, two tabs 20 extending vertically downward from the outer perimeter of the plate 18, and a short cylindrical tube 200 that extends vertically through the plate 18. In one embodiment, the tabs 20 are offset from each other about the outer perimeter of the plate 18 by approximately 180 degrees, and the tube 200 is located approximately midway between the two tabs 20 at the front of the plate 18. In one embodiment, the lower end of the outer tube 16 extends through a hole 22 in the plate 18 of the lower mount 12.

As shown in FIGS. 28-30, in one embodiment, the upper mount 10 includes a generally horizontal plate 24. In one embodiment, the upper end of the outer tube 16 extends through a hole 26 in the plate 24 of the upper mount 10 and is coupled to the plate 24 via a two-piece strap 27. A cylindrical tube 28 extends vertically through the plate 24 of the upper mount 10. As compared to the embodiment depicted in FIGS. 1-3, the embodiment depicted in FIGS. 28-30 has an upper mount 10 that is significantly more reinforced and the tube 28 is significantly longer.

As can be understood from FIGS. 28-30, a pair of lower brackets 30 extends from the outer tube 16 near its lower end, and a pair of upper brackets 32 extends from the inner tube 14 near its upper end. In one embodiment, a biasing mechanism, such as a gas spring 34, extends between each pair of lower and upper brackets 30, 32. The inner tube 14 is telescopically moveable within the outer tube 16. Each gas spring 34 acts between its respective pair of lower and upper brackets 30, 32 to provide a constant upward force to bias the inner tube 14 in an upwardly extended position relative to the outer tube 16. In other embodiments, the biasing mechanism 34 is a spring, an electric actuator or a hydraulic actuator.

As illustrated in FIGS. 28-30, a hitch alignment handle 36 caps off the top of the inner tube 14. As shown in FIG. 30, the handle 36 is connected to an upper end of a shaft 38 that extends down through the tubes 14, 16. The bottom end of the shaft 38 connects to a stop plate 40, which is connected to the foot 8. The shaft 38 is pivotally displaceable within the tubes 14, 16 such that the foot 8 and handle 36 are pivotally in horizontal planes about the vertical axis of the shaft 38, as indicated by arrows Y and Z in FIG. 28.

As can be understood from FIG. 30 and the preceding discussion, the shaft 38 and the inner tube 14 are vertically displaceable as a unit within the outer tube 16 as indicated by arrow X. As shown in FIG. 30, when the inner tube 14 is displaced downwardly through the outer tube 16 against the upward force exerted by the gas springs 34, a bottom portion of the inner tube 14 will extend downwardly out of the outer tube 16 and the top horizontal surface of the foot 8 will displace away from the bottom horizontal surface of the lower mount 12. As can be understood from FIG. 30, when the gas springs 34 are allowed to return the inner tube 14 to the upwardly extended position shown in FIG. 28, the stop plate 40 will abut against the lower end of the outer tube 16, thereby preventing the inner tube 14 from overly extending upwards.

Figure 31:
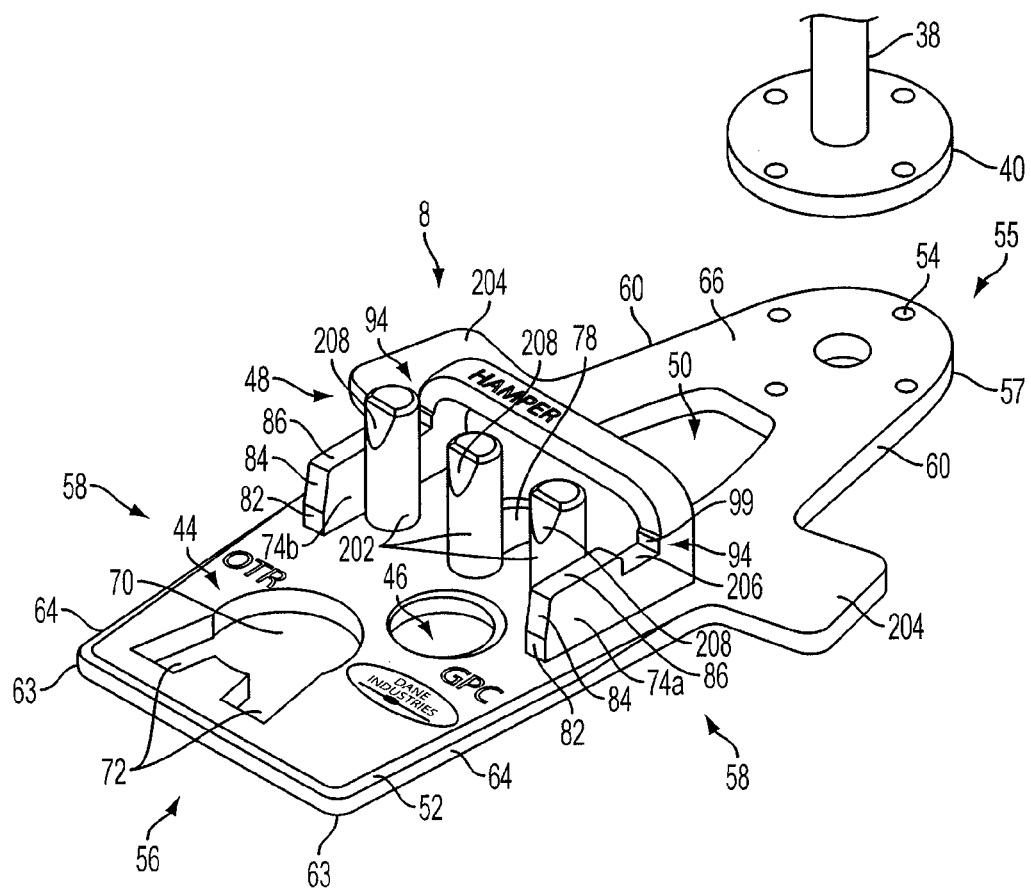
FIG. 31 is an isometric view of the foot, stop plate and shaft depicted in FIG. 29.
Figure 32:
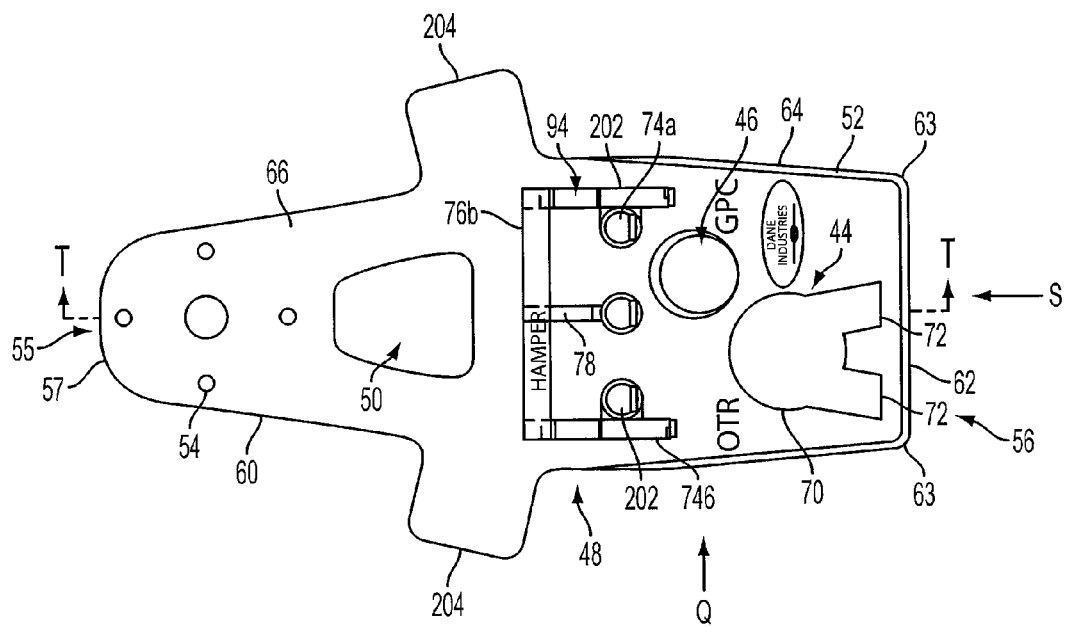
FIG. 32 is a top plan view of the foot depicted in FIG. 31.
Figure 33:
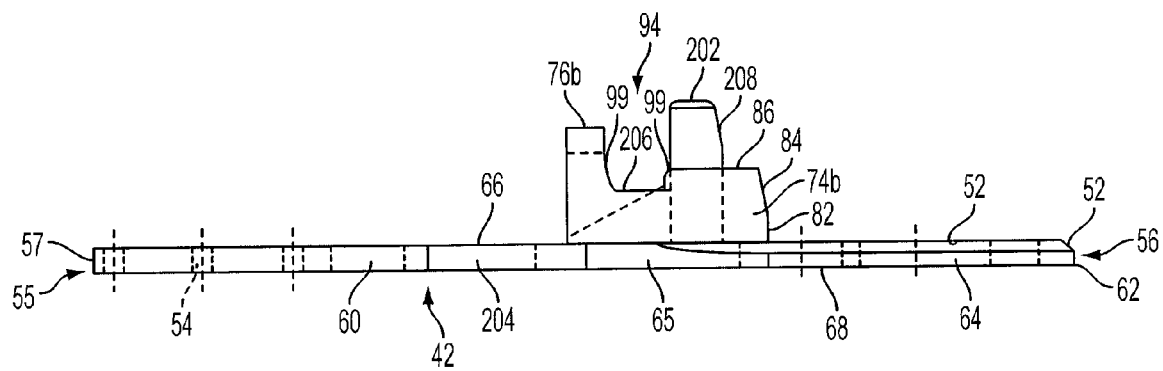
FIG. 33 is a side elevation of the foot as viewed along arrow Q in FIG. 32.
Figure 34:
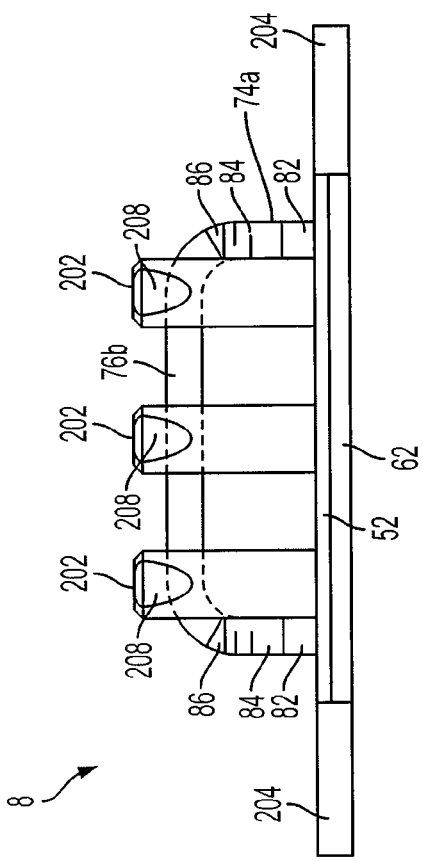
FIG. 34 is an end elevation of the foot as viewed along arrow S in FIG. 32.
Figure 35:
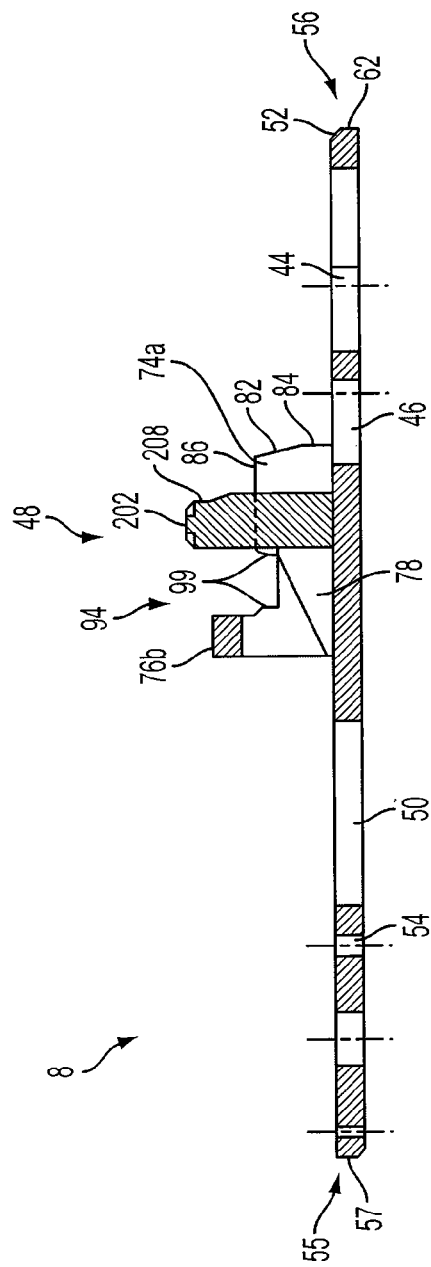
FIG. 35 is a longitudinal cross-sectional elevation of the foot as taken along section line TT.

For a discussion of features of a third embodiment of the foot 8, which may be employed with any of the embodiments of the hitch assembly 2 depicted in FIGS. 1-3, 24-26, and 28-30, reference is now made to FIGS. 31-35. FIG. 31 is an isometric view of the foot 8, stop plate 40 and shaft 38 depicted in FIG. 29. FIG. 32 is a top plan view of the foot 8 depicted in FIG. 31. FIG. 33 is a side elevation of the foot 8 as viewed along arrow Q in FIG. 32. FIG. 34 is an end elevation of the foot 8 as viewed along arrow S in FIG. 32. FIG. 35 is a longitudinal cross-sectional elevation of the foot 8 as taken along section line TT.

A comparison of the third foot embodiment depicted in FIGS. 31-35 to the other two-foot embodiments depicted in FIGS. 4-8 and 27 show that the third foot embodiment has many features in common with the other two embodiments. However, the third foot embodiment has several features not found in the other two foot embodiments, one of which is a third hitching feature 48 that employs three pins 202 in place of the forward laterally extending bar 76a shown in FIGS. 4-8 and 27.

As shown in FIG. 31, the foot 8 includes a plate 42 with a first hitching feature 44, a second hitching feature 46, a third hitching feature 48, a fourth hitching feature 202, a lock slot 50, a tapered edge 52, and a series of bolt holes 54 for connecting the foot 8 to the stop plate 40. As indicated in FIGS. 31 and 32, the plate 42 has a heel end 55, a toe end 56, and two lateral sides 58. The heel end 55 is defined by an arcuate edge 57 that transitions into two diverging rear edges 60 that extend towards the toe end 56 and define the rearward half of each lateral side 58. The toe end 56 is defined by a straight leading edge 62 that runs perpendicular to the longitudinal axis of the plate 42 and transitions about arcuate corners 63 into two diverging front edges 64 that extend towards the heel end 55, define the forward half of each lateral side 58, and join the two diverging rear edges 60 via non-diverging side edges 65. As shown in FIGS. 32 and 34, in one version of the third foot embodiment, a wing 204 extends laterally from the forward portion of each diverging rear edge 60.

As shown in FIGS. 31 and 33, the plate 42 includes an upper planar surface 66 and a lower planar surface 68. The third hitching feature 48 extends upwardly from the upper planar surface 66. The tapered edge 52 extends along the two non-diverging side edges 65, the two diverging front edges 64, the two arcuate corners 63, and the straight leading edge 62.

As shown in FIGS. 31 and 35, the first hitching feature 44, the second hitching feature 46 and the lock slot 50 are holes that extend completely through the plate 42. As illustrated in FIGS. 21 and 32, the hole comprising the first hitching feature 44 includes a circular hole portion 70 that extends forwardly towards the toe end 56 via two separate slot portions 72 that diverge from each other. The second hitching feature 46 is defined by a circular hole. The lock slot 50 is defined by a generally trapezoidal hole that has arcuate corners and is narrow at its rearward end and wide at its forward end.

As can be understood from FIG. 28, when the inner tube 14 and the foot 8 are in their most upward positions, the bottom end of the cylindrical tube 200 or one of the tabs 20 will be received within the lock slot 50. This will prevent the foot 8 and shaft 38 from pivoting. To lock the foot 8 in the forward orientation illustrated in FIG. 28, the bottom of the cylindrical tube 200 is located within the lock slot 50. To lock the foot 8 in a lateral orientation that is rotated 90 degrees to the right or left from the orientation shown in FIG. 28, the handle 36 is pushed down and pivoted to the right or left. This will cause the foot 8 to clear the cylindrical tube 200 and rotate to align with one of the lateral tabs 20. The foot 8 is allowed to return to the upward position and the lateral tab 20 is received within the lock slot 50, thereby locking the foot 8 in the lateral orientation.

As illustrated in FIGS. 31-35, the third hitching feature 44 includes first and second longitudinally extending sidewalls 74a, 74b, three cylindrical pins 202, a rear laterally extending bar 76b, and a middle longitudinally extending wall 78 extending rearwardly from the middle pin of the three pins 202. As indicated in FIGS. 31 and 34, the longitudinally extending sidewalls 74a, 74b extend upwards to transition into the laterally extending bar 76b.

As shown in FIG. 31, the walls 74a, 74b each have a lower face 82 that faces towards the toe end 56 and is adjacent and generally perpendicular to the upper planar surface 66. As indicated in FIGS. 31, 33 and 35, each lower face 82 transitions to a slightly rearwardly sloping section 84 that extends to a ledge 86. Each ledge 86 extends rearward to intersect the top end of a forward generally vertical surface 99. The bottom end of the forward generally vertical surface 99 intersects a generally horizontal surface 206 that extends rearward to intersect a bottom end of the rearward generally vertical surface 99. A groove 94 is defined between the rearward surfaces of the pins 202 and the forward surface of the laterally extending bar 76b. The groove 94 is also defined between each pair of generally vertical surfaces 99. The horizontal surfaces 206 form the bottom surface of the groove 94.

As illustrated in FIGS. 31-35, the cylindrical pins 202 extend perpendicularly from the upper planar surface 66. The tip of each pin 202 includes a taper 208 on the forward side of each pin 202. The center wall 78 extends rearward from the rearward side of the middle pin 202 of the three pins 202. The wall 78 provides stiffening support for the middle pin 202.

Figure 36:
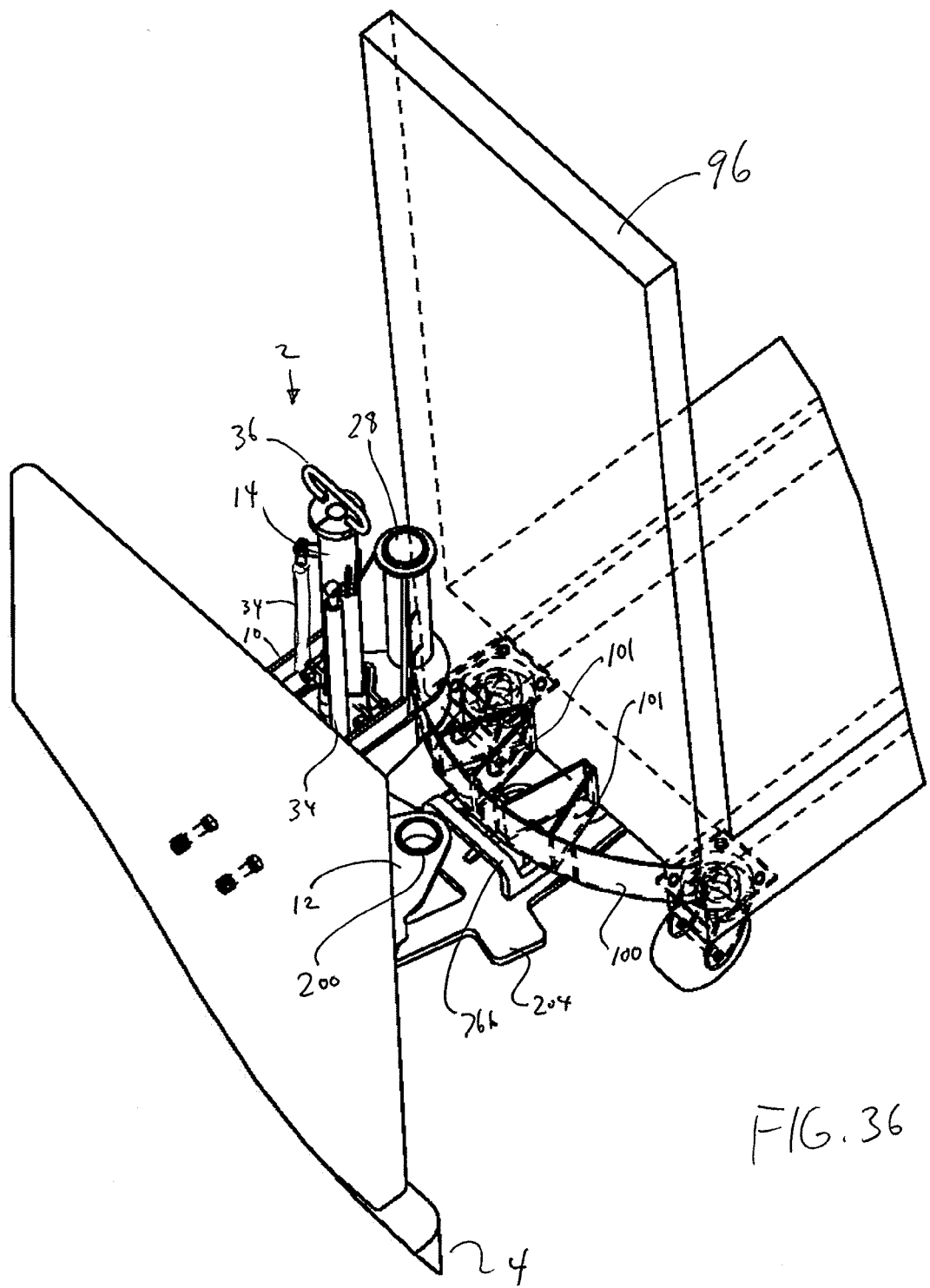
FIG. 36 is an isometric view of the foot approaching the framework element of a No. 1007/1074 platform truck (dolly) as utilized by the USPS.
Figure 37:
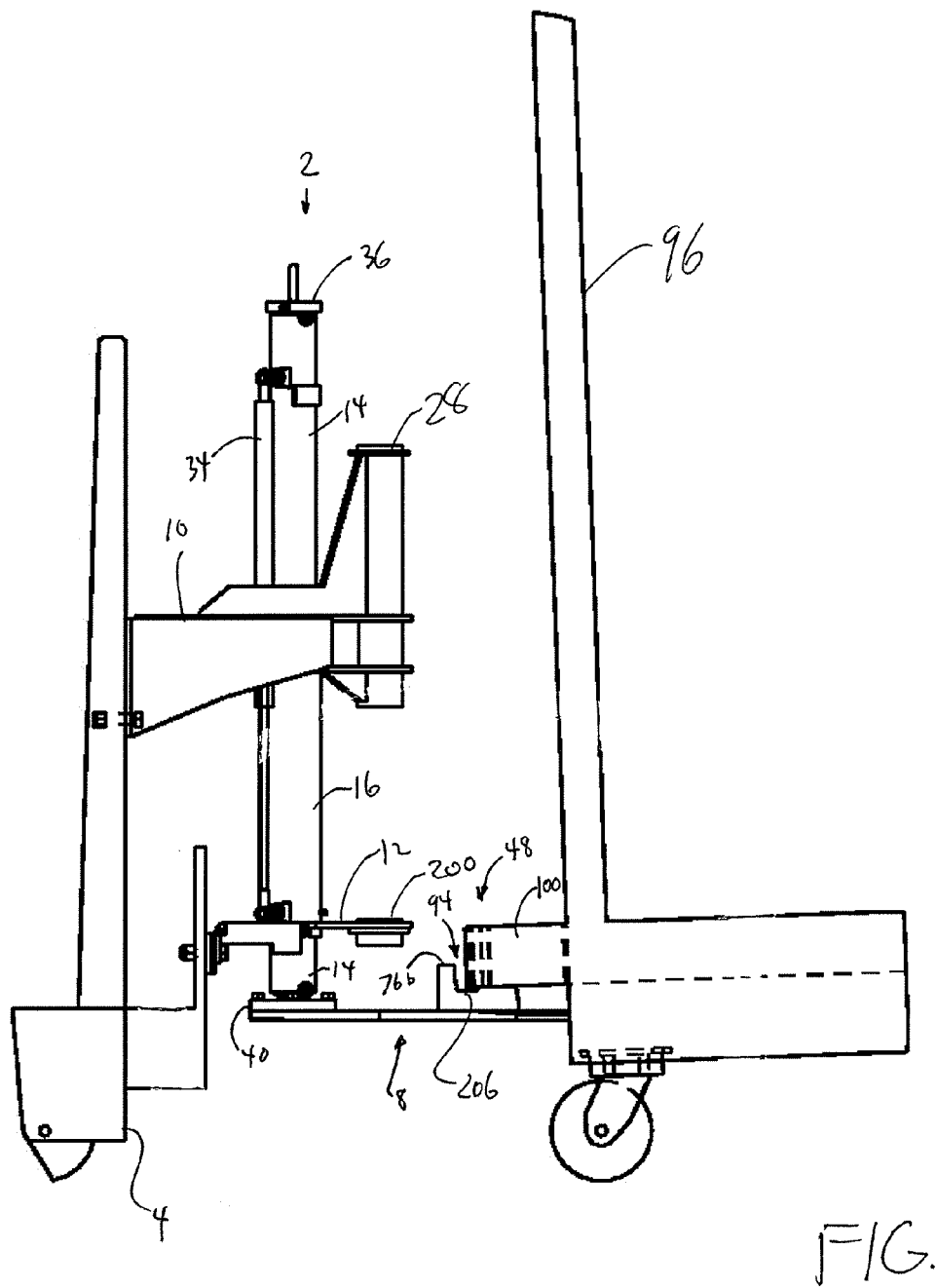
FIG. 37 is a side elevation of the hitch assembly engaged with the cart via the framework element being received in the groove/slot of the third hitching feature.
Figure 38:
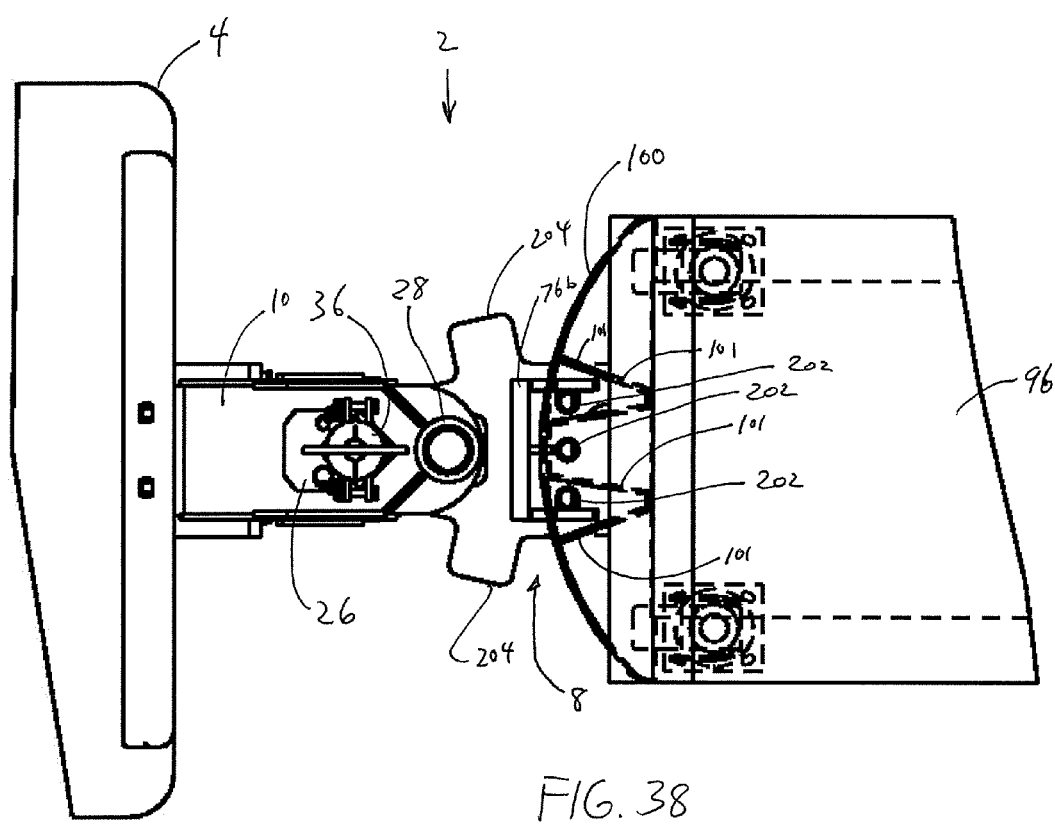
FIG. 38 is top plan view of the hitch assembly engaged with the cart via the framework element being received in the groove/slot of the third hitching feature.

Reference is now made to FIGS. 36-38 for a discussion regarding the hitch assembly 2 of the third embodiment being coupled via the third hitching feature 48 to a framework element 100 of the following cart model 96 utilized by the USPS: and the Utility Container Platform Truck (Dolly) (i.e., USPS #1070/1074). FIG. 36 is an isometric view of the foot 8 approaching the framework element 100 of a No. 1007/1074 platform truck (dolly) 96 as utilized by the USPS. FIG. 37 is a side elevation of the hitch assembly 2 engaged with the cart 96 via the framework element 100 being received in the groove/slot 94 of the third hitching feature 48. FIG. 38 is top plan view of the hitch assembly 2 engaged with the cart via the framework element 100 being received in the groove/slot 94 of the third hitching feature 48.

As shown in FIGS. 36-38, the framework element 100 is an arcuate-shaped plate metal bar 100 that runs laterally across the cart 96. The bar's planar surfaces are vertically oriented.

As illustrated in FIGS. 36 and 38, two V-braces 101 extend from the framework of the cart 96 to the inner arcuate planar surface of the bar 100, thereby reinforcing the bar 100. Each V-brace 101 is formed from two plate metal bars that form the legs of the V-brace 101. The planar surfaces of each leg are vertically oriented. As can be understood from FIGS. 36 and 38, the framework element 100 is received within the groove/slot 94 of the third hitching feature 48 such that each outer pin 202 is located between the legs of a V-brace 101 and the middle pin 202 is located between the two V-braces 100.

As shown in FIG. 36, the handle 36 is pushed down by the operator to cause the inner tube 14 to telescopically displace down into the outer tube 16 so the foot 8 moves into a lowered position as depicted in FIG. 30. With the foot 8 in the lowered position, the cart mover 4 moves forward to cause the foot 8 to approach the cart 96 and to bring the bar 100 and V-braces 101 into alignment with the groove/slot 94 and pins 202, respectively. Once properly aligned, the downward force from the handle 36 is released and the gas springs 34 return the inner tube 14 and the foot 8 to an upward position, which causes the framework element 100 to be received within the groove/slot 94 of the third hitching feature 48 and the pins 202 to be located between the bars of the V-braces 101, as shown in FIGS. 37 and 38. The cart mover 4 is now securely coupled to the cart 96 and ready to move the cart 96. To disengage the hitching assembly 2 from the cart 96, the aforementioned process is simply reversed.

Figure 39:
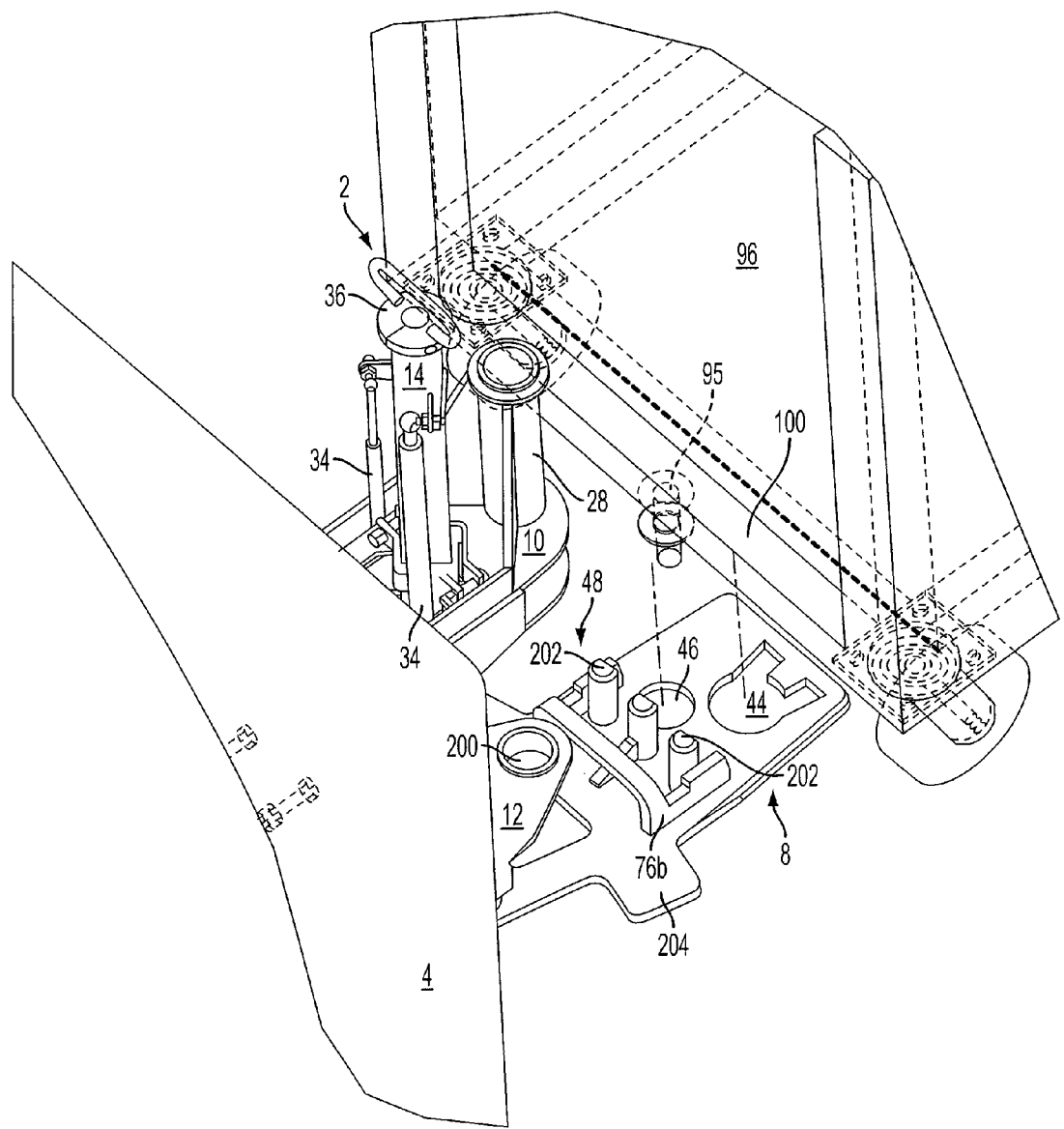
FIG. 39 is an isometric view of the foot approaching the hitch element of an 84C wire basket cart as utilized by the USPS.
Figure 40:
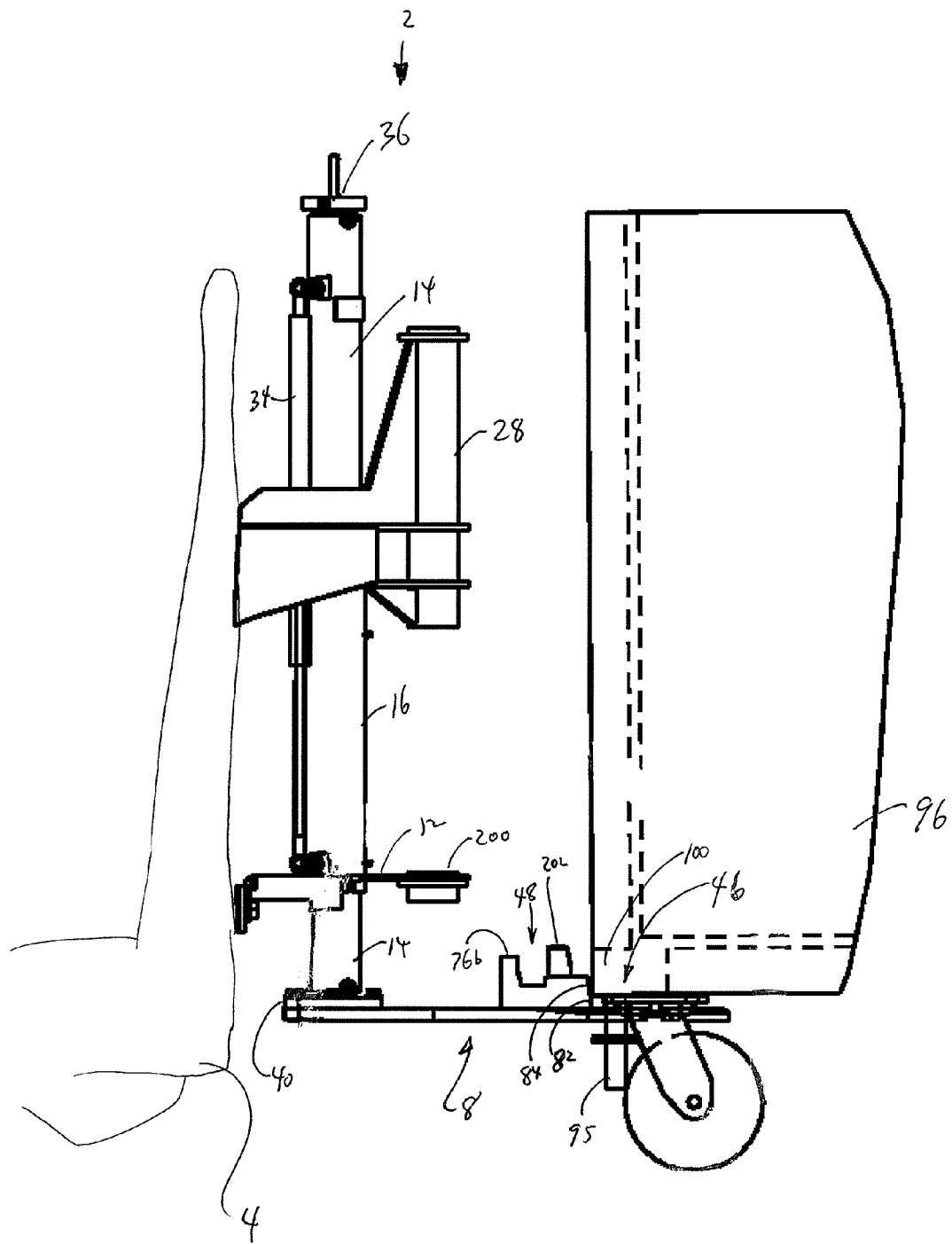
FIG. 40 is a side elevation of the hitch assembly engaged with the cart via the hitch element being received in the second hitching feature.
Figure 41:
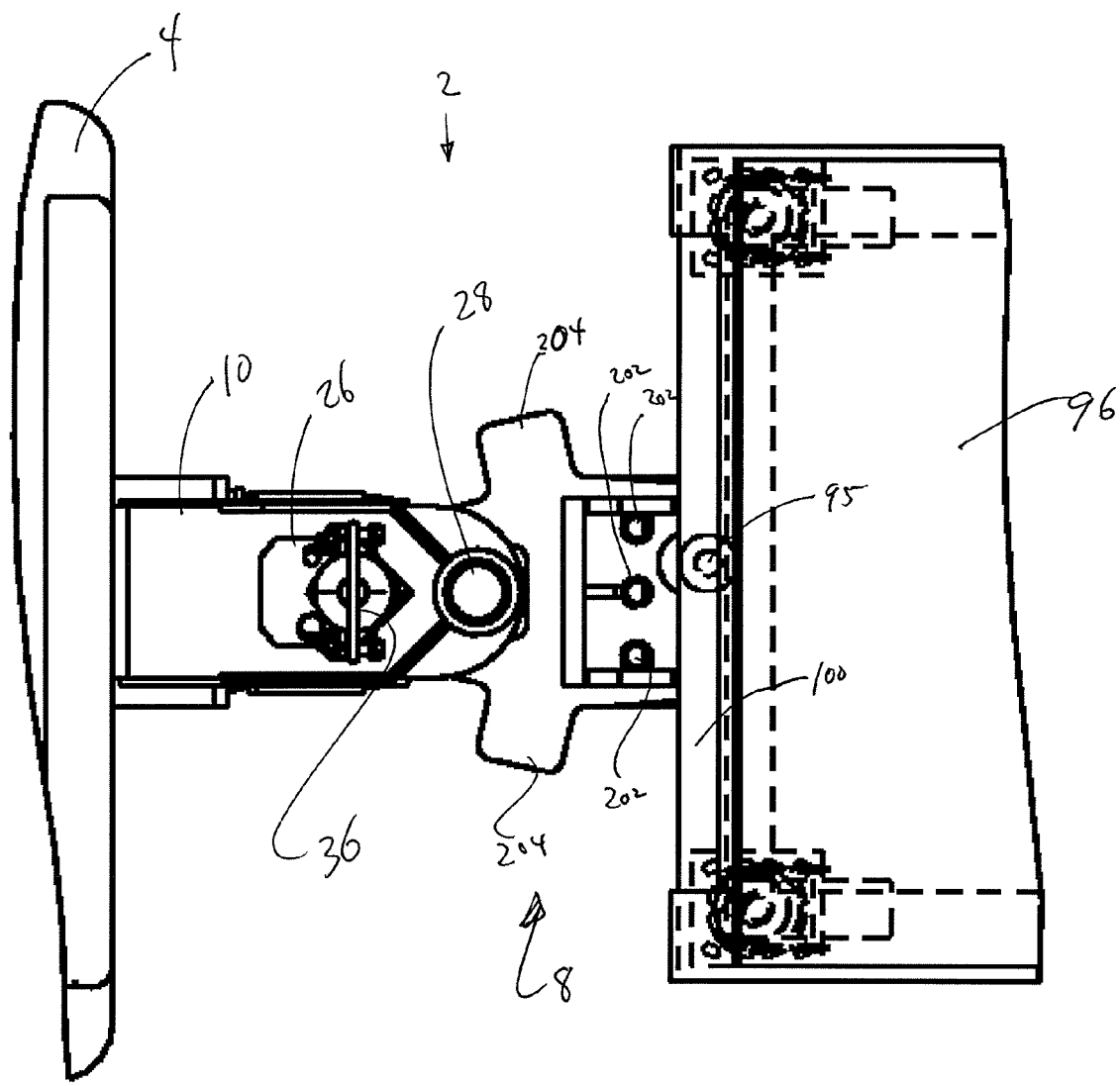
FIG. 41 is top plan view of the hitch assembly engaged with the cart via the hitch element being received in the second hitching feature.

Reference is now made to FIGS. 39-41 for a discussion regarding the hitch assembly 2 being coupled via the second hitching feature 46 to a hitch element 95 of any one of the following cart models 96 utilized by the USPS: the wire basket cart (i.e., USPS #84C). FIG. 39 is an isometric view of the foot 8 approaching the hitch element 95 of an 84C wire basket cart 96 as utilized by the USPS. FIG. 40 is a side elevation of the hitch assembly 2 engaged with the cart 96 via the hitch element 95 being received in the second hitching feature 46. FIG. 41 is top plan view of the hitch assembly 2 engaged with the cart via the hitch element 95 being received in the second hitching feature 46.

As illustrated in FIGS. 39-41, the hitch element 95 is a cylindrical pin that extends downwardly from a bottom portion of the cart 96. The pin 95 includes a circular washer plate extending perpendicularly from the circumferential surface of the pin approximately midway along the length of the pin 95. A framework element 100 runs laterally across the cart 96 near the hitch element 95. The framework element 100 has a generally rectangular cross-section. As can be understood from FIGS. 39 and 41, the hitch element 95 is received within the circular hole of the second hitching feature 46.

As shown in FIG. 39, the handle 36 is pushed down by the operator to cause the inner tube 14 to telescopically displace down into the outer tube 16 so the foot 8 moves into a lowered position as depicted in FIG. 30. With the foot 8 in the lowered position, the cart mover 4 moves forward to cause the foot 8 to approach the cart 96 and to bring the hitch element 95 into alignment with the second hitching feature 46. Once properly aligned, the downward force from the handle 36 is released and the gas springs 34 return the inner tube 14 and the foot 8 to an upward position, which causes the hitch element 95 to be received within the second hitching feature 46, as shown in FIGS. 40 and 41.

The sloping sections 84 of the walls 74a, 74b assist the alignment of the lower faces 82 with the framework element 100 as the hitch element 95 is received into the second hitching feature 46. Once the hitching element 95 is received within the second hitching feature 46, the lower faces 82 of the walls 74a, 74b are in close proximity to a vertical surface of the framework element 100 of the cart 96, as indicated in FIGS. 40 and 41. The close proximity between the faces 82 and the framework element 100 limits relative motion between the foot 8 and the cart 96. This helps to stabilize the cart 96 when coupled to the hitching assembly 2.

The cart mover 4 is now securely coupled to the cart 96 and ready to move the cart 96. To disengage the hitching assembly 2 from the cart 96, the aforementioned process is simply reversed.

Figure 42:
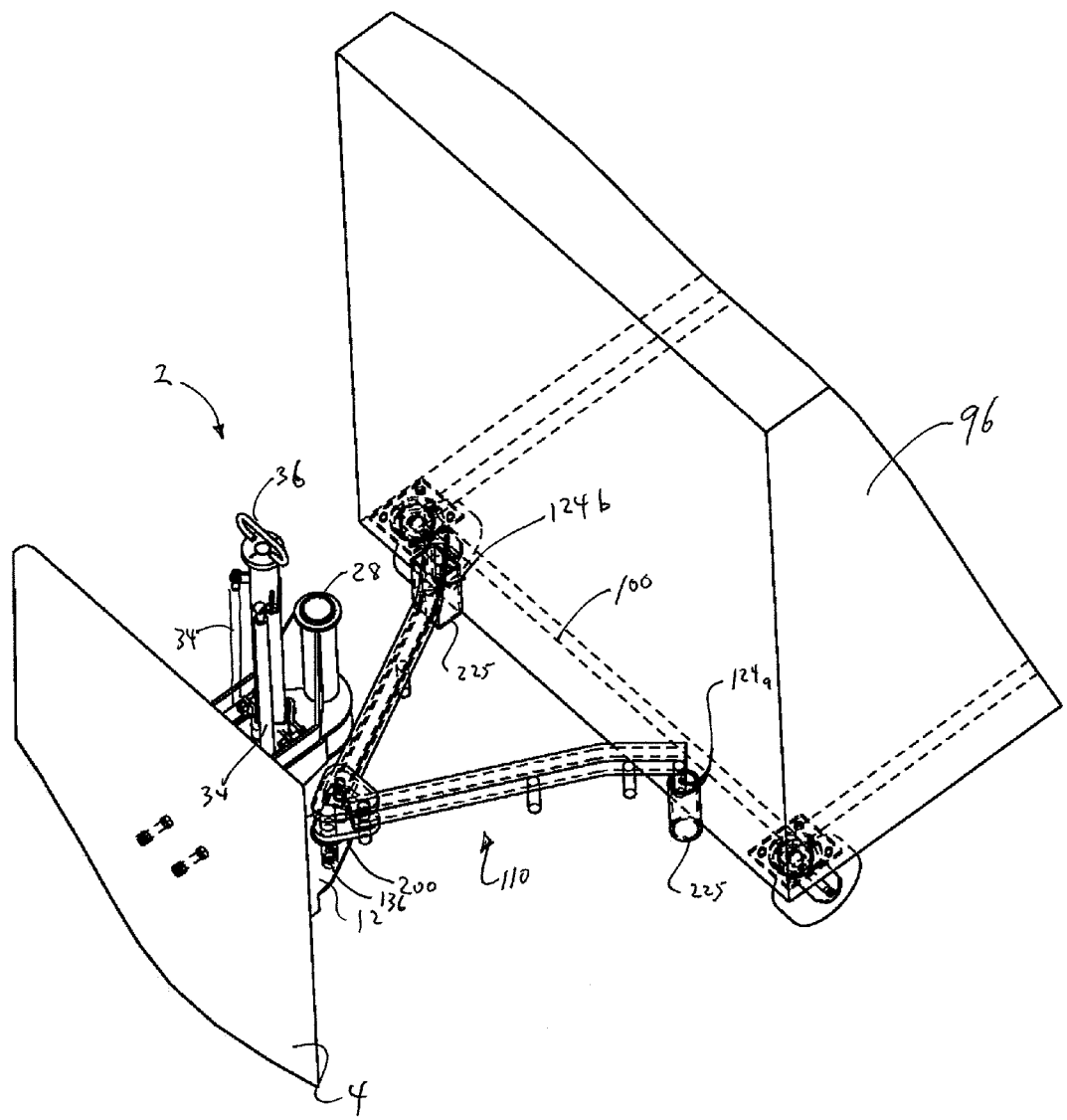
FIG. 42 is an isometric view of the hitch bar extending between the hitch assembly and the framework element of a no-hitch-stub GPMC-steel side cart as utilized by the USPS.
Figure 43:
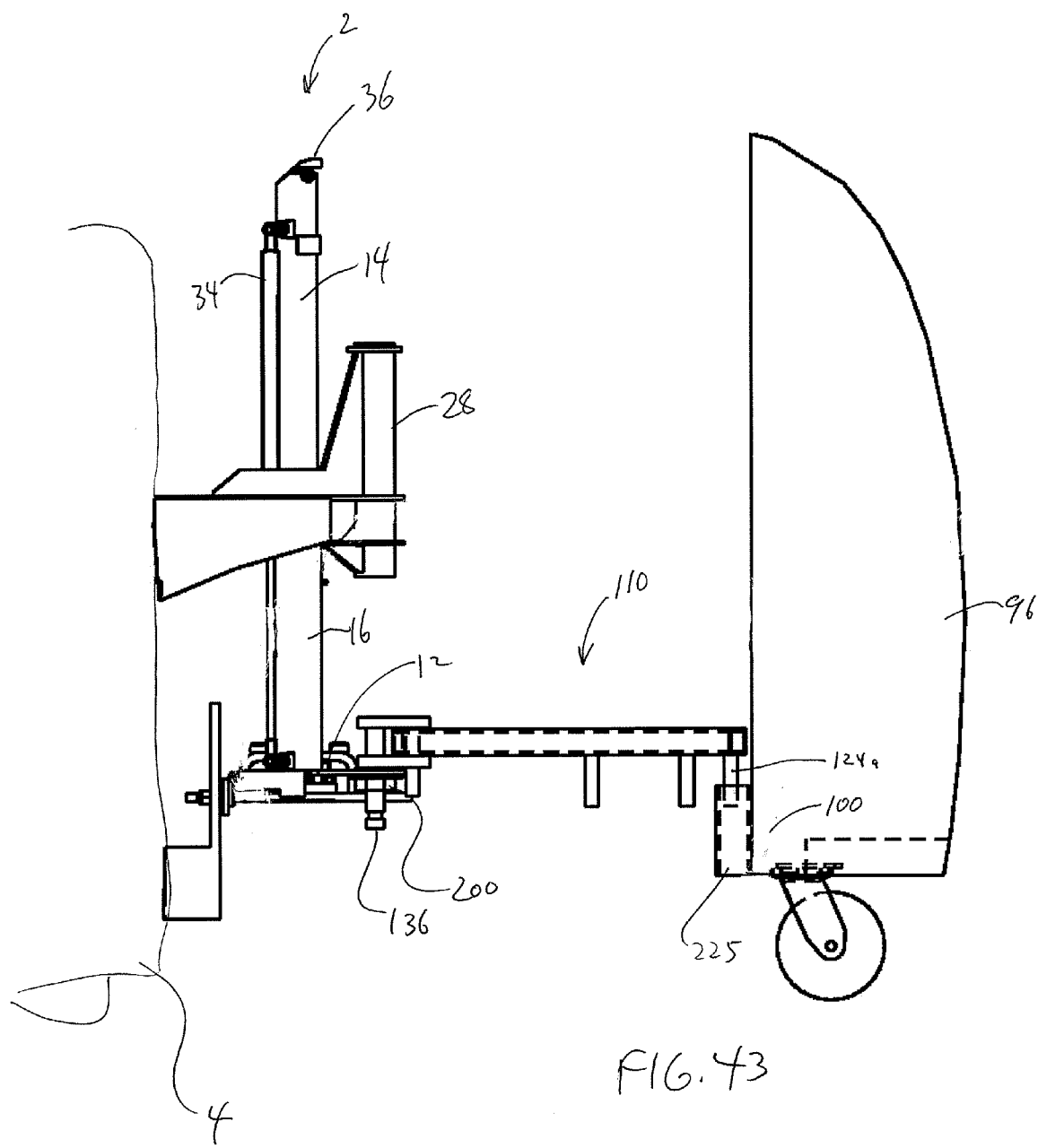
FIG. 43 is a side elevation of the hitch bar extending between the hitch assembly and the cart.
Figure 44:
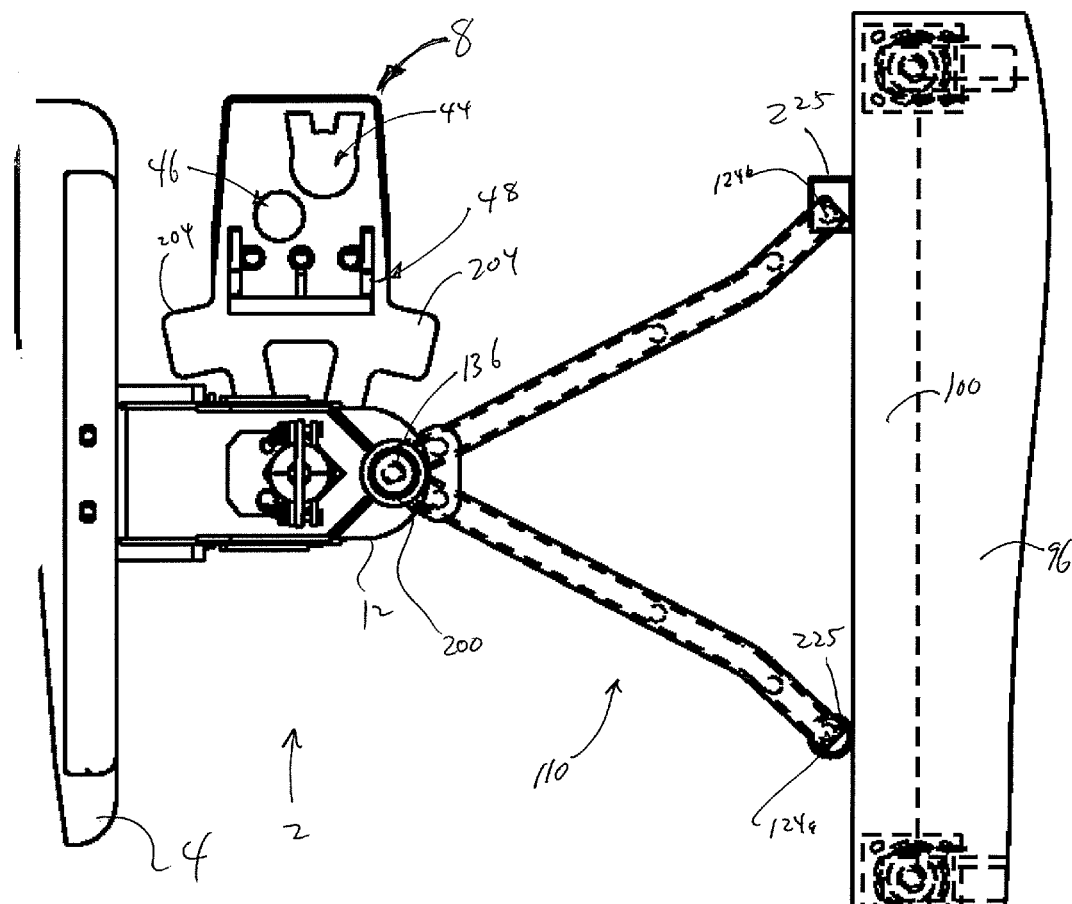
FIG. 44 is top plan view of the hitch bar extending between the hitching assembly and the cart.

Reference is now made to FIGS. 42-44 for a discussion regarding the hitch assembly 2 being coupled via a hitch bar 110 to a framework element 100 of the following cart model 96 utilized by the USPS: the GPMC cart (i.e., the General Purpose Mail Container without a hitch stub, USPS #3909, purchased pre-1983). FIG. 42 is an isometric view of the a hitch bar 110 extending between the hitch assembly 2 and the framework element 100 of a no-hitch-stub GPMC cart 96 as utilized by the USPS. FIG. 43 is a side elevation of the hitch bar 110 extending between the hitch assembly 2 and the cart 96. FIG. 44 is top plan view of the hitch bar 110 extending between the hitching assembly 2 and the cart 96.

As can be understood from FIGS. 42-44, the hitch bar 110 is as previously described in this Detailed Description with respect to FIGS. 21-23. As shown in FIGS. 42-44, the framework element 100 of the cart 96 includes first and second pin receiving tubes 225. The foot 8 is pivoted into the right or left lateral position, and one of the tabs 20 is received in the lock slot 50 to lock the foot 8 in the lateral position, as depicted in FIG. 44.

The pivot pin 136 of the hitch bar 110 is pivotally received in the tube 200 of the hitch assembly 2, and the mover 4 is maneuvered into close proximity to a cart 96 such that the most distal downward extending attachment pins 124a, 124b are aligned to be received within the first and second pin receiving tubes 225. The hitch assembly 2 is then lowered such that the most distal attachment pins 124a, 124b are received within the pin receiving tubes 225, and the hitch assembly 2 is locked into the lowered position via the handle 36 or other mechanical locking feature to maintain the attachment pins 124a, 124b within the pin receiving tubes 225. The mover 4 is now hitched to the cart 96. The aforementioned process is simply reversed to unhitch the mover 4 from the cart 96.

Figure 45:
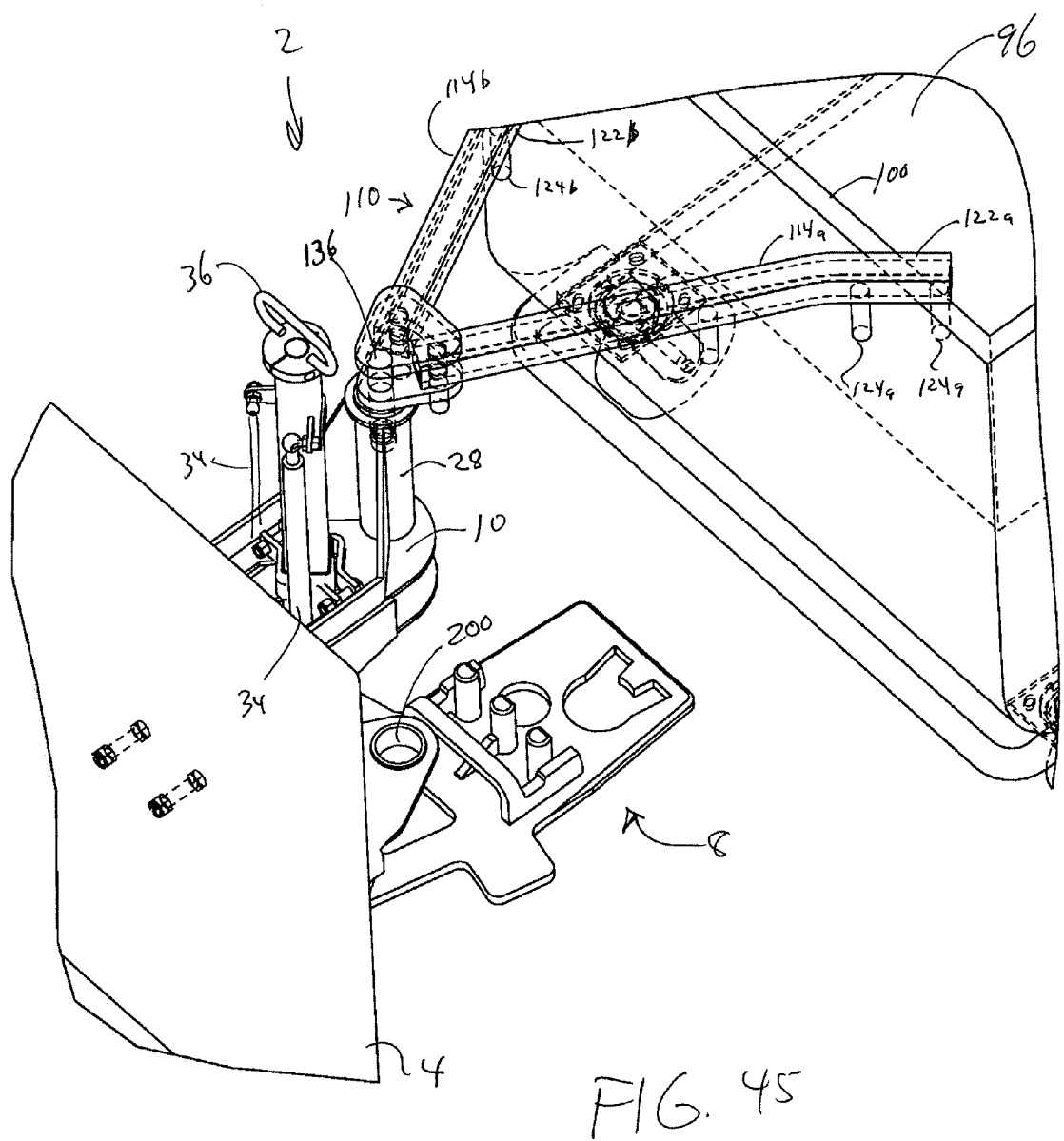
FIG. 45 is an isometric view of the hitch bar extending between the hitch assembly and the framework element of a Hamper wood and canvas cart as utilized by the USPS.
Figure 46:
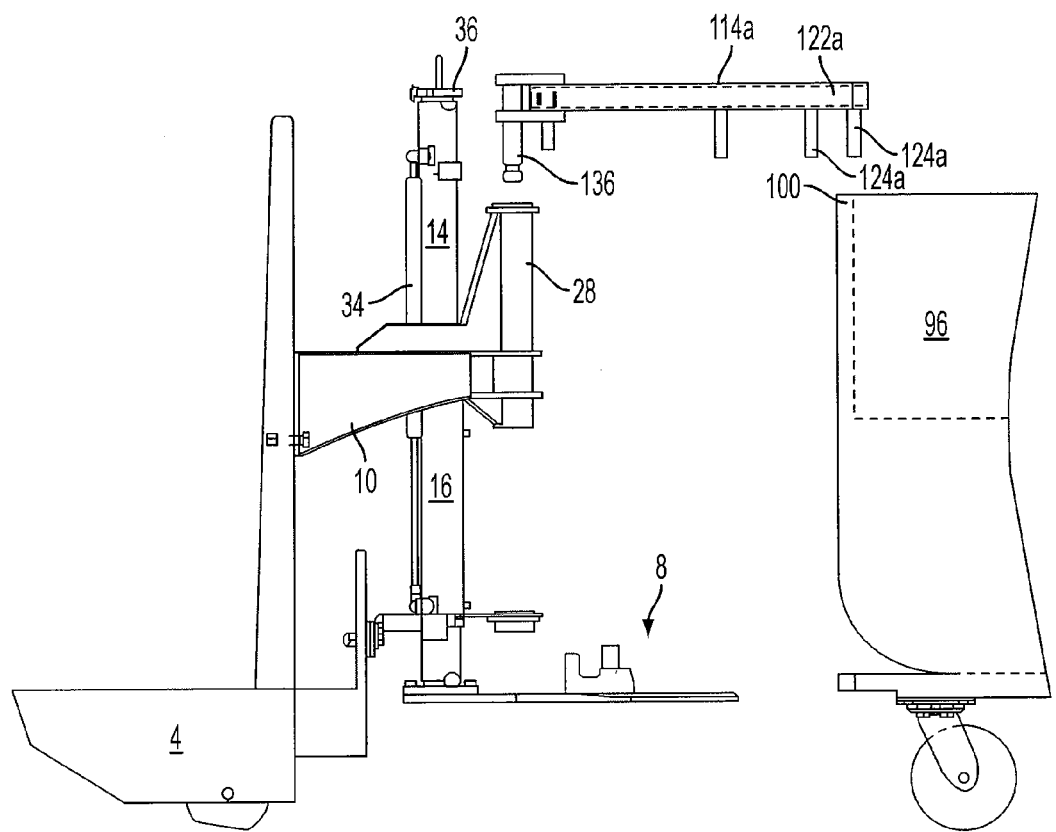
FIG. 46 is a side elevation of the hitch bar being positioned for connection to the hitch assembly and the cart.
Figure 47:
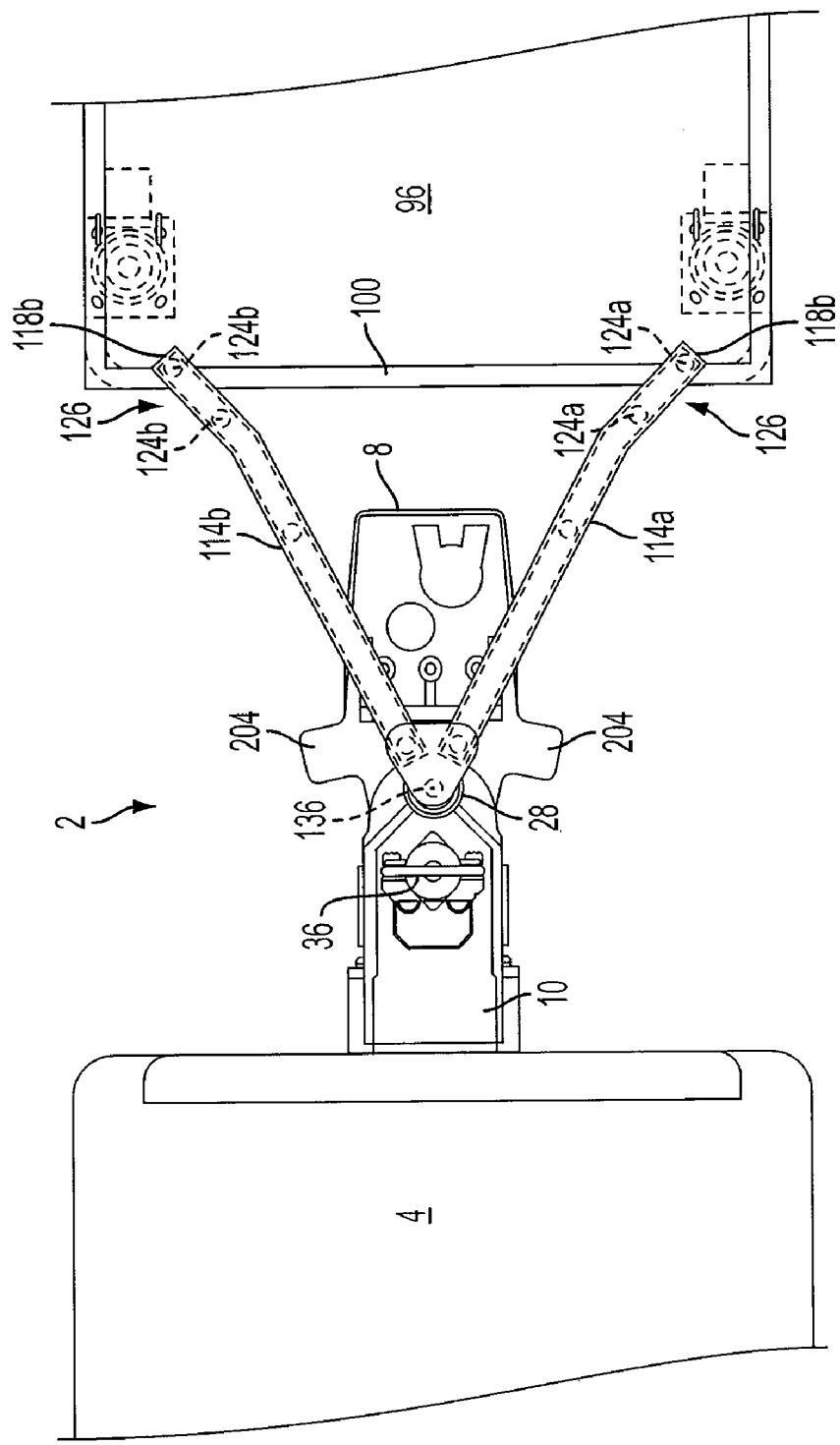
FIG. 47 is top plan view of the hitch bar extending between the hitching assembly and the framework element of the cart.

Reference is now made to FIGS. 45-47 for a discussion regarding the hitch assembly 2 being coupled via a hitch bar 110 to a framework element 100 of the following cart model 96 utilized by the USPS: the Hamper wood and canvas cart. FIG. 45 is an isometric view of the a hitch bar 110 extending between the hitch assembly 2 and the framework element 100 of a Hamper wood and canvas cart 96 as utilized by the USPS. FIG. 46 is a side elevation of the hitch bar 110 being positioned for connection to the hitch assembly 2 and the cart 96. FIG. 47 is top plan view of the hitch bar 110 extending between the hitching assembly 2 and the framework element 100 of the cart 96.

As can be understood from FIGS. 45-47, the hitch bar 110 is as previously described in this Detailed Description with respect to FIGS. 21-23. As shown in FIGS. 45-47, the mover 4 is maneuvered into close proximity to a cart 96, the hitch bar 110 is positioned such that framework element 100 resides in the gap 126 defined by the pins 124a, 124b of the distal ends 122a, 122b of the arms 114a, 114b. The pivot pin 136 is pivotally received in the tube 28. The mover 4 is now hitched to the cart 96. The aforementioned process is simply reversed to unhitch the mover 4 from the cart 96.

Figure 48:
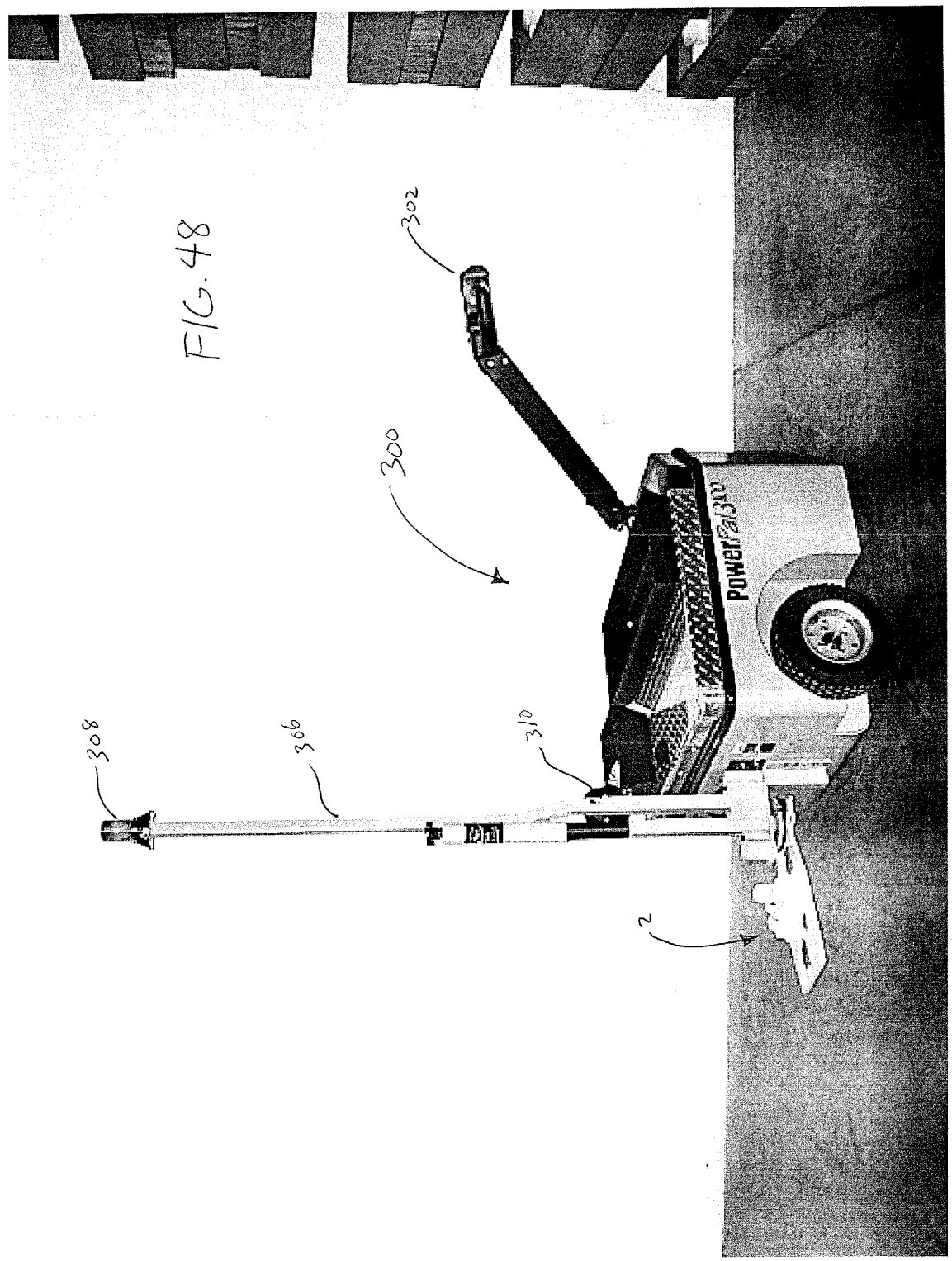
FIG. 48 is an isometric view of a hitch mounted on a powered walk along cart mover.

As shown in FIG. 48, in one embodiment, any of the previously described hitch assemblies 2 are adapted for connection to a powered walk along cart mover 300. In one embodiment, the powered walk along cart mover 300 is a PowerPal 3100 as manufactured by Dane Technologies, 7105 Northland Terrace, Brooklyn Park, Minn. 55428.

As indicated in FIG. 48, in one embodiment, the powered walk along cart mover 300 includes a tiller control handle 302, a pair of powered wheels 304, a strobe pole 306 with a strobe light 308 mounted thereon, a spot light 310, and a hitch 2 conforming to any one of the previously described hitch assemblies 2. The tiller control handle 302 is used for guiding and controlling the mover 300. The powered wheels 304 drive the mover 300. The spot light 310 is aimed in the direction of the hitch 2.

Figure 49:
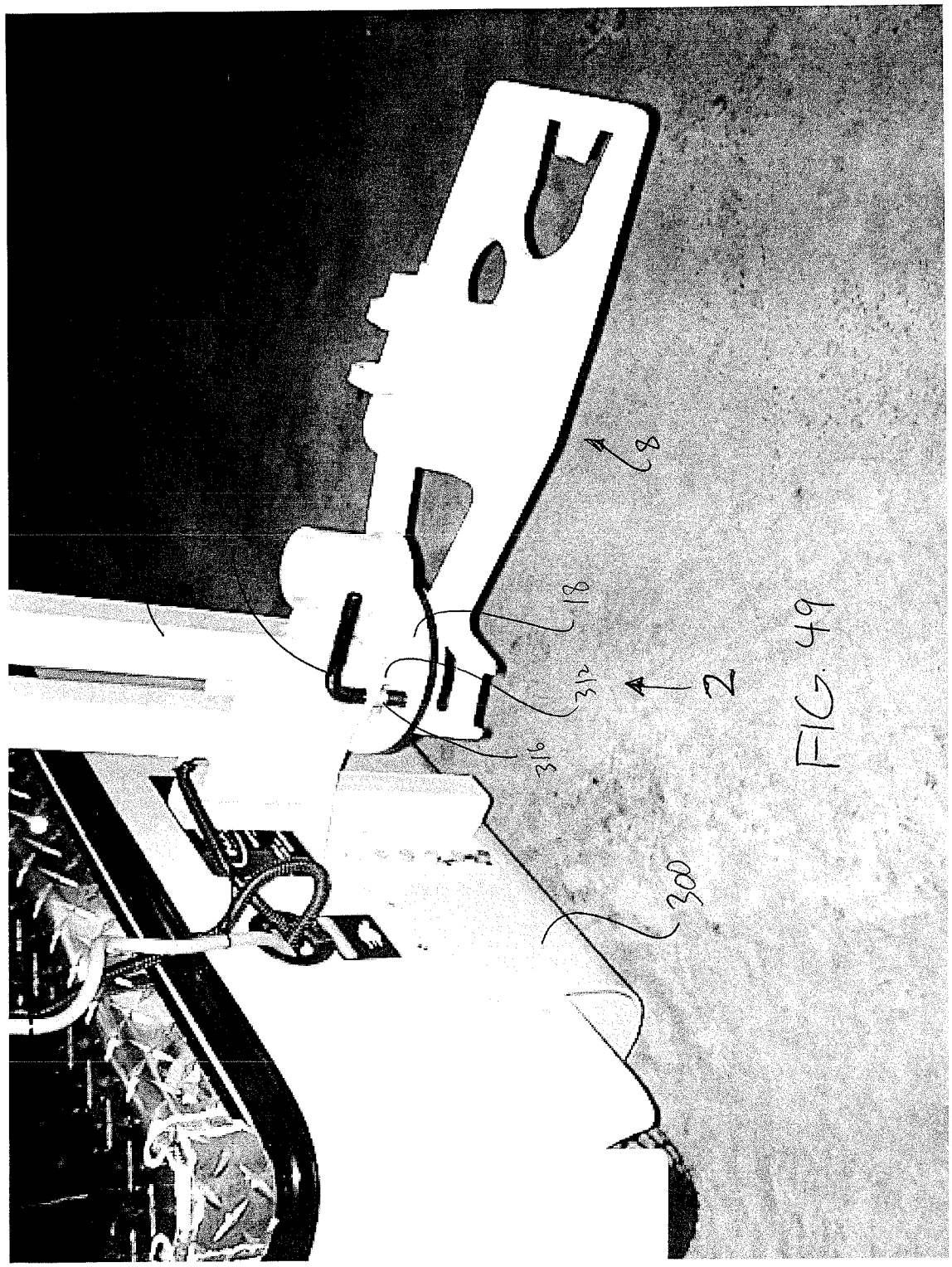
FIG. 49 is an enlarged view of a hitch locking feature employed with a hitch assembly employed on a powered walk along cart mover.

As illustrated in FIG. 49, in one embodiment, the hitch assembly 2 includes rectangular tubes 14, 16, a plate 18, a pin mount 312, a locking pin 314 and a spring 316. As can be understood from FIG. 49, the pin mount 312 is part of the upper portion of the hitch assembly 2 coupled to the mover 300. The pin 314 is vertically displaceable in the pin mount 312 and biased downwardly. A bottom end of the pin 314 is received in a pin receiving hole in the rear portion of the foot 8. When the pin 314 is received in the hole, the foot 8 is locked to extend straight from the mover 300, as shown in FIG. 49. To allow the foot 8 to pivot, the pin 314 is pulled out of the hole and, in one embodiment, locked in the upward position. As the tiller 302 pivots relative to the body portion of the mover 300, locking the foot 8 to extend straight from the mover 300 eliminates a pivot point in the hitch assembly 2 that becomes a problem when the mover 300 is used to move a cart in a cart-leading fashion.

Although various embodiments of this invention have been described above with a certain degree of particularity or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A hitch assembly for coupling a powered cart mover to a cart, wherein the cart has one of several different types of hitching elements, the assembly comprising:
   a mount for securing the assembly to the mover; and
   a generally planar foot operably coupled to the mount and including a heel end and a toe end defining a longitudinal axis thereof, the foot having first, second and third attachment features, the first attachment feature including a first hole extending through the foot with a plurality of diverging slots extending therefrom, the second attachment feature including a second hole extending through the foot, and the third attachment feature including a groove extending generally laterally relative to the longitudinal axis of the foot, wherein each attachment feature is configured to receive at least one of said different types of hitching elements.

2. The assembly of claim 1, wherein the mount includes a vertically adjustable portion biasing the foot in an upward position via a biasing element.

3. The assembly of claim 2, wherein the foot is pivotally coupled to the mount via the vertically adjustable portion.

4. The assembly of claim 1, wherein the first hole has a diameter larger than a diameter of the second hole.

5. The assembly of claim 1 or 4, wherein the groove is defined by first and second opposed faces.

6. The assembly of claim 5, wherein the first and second opposed faces are each bars.

7. The assembly of claim 5, wherein the first opposed face is a bar and the second opposed face is a plurality of spaced apart pins positioned along a line that is generally parallel to the bar.

8. The assembly of claim 1, wherein the mount includes a receptacle for pivotally receiving a hitch bar.

9. A hitch assembly for coupling a powered cart mover to a cart, wherein the cart has one of a variety of different types of hitch features, the assembly comprising:
   a mount for securing the assembly to the mover; and
   a foot operably coupled to the mount and including a heel end and a toe end defining a longitudinal axis thereof, the foot further comprising:
   a first member positioned on the foot and adapted to receive at least a first type of hitch feature; and
   a second member positioned on the foot and adapted to receive at least a second type of hitch feature different from the first type of hitch feature, wherein, the first member includes a first hole extending through the foot with a plurality of diverging slots extending therefrom, the first hole being positioned adjacent the toe end of the foot.

10. The assembly of claim 9, wherein the first type of hitch feature includes a pin extending from a cart.

11. The assembly of claim 10, wherein the first type of hitch feature further includes members radially extending from the pin.

12. The assembly as in any of claim 9, 10 or 11, in which the second type of hitch feature includes an elongated bar coupled to a cart.

13. The assembly of claim 9, further comprising a third member adapted to receive a third type of hitch feature.

14. The assembly of claim 13, wherein the second member includes a second hole different from the first hole, and the third member includes first and second opposed faces.

15. The assembly of claim 14, wherein the first and second opposed faces are each bars.

16. The assembly of claim 14, wherein the first opposed face is a bar and the second opposed face is a plurality of spaced apart pins positioned along a line that is generally parallel to the bar.

17. The assembly of claim 9, wherein the second member includes first and second opposed faces.

18. The assembly of claim 17, further comprising a third member positioned on the foot and adapted to receive at least a third type of hitch feature different from the first and second types of hitch features.

19. The assembly of claim 18, wherein the third member includes a second hole.

20. The assembly of claim 19, wherein the first hole has a diameter larger than a diameter of the second hole.

21. The assembly of claim 17, wherein the second member further comprises a plurality of longitudinally extending sidewalls positioned on the foot and the first and second opposed faces define a groove extending generally laterally relative to the longitudinal axis and through the sidewalls, the second member being positioned toward the heel end of the foot relative to the first member.

22. A hitch assembly for coupling a powered cart mover to a cart, wherein the cart has one of a variety of different types of hitch features, the assembly comprising:

a first member adapted to receive a first type of hitch feature; and a second member adapted to receive a second type of hitch feature different from the first type of hitch feature, wherein:

the second member includes first and second opposed faces; and the first opposed face is a bar and the second opposed face is a plurality of spaced apart pins positioned along a line that is generally parallel to the bar.

* * * * *